US012576307B2

(12) United States Patent
Zhang et al.

(10) Patent No.: US 12,576,307 B2
(45) Date of Patent: Mar. 17, 2026

(54) METHODS AND SYSTEMS FOR GENERATING SPORTS ANALYTICS WITH A MOBILE DEVICE

(71) Applicant: NEX Team Inc., San Jose, CA (US)

(72) Inventors: Qi Zhang, Hong Kong (HK); Wing Hung Chan, Hong Kong (HK); Keng Fai Lee, Cupertino, CA (US); Wang Fai Ng, Hong Kong (HK)

(73) Assignee: NEX Team Inc., San Jose, CA (US)

( * ) Notice: Subject to any disclaimer, the term of this patent is extended or adjusted under 35 U.S.C. 154(b) by 449 days.

(21) Appl. No.: 18/127,670

(22) Filed: Mar. 29, 2023

(65) Prior Publication Data

US 2023/0233905 A1     Jul. 27, 2023

Related U.S. Application Data

(63) Continuation of application No. 16/424,287, filed on May 28, 2019, now Pat. No. 11,638,854.

(60) Provisional application No. 62/679,073, filed on Jun. 1, 2018.

(51) Int. Cl.
| | |
|---|---|
| *A63B 24/00* | (2006.01) |
| *A63B 69/00* | (2006.01) |
| *G06V 40/20* | (2022.01) |

(52) U.S. Cl.
CPC ...... *A63B 24/0021* (2013.01); *A63B 24/0062* (2013.01); *A63B 69/0071* (2013.01); *G06V 40/23* (2022.01); *A63B 2024/0025* (2013.01); *A63B 2024/0028* (2013.01)

(58) Field of Classification Search
CPC ............ A63B 24/0021; A63B 24/0062; A63B 69/0071; G06V 40/23
See application file for complete search history.

(56) References Cited

U.S. PATENT DOCUMENTS

| | | | |
|---|---|---|---|
| 9,886,624 | B1 | 2/2018 | Marty et al. |
| 10,010,778 | B2 | 7/2018 | Marty et al. |
| 2017/0177930 | A1* | 6/2017 | Holohan ................. G06T 7/251 |
| 2018/0054659 | A1* | 2/2018 | Goswami ............. H04N 13/243 |

(Continued)

OTHER PUBLICATIONS

Krzysztof Przednowek, et al., "A System for Analysing the Basketball Free Throw Trajectory Based on Particle Swarm Optimization," Applied Sciences, 2018, vol. 8, Issue 11, p. 2090, MDPI, Basel, Switzerland.

(Continued)

*Primary Examiner* — Reginald A Renwick
(74) *Attorney, Agent, or Firm* — American Patent Agency PC; Daniar Hussain; Stephen M. Hou

(57) ABSTRACT

Methods and systems for real-time generation of ball shot analytics are disclosed. The methods and systems perform steps for ball and posture detection, ball and posture flow generation, shot event identification and classification, and shot analytics generation based on identified shot events and shooter posture flow. Embodiments of the present invention use computer vision techniques to enable a resource-limited mobile device such as a smartphone to conduct the aforementioned steps. Therefore, the present invention may be implemented using a processor on a single mobile computing device. Also disclosed are benefits of the new methods, and alternative embodiments of implementation.

20 Claims, 42 Drawing Sheets

(56) References Cited

U.S. PATENT DOCUMENTS

2018/0218243 A1    8/2018  Felsen et al.

OTHER PUBLICATIONS

Simone Francia, "SpaceJam: a Dataset for Basketball Action Recognition," Github Code Repository Page, available at: https://github.com/simonefrancia/SpaceJam, last access: Apr. 2, 2019.

Techsmith Corporation, "Coach's Eye," Coach's Eye website, available at: https://www.coachseye.com/, last accessed: Feb. 18, 2019.

Stats LLC, "Stats SportVU Basketball Player Tracking," SportVU website, available at: https://www.stats.com/sportvu-basketball/, last accessed: Feb. 12, 2019.

Vignesh Ramanathan, et al., "Detecting events and key actors in multi-person videos," The IEEE Conference on Computer Vision and Pattern Recognition (CVPR), 2016, pp. 3043-3053.

Mark Sandler, et al., "MobileNetV2: Inverted Residuals and Linear Bottlenecks," The IEEE Conference on Computer Vision and Pattern Recognition (CVPR), 2018, pp. 4510-4520, available at: https://arxiv.org/abs/1801.04381, last accessed: May 7, 2019.

Wei Liu, et al., "SSD: Single Shot MultiBox Detector," European conference on computer vision, pp. 21-37, Springer, Cham, 2016, available at: https://arxiv.org/abs/1512.02325, last accessed: May 7, 2019.

Zhe Cao, et al., "Realtime Multi-Person 2D Pose Estimation using Part Affinity Fields," Proceedings of the IEEE Conference on Computer Vision and Pattern Recognition, pp. 7291-7299, 2017, available at: https://arxiv.org/abs/1611.08050, last accessed: May 7, 2019.

Andrew G. Howard, et al., "MobileNets: Efficient Convolutional Neural Networks for Mobile Vision Applications," arXiv preprint arXiv:1704.04861, 2017, available at: https://arxiv.org/abs/1704.04861, last accessed: May 7, 2019.

* cited by examiner

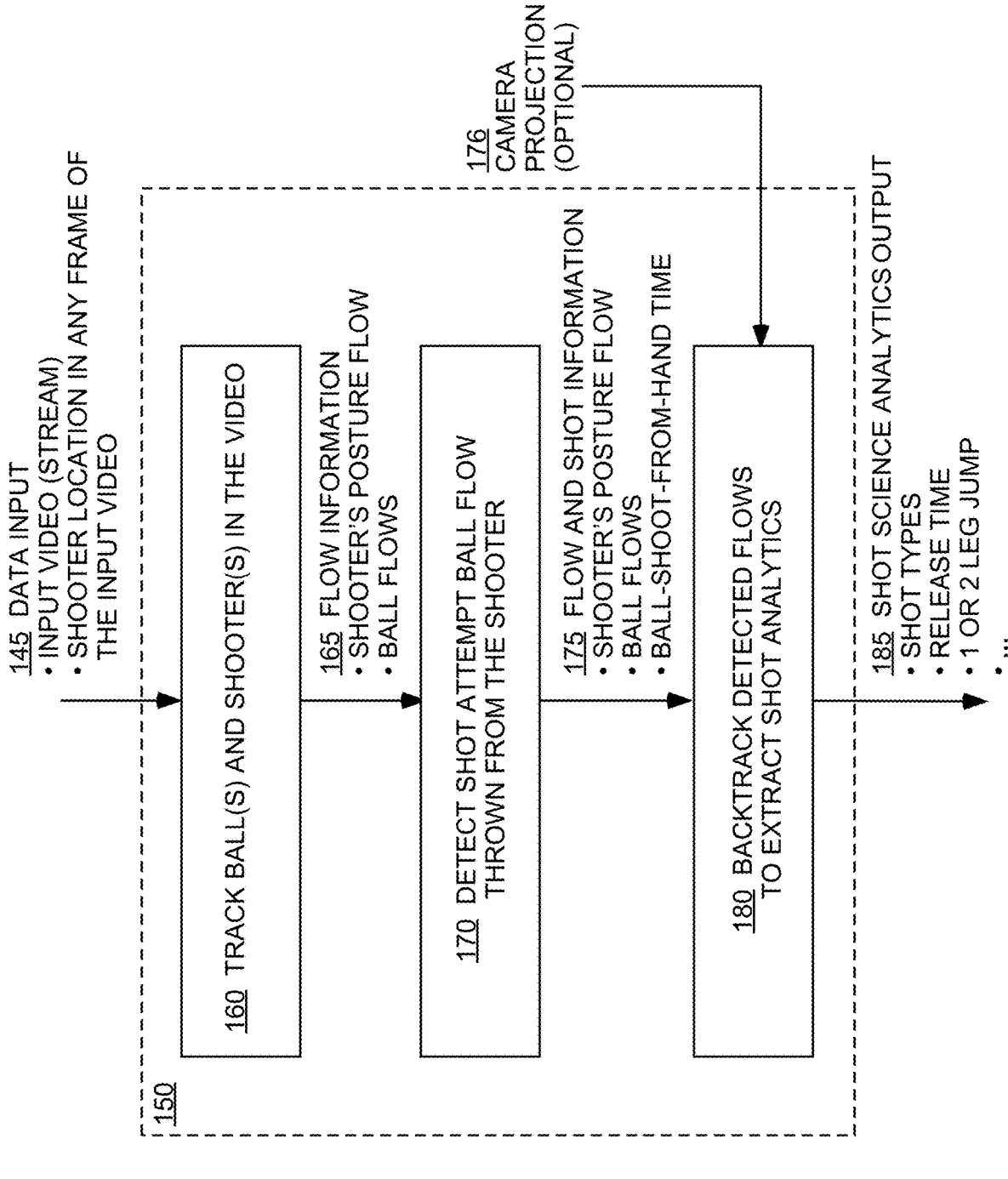

190

145 DATA INPUT
• INPUT VIDEO (STREAM)
• SHOOTER LOCATION IN ANY FRAME OF THE INPUT VIDEO

160 TRACK BALL(S) AND SHOOTER(S) IN THE VIDEO

165 FLOW INFORMATION
• SHOOTER'S POSTURE FLOW
• BALL FLOWS

170 DETECT SHOT ATTEMPT BALL FLOW THROWN FROM THE SHOOTER

175 FLOW AND SHOT INFORMATION
• SHOOTER'S POSTURE FLOW
• BALL FLOWS
• BALL-SHOOT-FROM-HAND TIME

176 CAMERA PROJECTION (OPTIONAL)

180 BACKTRACK DETECTED FLOWS TO EXTRACT SHOT ANALYTICS

185 SHOT SCIENCE ANALYTICS OUTPUT
• SHOT TYPES
• RELEASE TIME
• 1 OR 2 LEG JUMP
• ...

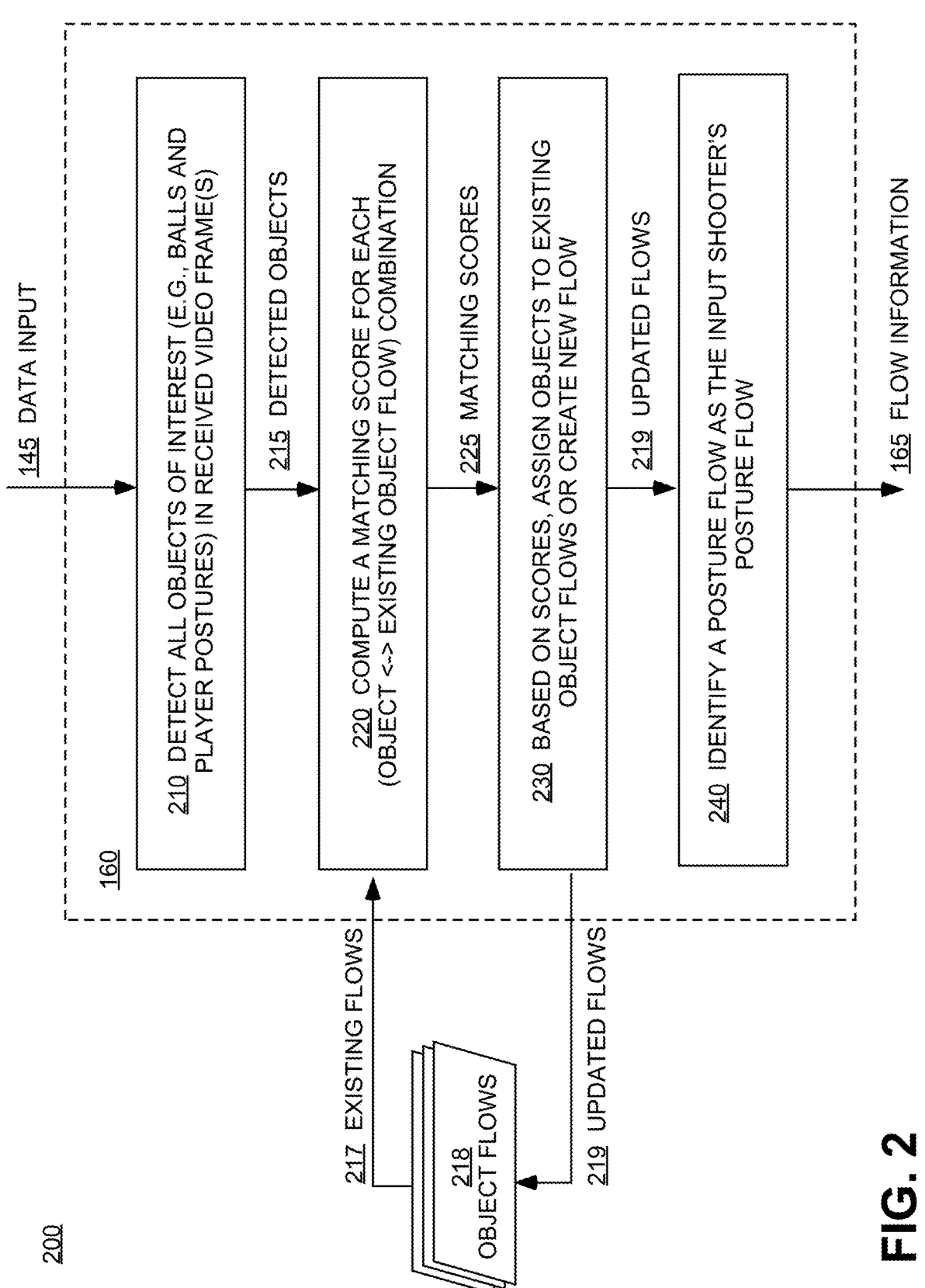

200

160

145 DATA INPUT

210 DETECT ALL OBJECTS OF INTEREST (E.G., BALLS AND PLAYER POSTURES) IN RECEIVED VIDEO FRAME(S)

215 DETECTED OBJECTS

220 COMPUTE A MATCHING SCORE FOR EACH (OBJECT <-> EXISTING OBJECT FLOW) COMBINATION

225 MATCHING SCORES

230 BASED ON SCORES, ASSIGN OBJECTS TO EXISTING OBJECT FLOWS OR CREATE NEW FLOW

219 UPDATED FLOWS

240 IDENTIFY A POSTURE FLOW AS THE INPUT SHOOTER'S POSTURE FLOW

165 FLOW INFORMATION

217 EXISTING FLOWS

218 OBJECT FLOWS

219 UPDATED FLOWS

FIG. 2

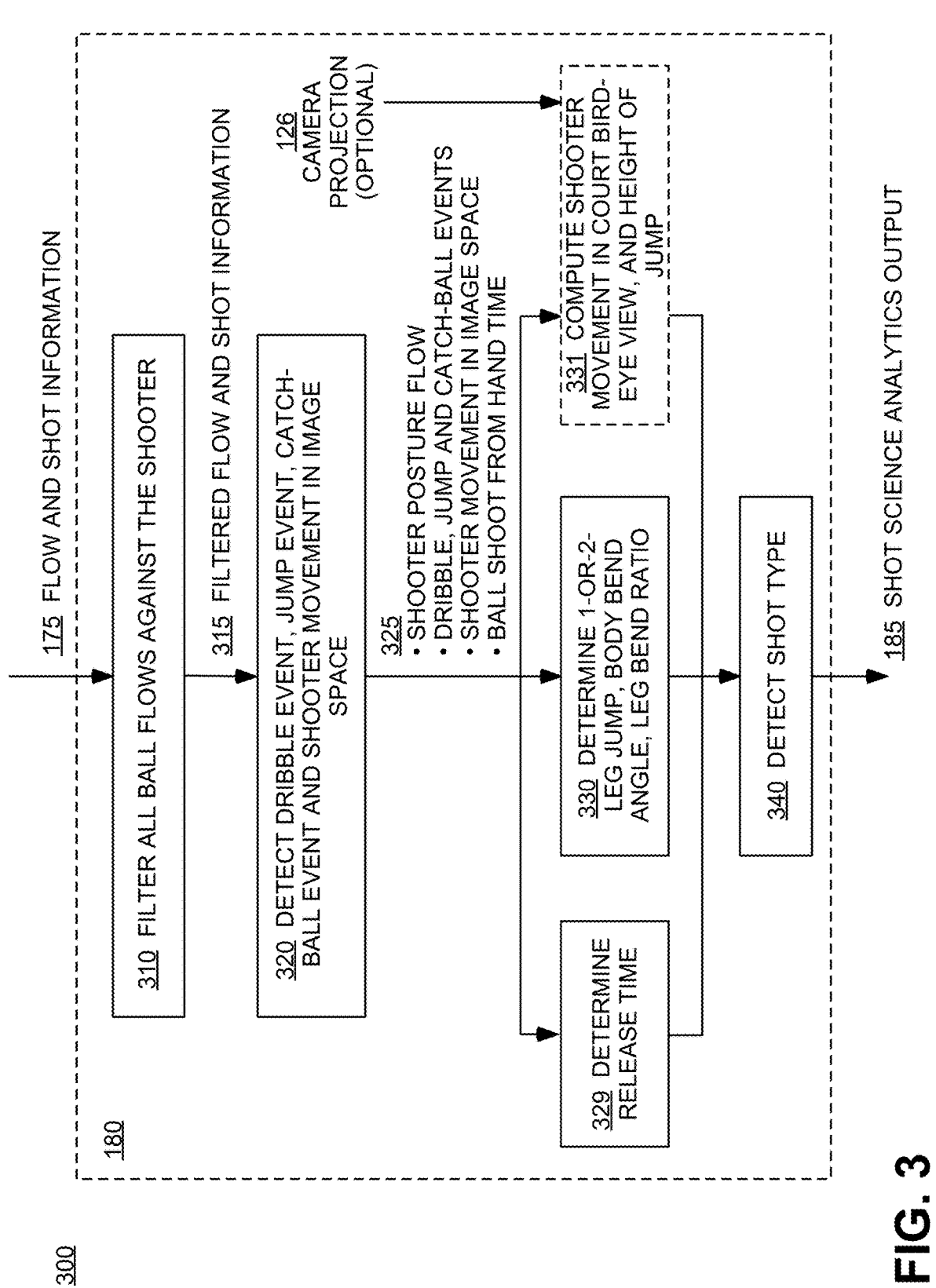

300

180

175 FLOW AND SHOT INFORMATION

310 FILTER ALL BALL FLOWS AGAINST THE SHOOTER

315 FILTERED FLOW AND SHOT INFORMATION

126 CAMERA PROJECTION (OPTIONAL)

320 DETECT DRIBBLE EVENT, JUMP EVENT, CATCH-BALL EVENT AND SHOOTER MOVEMENT IN IMAGE SPACE

325
• SHOOTER POSTURE FLOW
• DRIBBLE, JUMP AND CATCH-BALL EVENTS
• SHOOTER MOVEMENT IN IMAGE SPACE
• BALL SHOOT FROM HAND TIME

331 COMPUTE SHOOTER MOVEMENT IN COURT BIRD-EYE VIEW, AND HEIGHT OF JUMP

329 DETERMINE RELEASE TIME

330 DETERMINE 1-OR-2-LEG JUMP, BODY BEND ANGLE, LEG BEND RATIO

340 DETECT SHOT TYPE

185 SHOT SCIENCE ANALYTICS OUTPUT

FIG. 3

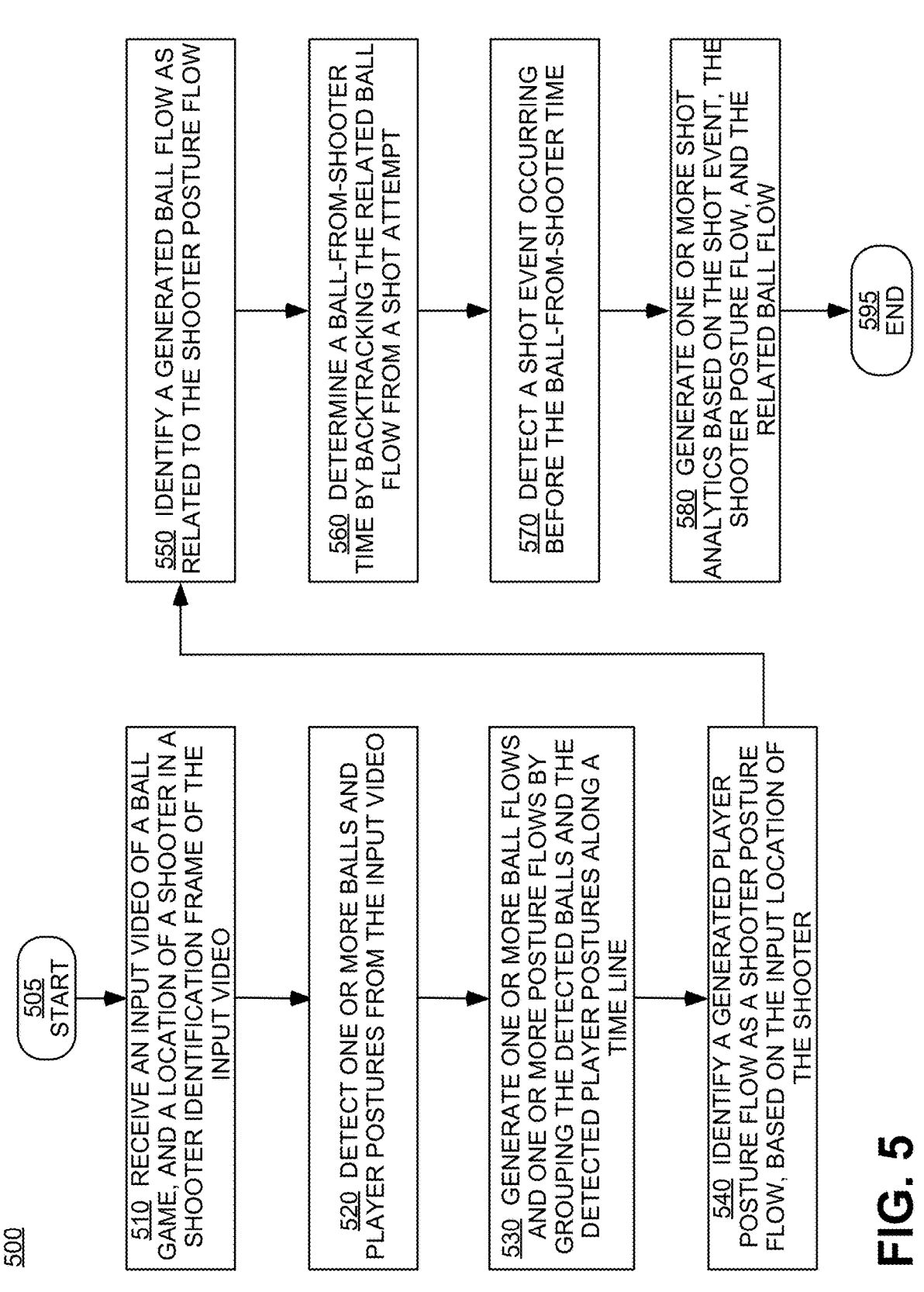

505 START

510 RECEIVE AN INPUT VIDEO OF A BALL GAME, AND A LOCATION OF A SHOOTER IN A SHOOTER IDENTIFICATION FRAME OF THE INPUT VIDEO

520 DETECT ONE OR MORE BALLS AND PLAYER POSTURES FROM THE INPUT VIDEO

530 GENERATE ONE OR MORE BALL FLOWS AND ONE OR MORE POSTURE FLOWS BY GROUPING THE DETECTED BALLS AND THE DETECTED PLAYER POSTURES ALONG A TIME LINE

540 IDENTIFY A GENERATED PLAYER POSTURE FLOW AS A SHOOTER POSTURE FLOW, BASED ON THE INPUT LOCATION OF THE SHOOTER

550 IDENTIFY A GENERATED BALL FLOW AS RELATED TO THE SHOOTER POSTURE FLOW

560 DETERMINE A BALL-FROM-SHOOTER TIME BY BACKTRACKING THE RELATED BALL FLOW FROM A SHOT ATTEMPT

570 DETECT A SHOT EVENT OCCURRING BEFORE THE BALL-FROM-SHOOTER TIME

580 GENERATE ONE OR MORE SHOT ANALYTICS BASED ON THE SHOT EVENT, THE SHOOTER POSTURE FLOW, AND THE RELATED BALL FLOW

595 END

600

620 MODIFIED MOBILENETV2

610 INPUT IMAGE 128X128X3

8x8x96

4x4x64

630 MODIFIED SSDLITE

632 MODIFIED SSDLITE BLOCK INPUT = 8X8X96

634 MODIFIED SSDLITE BLOCK INPUT = 4X4X64

636 OUTPUT = 160X15

810 RAW INFORMATION

| ITEMS | DETAILS | REQUIREMENT |
|---|---|---|
| 812 BALL | 1. DETECT ALL BALLS AND THEIR TRAJECTORIES  2. FIND "SHOT ATTEMPT" BALL TRAJECTORY | |
| 814 SHOOTER | 1. FOLLOWING THE "SHOT ATTEMPT" TRAJECTORY, DETECT POSES IN REGIONS AROUND THE BALL  2. DETERMINE WHICH POSE IS THE SHOOTER AND TRACK | BALL |
| 816 EVENTS | 1. BALL-LEAVE-HAND   3. DRIBBLE  2. JUMP   4. CATCH-BALL | SHOOTER, BALL |
| 818 SCENE | 1. HOOP DETECTION   2. HOW COURT PLACED IN IMAGE | |

860 STATISTICS FOR USERS

| ITEMS | DETAILS | REQUIREMENT |
|---|---|---|
| 862 SHOOTING INFORMATION | 1. RELEASE TIME   4. LEG POWER  2. ONE-OR-TWO LEG JUMP  5. ONE-OR-TWO HAND SHOT  3. BACK ANGLE   6. LEFT-OR-RIGHT HAND SHOT | SHOOTER, EVENTS |
| 864 MOVEMENT | 1. BIRD-EYE-VIEW TRAJ'Y   3. JUMP HEIGHT  2. MOVING SPEED | SHOOTER, SCENE |
| 866 SHOOTING TYPE | 1. LAYUP   5. REGULAR  2. CATCH-AND-SHOOT   6. FLOATER/RUNNER/HOOK  3. ON-THE-MOVE   7. STEP-BACK/JAB  4. OFF-THE-DRIBBLE | EVENTS, MOVEMENT |

FIG. 8

METHODS AND SYSTEMS FOR GENERATING SPORTS ANALYTICS WITH A MOBILE DEVICE

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of sports analysis, and pertain particularly to methods and systems for generating real-time statistical analytics of sports and related games with a mobile device having a camera for video capturing.

BACKGROUND OF THE INVENTION

The statements in this section may serve as a background to help understand the invention and its application and uses, but may not constitute prior art.

Modern computing technology has brought in a new era of rapid real-time analysis of sports activities. Whether it's a viewer watching a game for leisure, a coach analyzing plays to adapt to the opposing team's strategy and examining players'shooting forms to improve success rates, or a general manager compiling data sets across multiple games to optimize player retention strategies, real-time analysis enables thorough quantitative game and shot analysis by granting instantaneous access to statistical data of every single play. Sport analytics have seen uses in applications in training, game strategizing, and team management, yet real-time analytic systems for mass mainstream usage is still complex and expensive. Real-time tracking technology based on image recognition often requires use of multiple high-definition cameras mounted on top of the court for a clear vision, on one or both sides of the court for capturing individual shot processes, data from multiple camera arrays, calibration for different environments, and massive processing power in high-end desktop and/or server-grade hardware to analyze the data from the camera arrays. Accurate tracking of key events throughout the game, such as identifying key players involved with point attempts, identifying locations of such attempts, recognizing the results of such attempts, and analyzing player movements leading up to such attempts, require vast resources including expensive equipment with complicated setups that prevent mass adaptation of real-time sports analytic systems.

Therefore, in view of the aforementioned difficulties, there is an unsolved need to easily and accurately detect key events in ball plays including individual practices and team games, to track relevant locations, to identify the ball and players, and to understand their forms and motions, then to correlate and analyze such information to provide statistical data and/or feedback on player techniques and game play strategies. In addition, it would be an advancement in the state of the art of basketball shot and game play analysis to render real-time game play analysis with high visual fidelity, and to automatically understand different basketball courts, player movements, and to perform self-calibration with minimal user input, while maintaining minimal delay and data transfer overheads, such that the entire system can be implemented on a single mobile device such as a smartphone or a tablet. The same difficulties can be found when analyzing other types of games, including but not limited to baseball, golf, soccer, American football, and so forth.

It is against this background that various embodiments of the present invention were developed.

BRIEF SUMMARY OF THE INVENTION

Some embodiments of the present invention include methods and systems for mobile device-based real-time detection, analysis and recording of basketball shot attempts. The method includes, but is not limited to, the steps of tracking ball(s) and shooter(s) in an input video, detecting shot attempt ball flows, backtracking such shot attempts to determine player forms and ball motions leading up to the shot, and generating shot and/or game analytics for use in individual and team training and game play.

More specifically, in one aspect, one embodiment of the present invention is a method for generating ball shot analytics using a single mobile computing device, comprising the steps of receiving an input video of a ball game and a location of a shooter in a shooter identification frame of the input video, detecting one or more balls and player postures from the input video, generating one or more ball flows and one or more posture flows by grouping the detected balls and the detected player postures along a time line, identifying a generated player posture flow as a shooter posture flow, based on the input location of the shooter, identifying a generated ball flow as related to the shooter posture flow, determining a ball-from-shooter time by backtracking the related ball flow from a shot attempt, determining a shot event occurring before the ball-from-shooter time, and generating one or more shot analytics based on the shot event, the shooter posture flow, and the related ball flow.

In some embodiments, the detecting of the one or more balls and player postures from the input video comprises using one or more Convolutional Neural Network (CNN) modules.

In some embodiments, the method further comprises the step of determining a shot type based on the shot event and the one or more shot analytics.

In some embodiments, the ball game is a basketball game.

In some embodiments, the input video is streamed.

In some embodiments, the detecting of balls and player postures is applied on a skip frame basis. In some embodiments, the detecting of balls and player postures is limited to an image area close to the shooter.

In some embodiments, the generating of ball flows and posture flows comprises applying bipartite matching to detected balls and player postures, respectively, to existing ball flows and posture flows. In some embodiments, the bipartite matching of a detected ball and an existing ball flow comprises computing a matching score between the detected ball and the existing ball flow, and the computing of the matching score comprises the steps of generating a predicted ball comprising a next ball location and a next ball size based on the existing ball flow, and computing the matching score based on a location difference and a size difference between the predicted ball and the detected ball.

In some embodiments, the shooter posture flow is closest to the shooter location in the shooter identification frame when compared to other posture flows.

In some embodiments, identifying the related ball flow comprises applying non-max-suppression to all generated ball flows, where the related ball flow has a score against the shooter posture flow, where the score is computed based on shooter movements, a distance to the shooter, and a confidence value, and where the score is above a pre-defined threshold.

In some embodiments, the method further comprises the step of declaring the shot attempt by determining whether the related ball flow is thrown from the shooter's upper body upward.

In some embodiments, the shot event occurs within a pre-defined time period before the ball-from-shooter time.

In some embodiments, the shot event is selected from the group consisting of dribble event, jump event, catch-ball event, ball-leave-hand event, one-two leg jump, shooter's foot-on-ground movement, and the shot type is selected from the group consisting of layup, regular shot, dribble-pull-up, off-the-move, and catch-and-shoot.

In some embodiments, the shot analytics is selected from the group consisting of release time, back angle, leg bend ratio, leg power, moving speed, moving direction, and height of jump.

In some embodiments, each CNN module has been trained using one or more prior input videos.

In some embodiments, the input video is received from a single mobile device camera.

In another aspect, one embodiment of the present invention is a system for generating ball shot analytics using a single mobile computing device, comprising at least one processor on the mobile computing device, and a non-transitory physical medium for storing program code and accessible by the processor, the program code when executed by the processor causes the processor to receive an input video of a ball game, and a location of a shooter in a shooter identification frame of the input video, detect one or more balls and player postures from the input video, generate one or more ball flows and one or more posture flows by grouping the detected balls and the detected player postures along a time line, identify a generated player posture flow as a shooter posture flow, based on the input location of the shooter, identify a generated ball flow as related to the shooter posture flow, determine a ball-from-shooter time by backtracking the related ball flow from a shot attempt, determine a shot event occurring before the ball-from-shooter time, and generate one or more shot analytics based on the shot event, the shooter posture flow, and the related ball flow.

In some embodiments, the detection of the one or more balls and player postures from the input video comprises using one or more Convolutional Neural Network (CNN) modules.

In yet another aspect, one embodiment of the present invention is a non-transitory physical medium for generating ball shot analytics, the storage medium comprising program code stored thereon, the program code when executed by the processor causes the processor to receive an input video of a ball game, and a location of a shooter in a shooter identification frame of the input video, detect one or more balls and player postures from the input video, generate one or more ball flows and one or more posture flows by grouping the detected balls and the detected player postures along a time line, identify a generated player posture flow as a shooter posture flow, based on the input location of the shooter, identify a generated ball flow as related to the shooter posture flow, determine a ball-from-shooter time by backtracking the related ball flow from a shot attempt, determine a shot event occurring before the ball-from-shooter time, and generate one or more shot analytics based on the shot event, the shooter posture flow, and the related ball flow.

Yet other aspects of the present invention include methods, processes, and algorithms comprising the steps described herein, and also include the processes and modes of operation of the systems and servers described herein. Other embodiments include methods and systems for analyzing games other than basketball. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 1B is a flow diagram providing a process overview of using a mobile device-based system to generate shot analytics, according to one embodiment of the present invention;

FIG. 2 is a flow diagram for a process of generating ball and shooter flows, according to one embodiment of the present invention;

FIG. 3 is a flow diagram for a process of extracting shot analytics, according to one embodiment of the present invention;

FIG. 5 is a flow diagram showing a process for generating a ball shot analytics using a single mobile computing device, according to one embodiment of the present invention;

FIG. 8 provides two tables listing raw information as captured from an input video, and statistics derived from such raw information, according to one embodiment of the present invention;

DETAILED DESCRIPTION OF THE INVENTION

Figure 1A:
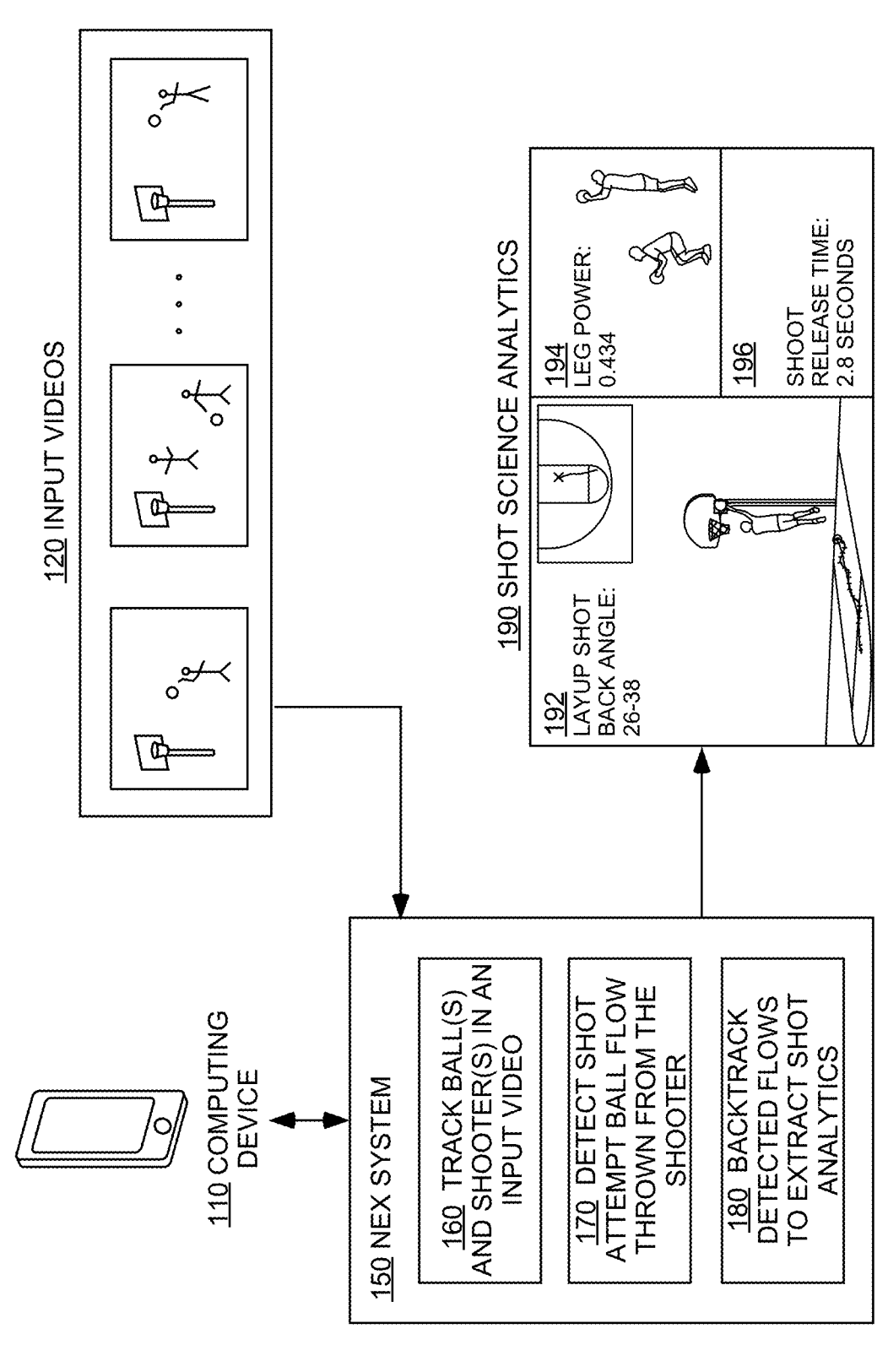
FIG. 1A is an architectural overview of a mobile device-based system used to generate shot analytics, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Overview

Broadly, embodiments of the present invention relate to real-time analysis of sports games, and pertain particularly to methods and systems for basketball shot analysis using mobile devices such as smartphones and tablets.

While it is important to identify the outcome and location of a shot attempt, full understanding of a shot attempt also involves understanding the type of a shot attempt such as catch-and-shoot, dribble-pull-up, and detecting statistics such as release time and angle, and posture statistics such as one-two leg jump, and bend angles in the knee, back, elbow and wrist. While an experienced coach can observe a game play directly or examine a game recording to analyze individual shots manually with very high accuracy, automation of such analysis poses significant challenges in computing process and system design, as no machine can yet replicate the complexity of the human brain. The term analytics generally refer to meaningful patterns, knowledges, and information from data or statistics. In this disclosure, shot analytics refer to quantitative and qualitative characterizations of shot attempts, including but not limited to, shot types, shooter movement patterns, shooter moving speed, moving direction, jump height and type, shot release time and angle, and posture statistics such as body bend angle, leg bend ratio, and leg power.

It would be understood by persons of ordinary skill in the art that the terms "game" and "game play" in this disclosure refer to not only competitive activities involving opposing teams, but also individual and group practice or drilling activities. In other words, embodiments of the present invention may be used for analyzing shot attempts and other aspects of ball sport activities, as long as there is at least one player present on the court being recorded. In addition, it is clear to one of ordinary skill in the art that embodiments of the present invention may be applied to soccer, baseball, football, hockey, and many other types of ball sports in a similar fashion, where ball and player motion and movements may be analyzed individually or collectively to generate shot analytics and/or game analytics.

More specifically, embodiments of the present invention relate to tracking a shot attempt and the corresponding player's motion, form, or posture throughout the shot attempt, in the forward and/or backward direction, and providing analytics relevant to the shot attempt, all by a mobile computing device such as a smartphone. Each step of the shot attempt analysis process as disclosed herein may be performed in real-time, near real-time with delay, or in an off-line fashion, automatically or on demand, and one or more of the steps may be optional. Unlike conventional computer vision-based real-time sports analysis systems that require several high-resolution cameras mounted at specific locations around a basketball court, specialty cameras such as IR cameras and depth cameras, and high-end desktop or server hardware, embodiments of the present invention utilize one or more optimized neural network models to allow real-time analysis of shot attempts on a single mobile computing device, optionally equipped with a simple on-device camera. Neural networks are computer systems inspired by the human brain. They can be viewed as parallel, densely interconnected computational models that adaptively learn through automatic adjustment of system parameters based on training data. Input information are modified based on the system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent.

For the shot analytics generation problem on hand, the limited computational resources in a mobile device present a very unique challenge in the design and use of neural networks. A smartphone's limited CPU processing power is heat-sensitive. CPU clock rate is reduced by the operating system (OS) whenever the phone heats up. Also, when a system consumes too much memory, it can get killed by the OS. Furthermore, it is important to minimize battery consumption by the analytics system. Embodiments of the present invention circumvent the aforementioned limitations to achieve high analytical accuracy with minimal delay and minimal requirement on the amount of input data by deploying novel system designs. In various embodiments, computer vision techniques such as image registration, motion detection, background subtraction, object tracking, 3D reconstruction, cluster analysis, camera calibration techniques such as camera pose estimation, and machine learning techniques such as convolutional neural networks (CNN), are selectively combined to perform high accuracy analysis in real-time on the mobile computing device.

The mobility of and flexibility in mounting a mobile device with a small form factor enables capturing a shot from any angle, although such positional freedom poses additional challenges in processing the captured video data. Embodiments of the present invention can be used in different basketball courts, indoor or outdoor setting, under varying lighting conditions. Embodiments of the present invention are also capable of understanding any typical basketball court with minimal or no user input, support flexible placement of the mobile device, and are resilient to vibration or accidental movements.

To analyze shot attempts, embodiments of the present invention take as an input a shot attempt video, and/or a shooter's image location at any given frame in the video. The input video may be a real-time video stream from a live-camera, or a recorded video. Computer vision techniques such as a convolutional neural network (CNN) may then be applied to some or all frames of the shot attempt video to detect the basketballs, individual players and their postures in the video, close to the supplied shooter. A tracking algorithm may be performed to track all detected balls and postures, where multiple balls or postures may be present in each frame of the shot attempt video, leading to multiple ball flows and posture flows. An object flow consists of object instances from different video frames, and can be viewed as a time-sequence of object positions as traversed by the object. All object instances in the same flow are considered the same object. For example, all instances of a ball having changing spatial locations in some consecutive frames of the video are identified as the same ball and viewed as a ball flow; all instances of a player having changing postures and possibly changing spatial locations in some consecutive frames of the video are identified as the same player, and viewed as a player posture flow. As a game consists of multiple segments of shooting, passing, dribbling, and other individual player moves, actions, or events, for any input video, multiple ball flows and player posture flows may be identified, each having different start and end times, and/or ball or player identities. In addition, a ball trajectory refers to a path in space that a ball flies along after being thrown by a player, possibly towards a goal, such as a hoop in basketball games, or another player, in a passing move. Thus, a ball flow for a shot and a ball trajectory of the shot can be viewed as equivalent and used interchangeably.

With extracted player posture flows in the input video, the supplied shooter's image location in the given video frame may be used to identify the player or shooter of interest and a shooter posture flow. Ball flows may then be compared, matched, or correlated with the identified shooter posture flow to identify one ball flow related to the shooter posture flow. For example, in some embodiments of the present invention, a non-max suppression may be applied to all ball flows against the shooter posture flow to identify the shooter. Once the shooter flow and the related ball flow are identified, these detected object flows can be tracked in a forward and/or backward direction to extract shot analytics.

It would be understood by persons of ordinary skills in the art that the block diagrams, schematics, and flowchart illustrations as presented herein may be implemented in the form of a computer program product, a hardware product, a combination of computer program and hardware product, and/or apparatus, systems, computing devices, and/or the like to execute instructions, operations, process steps as presented. Thus, embodiments of the present invention may be implemented as computer program products comprising articles of manufacture, such as a non-transitory computer-readable storage medium storing program codes, executable instructions, and/or the like. Embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Embodiments of the present disclosure may also take the form of an entirely hardware embodiment, an entirely computer program product embodiment, and/or an embodiment that comprises combination of computer program products and hardware performing certain steps or operations.

NEX, NEX TEAM, and HOMECOURT are trademark names carrying embodiments of the present invention, and hence, the aforementioned trademark names may be interchangeably used in the specification and drawings to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

NEX System Architecture

FIG. 1A is an architectural overview of a mobile device-based system used to generate shot analytics, according to some embodiments of the present invention. More specifically, FIG. 1 is an architectural overview of a computing device-based system for shot analytics generation. A computing device 110 may comprise at least one camera for capturing various image and video footage 120 of game actions, and may implement a NEX system 150 for generating shot analytics 190 such as shot type and back angle 192, leg power 194, and shot release statics 196. Exemplary computing devices include, but are not limited to, dedicated or general-purpose hardware, desktop computers, and mobile computing devices such as smartphones, tablets, laptops, smart watches, and the like. An exemplary system architecture for a computing device is provided in FIG. 26.

In some embodiments, computing device 110 is used for image capturing alone, such as with a point-and-shoot camera or a high-end single-lens reflex camera, while NEX system 150 is implemented separately in a connected hardware system. In other words, NEX system 150 may be implemented directly on computing device 110, or may be implemented in software or hardware connected to computing device 110. In some embodiments, NEX system 150 is a distributed system, where tracking, detection, and analytics services such as 160, 170, and 180 are implemented on physically or logically separate devices. In some embodiments, one or more portions of NEX system 150 may be hosted in the cloud. In yet some other embodiments, more than one instances of NEX system 150 may be networked, for example, to provide game and shot analytics for a competitive game, where two mobile devices are utilized to capture two virtually or physically opposing goals and two halves of a ball court or to provide cross-verification of the analysis results and to facilitate opposing game plays.

Exemplary processes performed by NEX system 150 include retrieving game recordings or shot videos 120 recorded by computing device 110 from local memory or from a remote database. Generally, "receive", "receipt," "retrieve," "retrieval," "acquire," or "access" to or of a video recording refers to the actions of performing read and/or write operations to video content saved in memory, with or without explicit graphical displays on a display device such as a touch screen. In some embodiments, NEX system 150 may perform one or more of step 160 tracking ball(s) and shooter(s) in an input video, step 170 detecting shot attempt ball flow thrown from the shooter, and step 180 backtracking detected flows to extract shot analytics, where shot analytics may be determined based on ball trajectories or flows, and/or player posture flows, as well shot attempt results and locations.

Shot Analytics Generation

FIG. 1B is a flow diagram 190 providing a process overview of using a mobile device-based NEX system 150 to generate shot analytics and statistics, according to one embodiment of the present invention. This exemplary process takes as inputs a video segment or video stream, and/or a shooter's location in any given frame of the video input. Through new and novel methods for computer vision and algorithmic analysis, systems and devices implemented according to embodiments of the present invention extract various shot analytics, including, but not limited to, shot type, release time, release angle, shooter body bend angle, leg bend ratio, moving speed and direction, and height of a jump event. The input video may be a live-stream, or an off-line recording, and may be a single perspective video, also known as a monocular video.

As illustrated by FIG. 1B, to generate basketball shot analytics, a NEX system 150 may execute three main process steps, each process step may be individually or collectively deployed in the form of stand-alone computer programs, modules, components, objects, or other encapsulated or non-encapsulated software, firmware, or hardware units. In this flow diagram and subsequent flow diagrams, process steps as disclosed may be executed as program code by one or more general or special purpose processors, to operate on input data and to generate output data.

At process step 160, upon receiving or retrieving input data 145 including an input video and a shooter location in a shooter identification frame of the supplied input video, ball and shooter tracking is performed to generate object flow information 165, including a shooter posture flow and one or more ball flows. The shooter identification frame may be any frame of the input video. In different embodiments of the present invention, the location of the shooter may refer to a ground location of the shooter's foot, an image location of the shooter within the shooter identification frame, or any other positional information sufficient for identifying the shooter.

Once detected, individual balls and player postures may be grouped along a time line to generate the one or more ball flows, and one or more posture flows, taken into account that an object such as a ball or a player can have only a limited amount of change in position or posture from one video frame to the next. Out of the identified player posture flows, one may be identified as a shooter posture flow, based on the input shooter location. For example, in some embodiments, a generated player posture flow having a player position closest to the shooter location in the shooter identification frame may be taken as the shooter posture flow. Flow diagram 200 in FIG. 2 provides a detailed, exemplary implementation of Step 160.

More specifically, an object flow consists of object instances from different, and possibly consecutive video frames, and can be viewed as a time-sequence of object positions as traversed by the object. Thus, an object flow is a continuous record or tracing of the object in the given input video. All object instances in the same flow are considered the same object, and the changing positions of a basketball in the video is viewed as a ball flow. In other words, all instances of a ball having changing spatial locations in some consecutive frames of the video are identified as the same ball and viewed as a ball flow. The motion of a player in a particular shot or game play is viewed as a shooter flow, player flow, or player posture flow. In other words, all instances of a player having changing postures and possibly changing spatial locations in some consecutive frames of the video are identified as the same player, and viewed as a player flow or a player posture flow. For a player flow representing the player running through the court while dribbling, the player flow may indicate significant changes in player positions from frame to frame; for a player flow representing the player making a jump shot, the player flow may indicate significant changes in player postures from frame to frame. As multiple players and multiple balls may be present in a given video, multiple player flows and multiple ball flows may be identified from the video. In addition, as a game consists of multiple segments of shooting, passing, dribbling, and other individual player moves, actions, or events, for any input video, multiple ball flows and player posture flows may be identified, each having the same or different start and/or end times, and/or ball or player identities.

To generate object flows including ball flows and player posture flows, identification, detection, or extraction of individual objects may be performed first, where each frame of the input video is processed, independently or collectively, by computer vision techniques, such as using one or more Convolutional Neural Network (CNN) modules. Machine learning has had significant impacts on the development of computer vision technologies in recent years. Convolutional Neural Networks utilize the process of convolution to reduce the number of model parameters involved, while successfully capturing the spatial and temporal dependencies in an image.

In a process step 170, a ball flow of a basketball thrown by or from the shooter for a shot attempt is detected or determined. Such a ball flow may be called a shot ball flow. A shot attempt may be declared if a ball is detected as being thrown from the identified shooter's upper body in an upward direction, or if a ball flow is determined to traverse a ball trajectory that come into close proximity of the hoop. The corresponding shot ball flow, in forward time, may cover a period from a time instance at which the ball leaves the shooter's hand, to a time instant at which the ball drops from its trajectory to a position lower than that of a basketball hoop. Once a ball flow is determined at some time instant or video frame number to represent a shot ball flow, this ball flow may be traced back, in reverse time, to the shooter, and to the moment at which the ball touches the shooter's hand. This time instant is at the end of a shooting motion by the shooter, and may be called a ball-shoot-from-hand time, or a ball-from-shooter time. The ball-from-shooter time, together with the identified shooter posture follow and ball flows, may be sent to Step 180 as flow and shot information 175.

In step 180, some or all identified flows may be backtracked from the ball-from-shooter time, for example for a few seconds, to generate or extract shot analytics by detecting ball movements, player postures, and any relevant events leading up to the shot. In some embodiments, a camera projection may be used as an optional input 176 for process step 180, for example to rectify one or more input video frames into a desired perspective. When breaking down the mechanics of shooting techniques, shot quality is critically affected by shooting form, including the position of the body and the ball right before the onset of the shooting process, arm and leg positions, eye focus, as well as arm, wrist, and back angles during the shooting process. Flow diagram 300 in FIG. 3 provides a detailed, exemplary implementation of process step 180.

Several novel approaches enable the applicability of embodiments of the present invention in resource-limited mobile computing devices.

In some embodiments, process steps 160, 170 and 180 may be performed as the input video is streamed. In some embodiments, shot analytics may be computed in process step 180 in real-time, near real-time, or in an off-line fashion as post-processing, depending on the computing device's computation capability. In this disclosure, "real-time" refers to computations done with limited delays as the video is captured by or streamed into the NEX system, "near real-time" refers to computations done with noticeable or significant delays as the video is captured by or streamed into the NEX system, while "off-line" or "post-processing" refers to computations done after the video has been captured, or after the ending of a workout session or game. For example, when the computing device is determined by the NEX system to have high processing power, such as an iPhone XS model, shot science analytics computations may be performed in real time; when the computing device is determined by the NEX system to have average processing power, such as an iPhone 8 model, shot science computations may be performed in near real-time, intermittently, only when the device is not too busy; when the computing device is determined by the NEX system to have low processing power, such as an iPhone 6s model, part or all of shot science computations may be limited to post-processing, where a user waits until the end of a work-out session for the NEX system to generate desired analytics. In some embodiments of the present invention, hyperparameters of the CNNs deployed for object detection may be configured and non-linear layers such as ReLU and pooling layers may be included to help lessen the computational load as well.

In some embodiments, down-sampling of the input video may be performed in temporal and/or spatial domain to lower computation overheads. For example, some embodiments of the present invention keep only a limited number of video frames for backtracking purposes, such as 3 seconds of lower resolution video. In some embodiments, if a second shot happens before the computation for a first shot is completed, the second shot may be skipped to reduce the amount of video storage and computation needed.

FIG. 2 is a flow diagram 200 for a process of generating ball and shooter flows, according to one embodiment of the present invention. This process shown in FIG. 2 is an exemplary implementation of step 160 in FIG. 1B. Four sub-steps are carried out to track balls and a shooter from data input 145, which comprises an input video and a shooter location.

In process step 210, objects of interests are detected from frames of the input video. In particular, one or more convolutional neural networks (CNN) may be applied to identify desired objects including balls and players in the input video, and the detected objects are passed as input 215 to process step 220. Each CNN module may be trained using one or more prior input videos. In individual training sessions, only a single player is present, although multiple balls may be moving through the court if a basketball shooting machine is used. In multiple-player training sessions or games, multiple players and multiple balls may be present. A CNN utilizes the process of convolution to capture the spatial and temporal dependencies in an image, and to extract features from the input video for object detection. Feature extraction in turn enables the segmentations or identifications of image areas representing balls and players, and further analysis to determine player body postures. A ball moves through space, leading to changing size and location from video frame to video frame. A player also moves through space while handling the ball leading to both changing locations, sizes, and body postures.

In computer vision, pose or posture estimation is the task of identifying or detecting the position and orientation of an object in an image, relative to some coordinate system. This is generally formulated as the process of determining keypoint locations that describe the object. In the case of a ball, pose estimation may refer to determining the center and radius of the ball in the image plane. Hand pose estimation, on the other hand, is the process of determining finger joints and fingertips in a given image, where the whole hand is viewed as one object. Head pose estimation is the process of determining and analyzing facial features to obtain the 3D orientation of human head with respect to some reference point. Human pose estimation is the process of detecting major part and joints of the body, such as head, torso, shoulder, ankle, knee, and wrist. In this disclosure, "player posture" and "player pose" are used interchangeably to refer to either or both of the image of a human player segmented from the input video, and a set of keypoints extracted from the image to represent body pose or posture. In addition, instead of only determining whether an object such as a ball or a player is present in a given video frame, object detection or extraction in the present disclosure refers to determining the relative position, size, and/or pose of a ball, player, or other entities of interest.

In some embodiments, the object detection process is applied on a skip frame basis. In some embodiments, only image areas close to the input shooter location is passed through the CNN to reduce the overall computational load to the system.

In process steps 220 and 230, object flows are established by grouping detected objects along a time line. It is easy to see that object movements across frames are continuous in the sense that object locations can only change in small increments from one video frame to the next. Thus, detected objects may be grouped based on location information into one or more object flows. In the exemplary implementation shown in FIG. 2, object flows are established by computing a matching score for each object and existing object flow combination in step 220, and the matching scores are sent as input 225 to step 230, for assigning objects to existing object flows, or to create a new object flow. Iterating through all detected objects, one or more existing object flows 217 are retrieved from memory 218 for this matching process, and one or more corresponding updated flows 219 are saved subsequently. In some embodiments, updated flows 219 may be sent to process step 240 as updates occur. At the beginning when no object flows yet exist, an initialization process (not explicitly shown here) may be performed based on an initial collection of a small number of objects, detected with high accuracy. In addition, a new flow may be created if the detected object does not match to any existing flows with a high score.

In various embodiments of the present invention, different approaches may be taken to compute matching scores. Following is an example that illustrates one possible approach.

To compute a ball <-> ball flow score, the next ball location and size may first be predicted based on an existing ball flow. In one example, the last ball in the existing flow may be taken as the predicted ball. In another example, the last two or more balls in the flow may be extrapolated to generate a predicted location and size pair. A matching score may then be computed by considering the location difference and the size difference between the ball-flow ball prediction and the real ball observation being matched to the ball flow.

To compute a posture <-> posture flow score, a similar approach may be utilized. Since a player posture object is visually much more complex than a ball object, a predicted posture may be compared to an extracted player posture based on multiple factors such as key point distance, size difference, and visual feature differences. While each detected posture is defined by the same set of key points, when matching a player posture to an existing posture flow, some or all key points may be considered. To compare size differences, the size of a posture may be computed by considering limb lengths. To compare visual feature differences, a visual feature of a posture may be computed by sampling pixel colors of specific locations, such as back, hip, and, shoulder, or on interpolated points in-between key points, such as along the limbs.

Once objects 215 are extracted from the input video, in some embodiments, bipartite matching may be applied. For example, if M balls are detected in a video frame, and N ball flows are available for ball assignment, a total of M×N matching scores may be computed in process step 220 to compute matching scores 225. In process step 230, for each (object, object flow) combination, also represented as "object <-> object flow" to indicate an object instance and object flow instance combination, the following conditions may be applied in some embodiments to determine object assignments: when M objects and N object flows are available for assignment, if the m-th object and the n-th object flow combination already exists in any confirmed combination, where $1 \leq m \leq M$, and $1 \leq n \leq N$, this combination is skipped. Otherwise, the (m-th object, n-th object flow) combination is confirmed, indicating that the m-th object is assigned to the n-th object flow.

In some embodiments, the computation for player posture matching may be reduced by using the known shooter location in data input 145 as an initialization for a player flow, where detected player postures in other video frames are matched to this existing player flow if the matching score is high, and discarded if the matching score is very low.

When multiple players are present on the court, multiple player posture flows may result from step 230. Updated flows 219 are then passed to process step 240, to identify one of the posture flows as the shooter's posture flow. More specifically, all posture flows and the shooter's location as supplied by the shooter identification frame may be used as inputs to an algorithm that identifies a posture flow where the posture's location is closest to the shooter's location in the shooter identification frame, for example, by means of a highest overlapping area. This posture flow may then be chosen as the shooter's posture flow. In the case where the shooter location is used to initialize a posture flow in step 230, this posture flow may be identified as the shooter posture flow in step 240 directly.

Once ball flows and the shooter's posture flow are identified, process step 170 in FIG. 1B is performed to detect a shot attempt ball flow thrown from the shooter and to determine the ball-shoot-from-hand time or ball-from-shooter time. This ball-from-shooter time, together with the identified shooter posture flow and ball flows, make up the flow and shot information 175.

FIG. 3 is a flow diagram 300 for a process of extracting shot analytics, according to one embodiment of the present invention. The process shown in FIG. 3 is an exemplary implementation of process step 180, backtracking detected ball and shooter flows from the ball-from-shooter time to extract shot analytics. In this exemplary embodiment, several sub-steps are carried out.

In process step 310, all ball flows are first filtered against the shooter flow, for example, by applying non-max-suppression. More specifically, a score for each ball flow may be computed against the shooter posture flow. If there are M ball flows, M scores may be computed. In a descending order of the scores, for each ball flow, if the ball flow has a significant portion overlapping in time and space with any confirmed ball flow, the ball flow may be skipped. If the score is high enough and above a pre-defined threshold, the ball flow may be confirmed as related to the shooter.

A ball flow against shooter posture flow score may be computed based on one or more of the following factors in various embodiments of the present invention: movements, distance to the shooter, and CNN detection confidence. A higher score may be assigned if more movement is detected, if the distance to the shooter is smaller, and if the CNN detection result is more confident.

With filtered flow and shot information 315, the NEX system may apply the remaining process steps in FIG. 3 to determine one or more shot events occurring before the ball-from-shooter time, and to generate one or more shot analytics 185 based on the one or more shot events, the shooter posture flow, and the related ball flow. In this disclosure, a "shot event" refers to player actions leading up to a shot attempt. That is, a shot event describes player movements before the ball leaves the shooter's hand in a shot attempt. A shot event may occur right before a shot is launched, or some time shortly before the shot is launched.

In process step 320 shown in FIG. 3, several exemplary shot events are detected, for example, a dribble event, a jump event, a catch-ball event, as well as shooter movement in image space. Detected shot events, shooter movement in image space, shooter posture flow, and ball-shoot-from-hand time are used as input 325 to further processing steps 329, 330 and optionally 331, to determine one or more shot analytics.

Following is a list of exemplary shot events and analytics that may be extracted from the filtered flow and shot information. This list is not exhaustive, and only serves to illustrate how some exemplary shot events and shot analytics may be generated, according to some embodiments of the present invention.

Shot attempt event: may be identified by detecting a related ball flow leaving the shooter's hands with an upward movement.

Ball-leave-hand event: may be identified by detecting in which frame the ball leaves the shooter's hand.

Catch-ball event: may be identified by determining the ball flow, if any, that involves a ball being thrown towards the shooter. Some embodiments of the present invention may further distinguish a dribbling ball flow, a ball-already-in-possession ball flow from a ball-passing-to-shooter ball flow.

Dribble event: may be identified by determining a ball flow that bounces vertically near the shooter's foot location.

Jump event: may be identified by analyzing vertical movements of the shooter's foot.

Release time: may be computed as the time between a ball-leave-hand event and the latter of a dribble event and a catch-ball event.

Shooter's foot-on-ground movement: may be determined by extracting foot locations of the tracked shooter when the shooter is not jumping, such as before a detected jump event.

One-or-two-legs jump: may be determined by analyzing the shooter's posture around a jump event period.

Height of jump: may be determined by analyzing the shooter's foot location elevation around a jump event period.

Body-bend angle: may be approximated by analyzing the shooter's posture during a shot attempt period.

Leg-bend ratio: may be approximated by analyzing the shooter's posture during the shot attempt period.

Shot type: such as catch-and-shoot, dribble-pull-up, may be determined by applying heuristics upon information as collected in events disclosed above.

As detailed examples, process steps 320, 329, 330, and 331 are discussed in more detail below.

In process step 320, one or more shot events are determined, as well as shooter movements in image space.

Examples of shot events include, but are not limited to, dribble event, jump events, and catch-ball event. To detect a dribble event, a score may be calculated for each frame, based on the ball's distance to the shooter's foot location, either in 2 dimensional (2D) space, or along the Y-axis only of a 3 dimensional (3D) space. The smaller the distance, the higher the score may be. In some embodiments, the Y-axis in 3D space is in the vertical direction perpendicular to the ground plane; the X-axis is parallel to the end line, and the Z-axis is parallel to the sidelines. If the score is high enough and a local peak is present in a short time period, a dribble event may be declared.

To detect a jump event, back-tracking from the ball-shoot-from-hand time may be performed. For every frame, foot movement from the previous frame may be calculated. By observing a change of velocity along the Y-axis, and noticing a significant deceleration or low enough velocity, a jump event may be detected.

To detect a catch-ball event, for each frame, a catch-ball score may be calculated using ball(s) in the ball flow related to the shooter in that frame. This score may be computed from the oldest frame to the latest frame in a given time period, such as a 2-second period. A catch-ball event may be detected when the score of one frame or the average score of consecutive frames is high enough. Each score may be calculated based on the ball's distance to the shooter in the corresponding frame, where a higher score is achieved when the ball is farther away. However, if the ball is near the shooter within a small period in previous frames, the score may be reduced to reject the case where the ball is going away from the shooter. Thus, even if the ball is far away, it may still be assigned a low score for a catch-ball event because it is going away from the shooter.

To detect shooter movement in an image, the shooter's movement, or movement of the shooter's foot in the image space may be computed by examining the shooter's foot location as obtained from his or her posture. To compensate for posture inaccuracy or occlusion, each frame's shooter location or foot location may be smoothed as a weighted or unweighted average or median over a sliding time window. For example, similarity of posture sizes may be used as weights for the smoothing process, and x and y values of the locations may be smoothed separately.

In process step 329, a release time is determined, based on shot events generated in step 320, such as a catch-ball event and one or more dribble events. For example, the release time may be computed by choosing the latter of a catch-ball event and the last dribble event, and by calculating the time between this chosen event and the ball-shoot-from-hand time. If neither catch-ball event nor dribble event exists in the given time period such as 2 seconds, release hand time may be too long to be relevant, thus does not need to be computed.

Figure 13B:
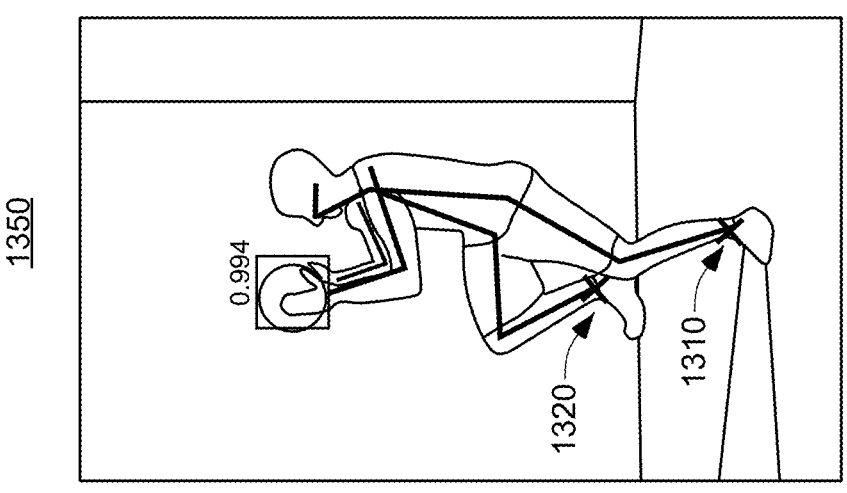
FIGS. 13A and 13B show image captures from the input shot attempt video in FIGS. 9A to 9G, illustrating a one-leg jump and a two-leg jump, according to one embodiment of the present invention.
Figure 13A:
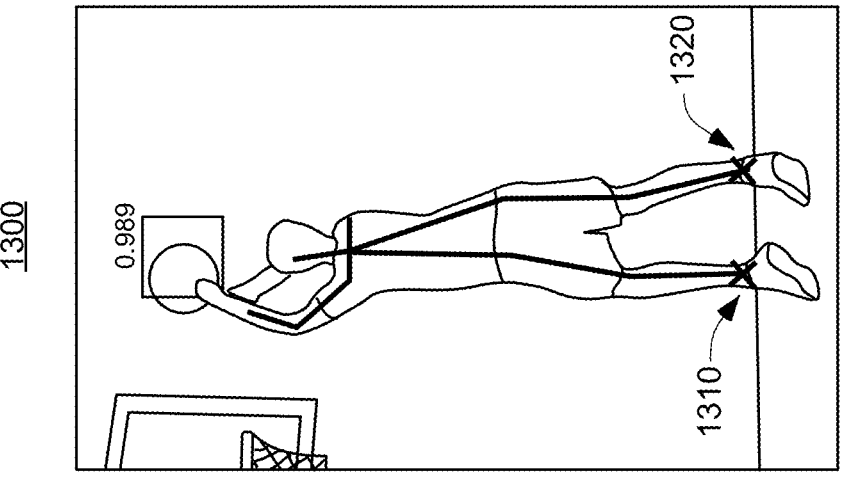

In process step 330, whether a jump is a one-or-two-leg jump or one-two jump is determined, as well as body-bend angle and leg-bend ratio. A jump event may be classified as a one-leg jump or a two-leg jump. With the shooter's posture flow and the jump event as input, the lower limbs of the posture may be analyzed, where the angle between the left and right thighs, and the angle between the thighs and shanks may be used in the classification process. FIGS. 13A and 13B compare a two leg jump to a one leg jump.

To determine a body bend angle for each frame, the longest body in the posture flow amongst the frames around a jump event may be used first to determine a full body length. Two intermediate angles may then be calculated: a depth bend angle, by a ratio of body length in a frame to the full body length, and an image bend angle, by using the angle of the body against the y-axis of the image. These two intermediate angles may then be combined to compute the body bend angle in 3D space.

To determine a leg bend ratio, the longest leg length in the posture flow among the frames around the jump event may be used as a full leg length. A leg bend ratio may then be computed as the ratio between the hip-ankle distance and the full leg length.

In process step 331, shooter movement in court bird-eye view and height of a jump may be optionally determined. For shooter movement in court bird-eye view, a camera projection or homograph of the court perspective may be applied to shooter foot location in image space, on a frame by frame basis. To detect the height of a jump, a largest displacement of the foot location of the shooter posture flow after a jump event may be obtained first. This displacement may be viewed as the height of the jump in the 2D space or in the image plane. The camera projection may then be used to locate the jump point on the ground in 3D space. Binary search of the height of the jump in 3D space may be performed, by using the height to elevate the jump point, and back-projecting the elevated point to 2D space to match the 2D space height of the jump. Alternatively, a 3D height of jump may be computed directly using a closed-form formula based on the camera projection, the 2D height of jump, and jump location.

In process step 340, different shot types or shooting types may be identified. Inputs to this process include one or more of previously detected shot events, previously determined shot analytics, and optionally movement in court bird-eye. Shot types include, but are not limited to, catch-and-shoot, dribble-pull-up, and layup shots. Shot types may be viewed as a category of qualitative shot analytics.

Figure 4:
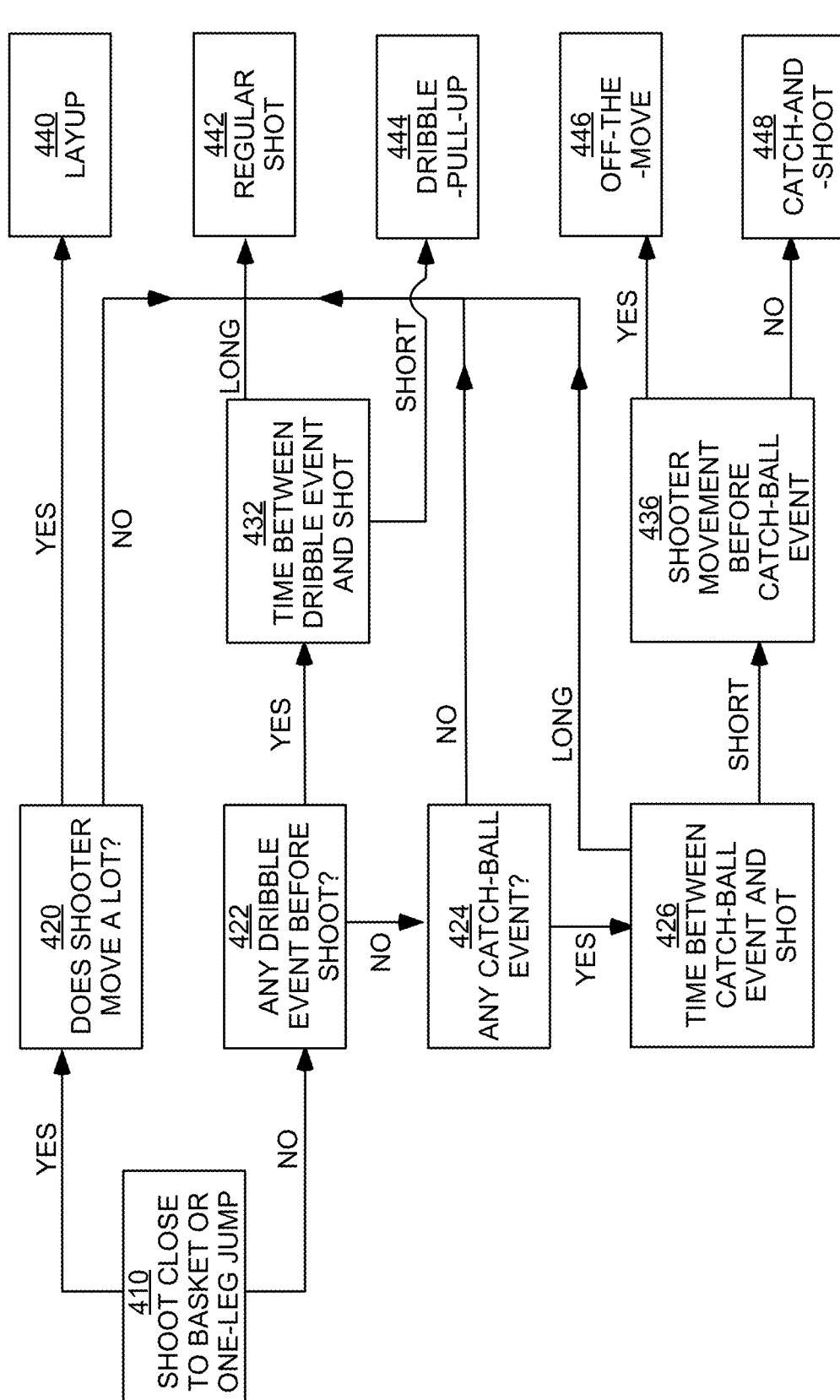
FIG. 4 is a diagram showing an exemplary heuristic-based classification logic for shot types, according to one embodiment of the present invention.

FIG. 4 is a diagram 400 showing an exemplary heuristic-based classification logic for shot types, according to one embodiment of the present invention. For ease of readability, decision boxes are drawn as rectangles.

In this embodiment, a given shot is classified into one of five shot types, including layup 440, regular shot 442, dribble-pull-up 444, off-the-move 446, and catch-and-shoot 448. Given a detected shot, the shot is first examined to see whether it is close to the basket or is a one-leg jump (see boxes 410 and 420). If the answer is affirmative and the shooter is observed to move a lot, the shot is classified as a layup. On the other hand, if the shooter did not move too much (see box 420), the shot is classified as a regular shot.

Similarly, a shot that is far away from the basket and not a one-leg jump (see box 410), with dribble event before the shot (see box 422), and time between dribble event and shot being long (see box 432), is classified as a regular shot as well. A shot that is far away from the basket and not a one-leg jump (see box 410), with dribble event before the shot (see box 422), and time between dribble event and shot being short (see box 432), is classified as a dribble-pull-up.

On the other hand, a shot that is far away from the basket and not a one-leg jump (see box 410), with no dribble event before the shot (see box 422), and no catch-ball event (see box 424) is classified as a regular shot. A shot that is far away from the basket and not a one-leg jump (see box 410), with no dribble event before the shot (see box 422), but has a catch-ball event with a long time period between the catch-ball event and the shot (see boxes 424 and 426), is also classified as a regular shot. A shot that is far away from the basket and not a one-leg jump (see box 410), with no dribble event before the shot (see box 422), but has a catch-ball event with a short time period between the catch-ball event and the shot (see boxes 424 and 426), is classified into either an off-the-move or a catch-and-shoot, depending on if shooter movement is present before the catch-ball event (see box 436). Heuristic conditions as given in FIG. 4 may be quantized differently in different embodiments of the present invention. For example, the condition "does shooter move a lot" may be quantized with an appropriate numerical movement threshold, and "time between dribble event and shot" may use a time threshold to distinguish a long and a short period.

While not shown explicitly in FIGS. 1A to 4, different implementations of the present invention may utilize one or more existing software modules such as CoreML for CNN object and key point detection, SceneKit for rendering an AR court, and CoreMotion for understanding a mobile device's orientation.

FIG. 5 is a flow diagram 500 showing a process for generating a ball shot analytics using a single mobile computing device, according to some embodiments of the present invention. The process as disclosed may be implemented by a NEX system on the single mobile device. Upon initiation at step 505, at step 510, an input video of a ball game and a location of a shooter in a shooter identification frame of the input video are received; at step 520, balls and player postures are detected from the input video; at step 530, one or more ball flows and one or more posture flows are generated by grouping the detected balls and the detected player postures along a time line; at step 540, a generated player posture flow is identified as a shooter posture flow, based on the input location of the shooter; at step 550, a generated ball flow is identified as related to the shooter posture flow; at step 560, a ball-from-shooter time is determined by backtracking the related ball flow from a shot attempt; at step 570, a shot event occurring before the ball-from-shooter time is detected; at step 580, one or more shot analytics are generated based on the shot event, the shooter posture flow, and the related ball flow. The process ends at step 595.

Figure 6A:
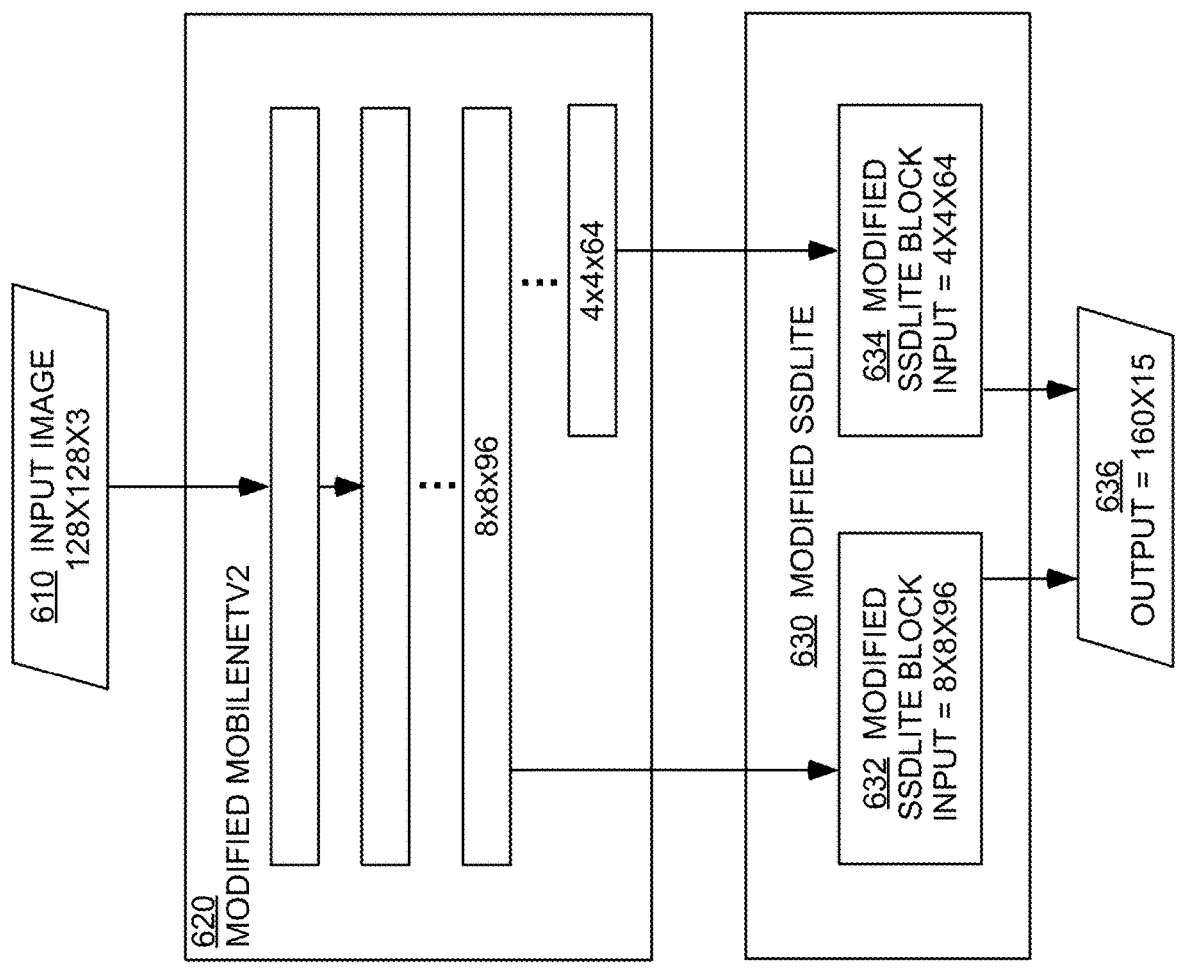
FIG. 6A is a block diagram of an exemplary neural network for ball detection, according to one embodiment of the present invention.
Figure 6B:
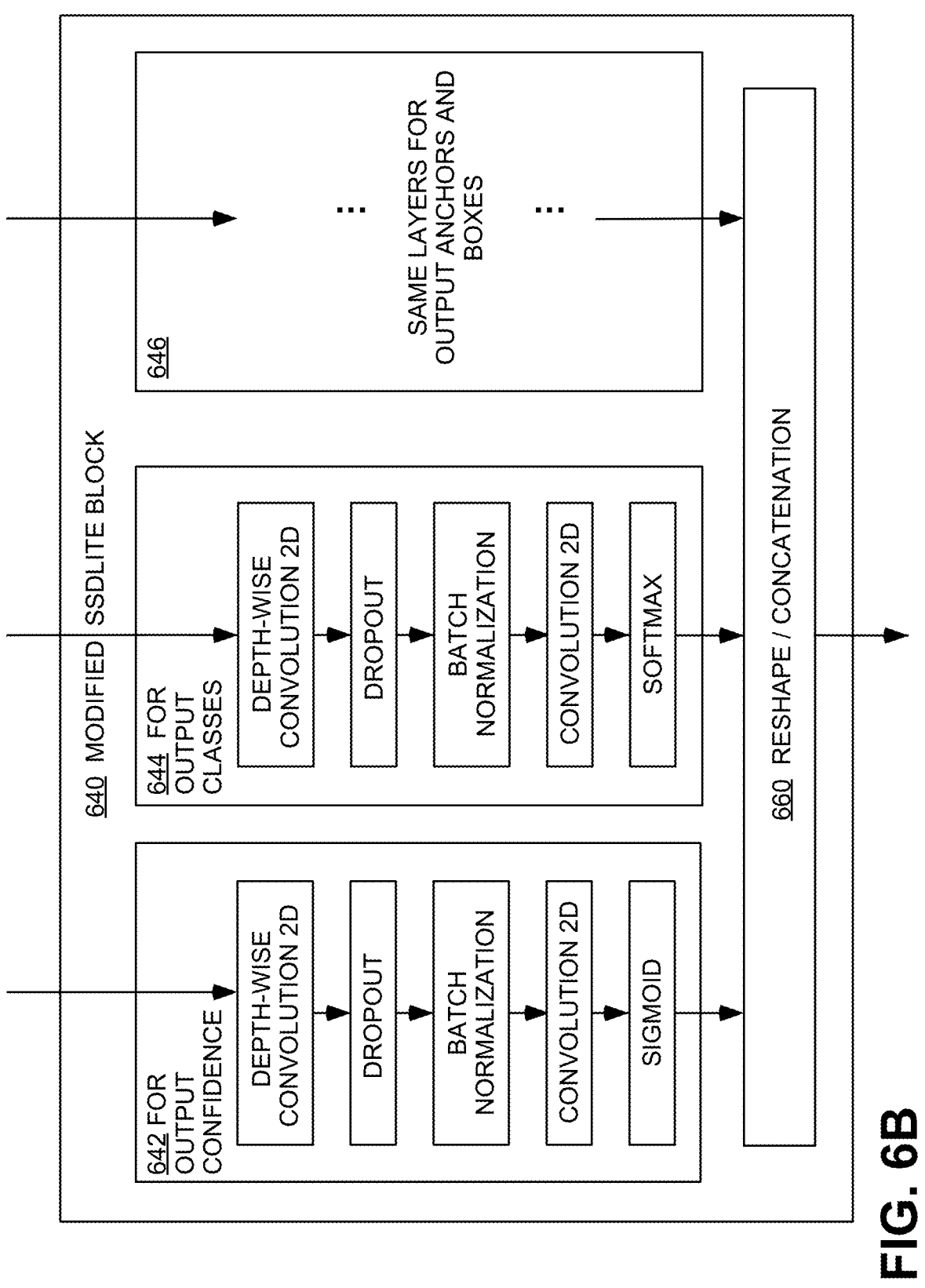
FIG. 6B is a detailed block diagram illustrating an exemplary Modified SSDLite Block, according to one embodiment of the present invention.

As exemplary implementations of ball and player detection process steps 210 in FIGS. 2 and 520 in FIG. 5, FIGS. 6A and 6B illustrate a CNN-based ball detector, while FIGS. 7A to 7E illustrate a CNN-based multi-person pose estimator utilizing part affinity fields. These two object detectors are presented for illustrative purposes only, and some embodiments of the present invention may utilize other computer vision system designs for object detection.

FIG. 6A is a block diagram 600 of an exemplary neural network for ball detection, according to some embodiments of the present invention. In particular, FIG. 6A shows a CNN-based ball detector utilizing an optimized, modified MobileNetV2 framework as a feature extractor and a modified SSDLite framework for multi-scale object detection. An input image 610 is first processed through a Modified MobileNetV2 block 620, the output of which is processed through a Modified SSDLite module 630 comprising two Modified SSDLite blocks 632 and 634, to generate output 636. The input, output, and kernel sizes are shown in FIGS. 6A to 7E are for illustrative purposes only, and other similar hyperparameter values may be used in various embodiments of the present invention.

MobileNetV2 is an efficient convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 6A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific small input and ball detection goal.

FIG. 6B is a detailed block diagram illustrating an exemplary Modified SSDLite Block, such as 632 or 634 in FIG. 6A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 640 shown in the exemplary embodiment of FIG. 6B further tailors and improves the accuracy of SSDLite by adding dropout layers.

More specifically, in Modified SSDLite Block 640, parallel network blocks 642, 644, and 646 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 660 to generate output data.

For the ball detection task, two positive object classes may be considered: "ball" and "ball-in-hand." With conventional SSD or SSDLite framework, a single softmax function may be used to activate among background (e.g., no positive), and these two classes. By comparison, Modified SSDLite Block 640 is designed so that it may classify a ball out of a background, but does not always classify between ball and ball-in-hand for some training data. Such a design takes into account several factors. First, ball and ball-in-hand are not always distinguishable, even for a human. In addition to motion blur, background and other objects such as leg, arm, other people in the background could look like a hand in terms of shape and/or color. Second, having a classifier distinguish between ball and ball-in-hand may not always be worthwhile and may even compromise detection accuracy since there are "gray areas" where an input may be classified either way. Instead, within Modified SSDLite Block 640, a sigmoid function is used to produce confidence levels of whether a ball is present against a background, while a softmax function is used to classify between ball and ball-in-hand, or two output classes instead of three output classes for conventional SSD/SSDLite frames. As a further reduction to computational complexity, loss function and/or back propagation may be disabled if a given training case is in the "gray area."

Figure 7A:
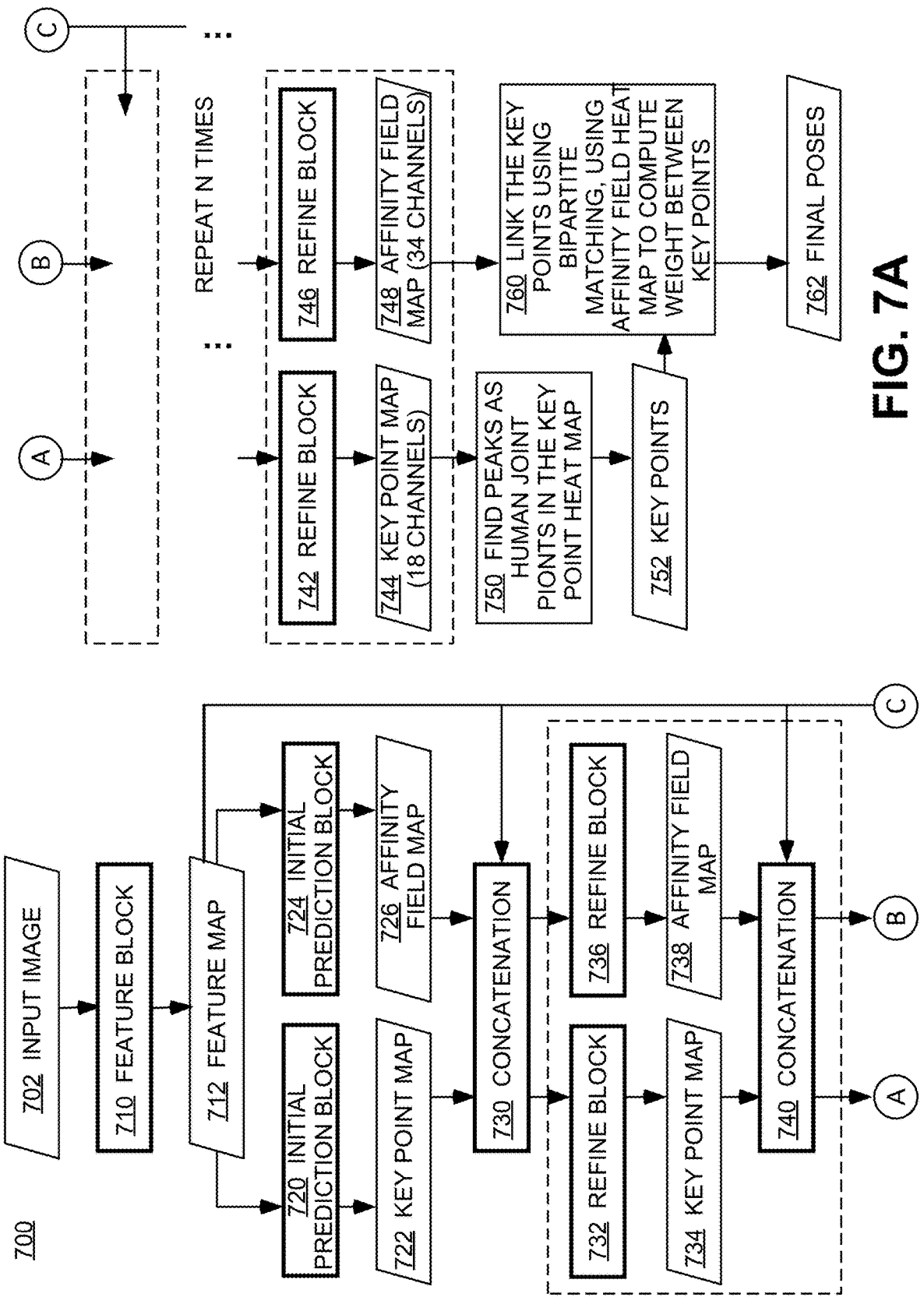
FIG. 7A is a block diagram of an exemplary neural network for pose estimation, according to one embodiment of the present invention.

FIG. 7A is a block diagram 700 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 7A performs the following steps to estimate the pose of one or more persons in an input image:

1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 702 is first passed through a feature block 710 to generate a feature map 712. Initial prediction blocks 720 and 724 then extract a key point map 722 and an affinity field map 726, respectively. A concatenation operation 730 is performed before further refinements are carried out in multiple iterations. For each stage of iteration, refine blocks such as 732, 736, 742, and 746 predict refined key point maps such as 734 and 744, and affinity field maps such as 738 and 748, respectively. Concatenation operations such as 740 are performed to generate input for the next stage. A total of N refinements may be carried out. For example, N may equal to 5 in some embodiments of the present invention. After the last refinement stage, key point heat map 744 is examined in step 750 to find peaks as human joint points or key points 752. Such key points may be linked in step 760 to generate final poses 762, by performing bipartite matching using affinity field heat map 748 to compute weights between key points. In this illustrative example, key point map 744 may comprise 18 channels, while affinity field map 748 may comprise 34 channels.

Figure 7C:
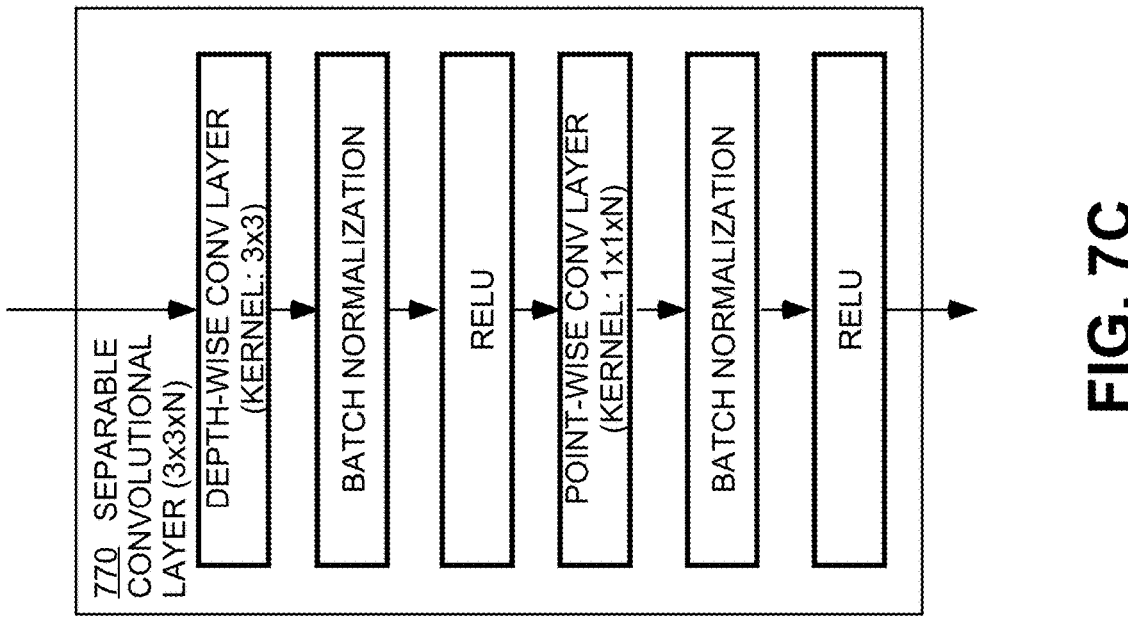
FIG. 7C is a detailed block diagram illustrating an exemplary separable convolutional neural network layer, according to one embodiment of the present invention.
Figure 7B:
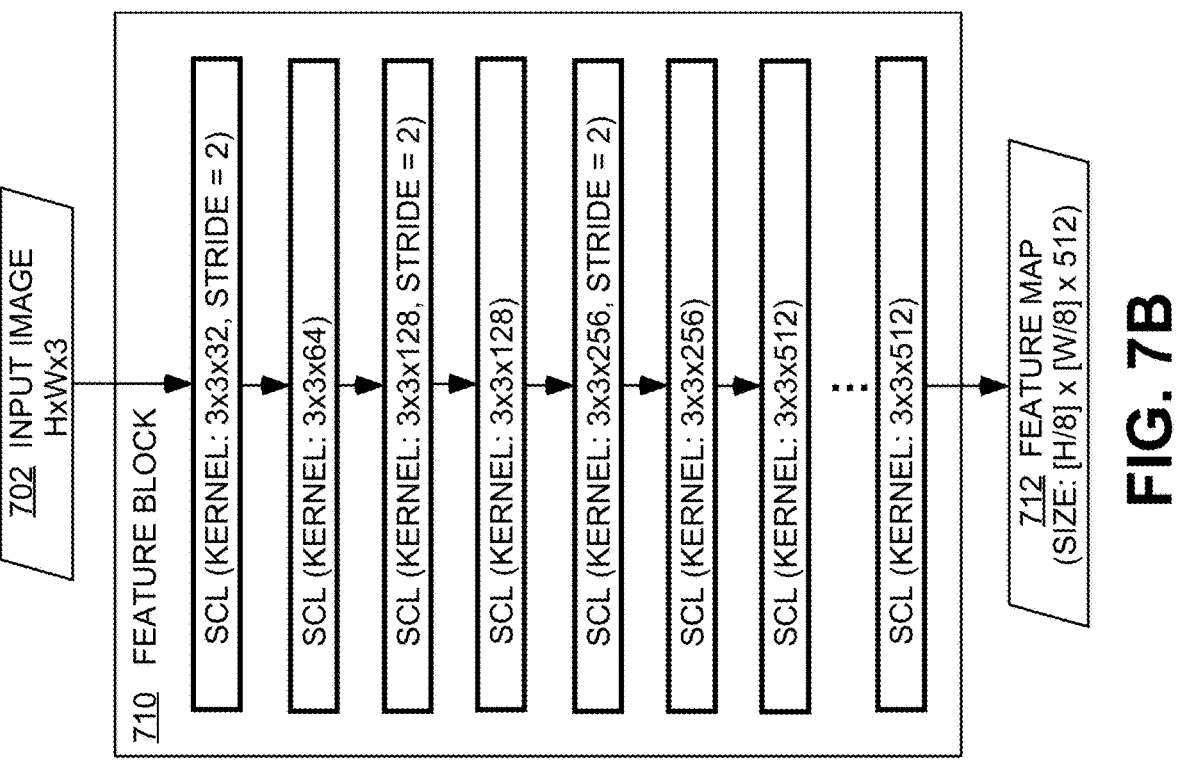
FIG. 7B is a detailed block diagram illustrating an exemplary Feature Block, according to one embodiment of the present invention.

FIG. 7B is a detailed block diagram illustrating an exemplary Feature Block 710, according to some embodiments of the present invention. In this example, separable convolutional layers (SCL) are deployed with different kernel and stride sizes.

Correspondingly, FIG. 7C is a detailed block diagram illustrating an exemplary separable convolutional neural network layer 770, according to some embodiments of the present invention. As discussed previously, a depth-wise separable convolution or a separable convolution layer factorizes the standard convolution into a depth-wise convolution and a point-wise convolution. Batch optimization and ReLU blocks further help improve the accuracy and performance of the network layer.

Figure 7E:
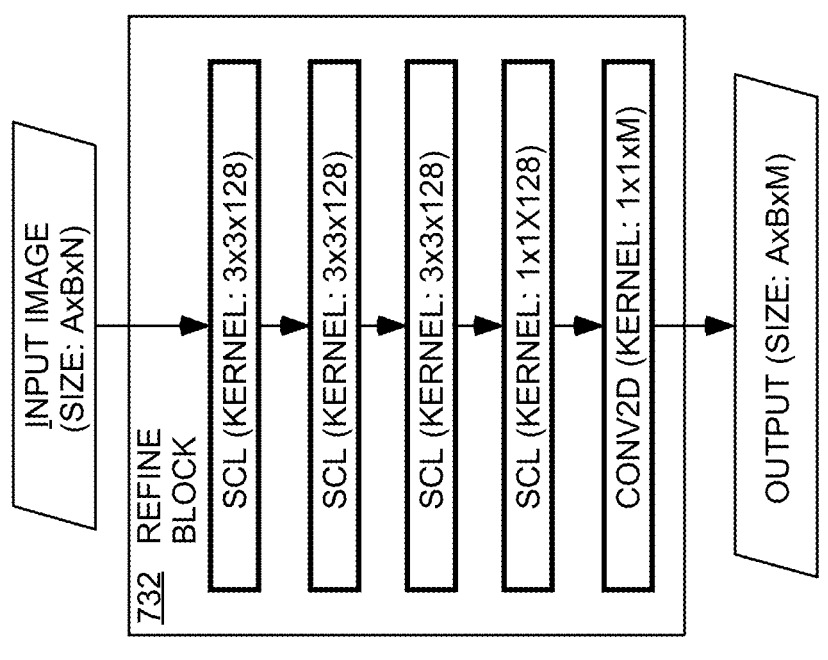
FIG. 7E is a detailed block diagram illustrating an exemplary Refine Block, according to one embodiment of the present invention.
Figure 7D:
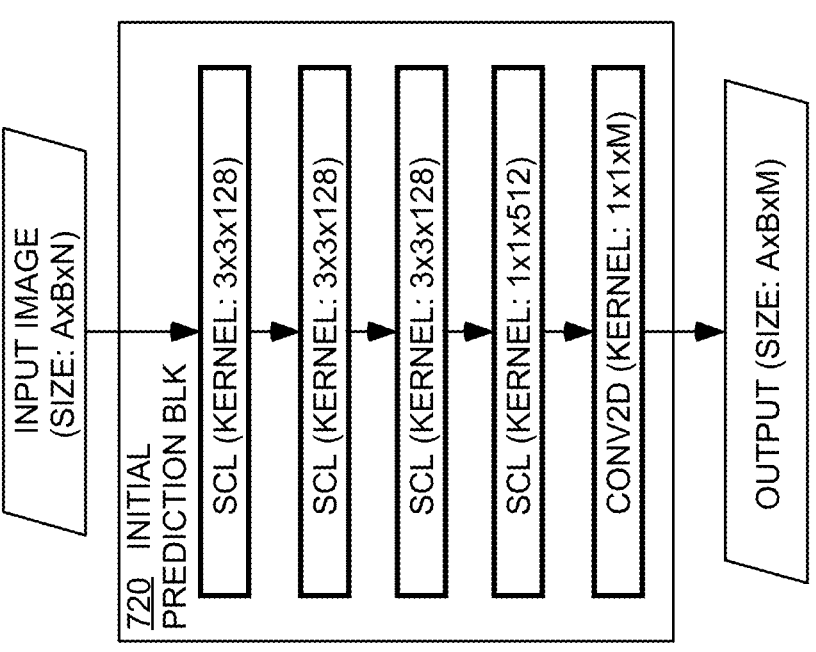
FIG. 7D is a detailed block diagram illustrating an exemplary Initial Prediction Block, according to one embodiment of the present invention.

FIG. 7D is a detailed block diagram illustrating an exemplary Initial Prediction Block 720, according to some embodiments of the present invention; FIG. 7E is a detailed block diagram illustrating an exemplary Refine Block 732, according to some embodiments of the present invention. Both comprise multiple separable convolutional layers having different kernel sizes.

FIG. 8 provides two tables 810 and 860 listing raw information as captured from an input video, and shot statistics or analytics that may be derived from such raw information, according to one embodiment of the present invention.

In table 810, raw information is divided into ball information 812, shooter information 814, events information 816, and scene information 818. For balls extracted from the input video, one or more ball flow and trajectories may be identified, and shot attempts may be determined based on the ball trajectories and their positions relative to the hoop. For the shooter, pose information may be determined from, for example, 18 key points on the body. Following a shot attempt trajectory, shooter poses may be detected in the region around the ball, and tracked as shooter poses. In some embodiments, more than one player may be present, and shooter information 814 may refer to player pose information and player posture flow as discussed with reference to FIGS. 1B to 4. In addition, shooter information 814 may be correlated with ball information 812 to determine different shot events such as ball-leave-hand, jump, dribble, and catch-ball events. Scene information 818 includes how hoop, court, and other relevant objects of interests are placed within the image domain, including hoop detection information and how court is placed in the image. Such scene information may be combined with other ball, shooter, and events information to generate shot analytics and/or game analytics, such as determining whether a shot is a 3-pointer or not.

Shot analytics or statistics as shown in table 860 may be divided into different categories, including, but not limited to, shooting information or shot information 862, player or shooter movement information 864, and shooting type or shot type 866. Examples of shot information 862 include, but are not limited to, release time, one-or-two leg jump, back angle, leg power, one-or-two hand shot, and let-or-right hand shot. Derivation of such shot information may require shooter information and events information from table 810. Examples of movement information 864 include, but are not limited to, bird-eye-view trajectory, player moving speed at any time, and jump height. Derivation of such movement information may require shooter information and scene information from table 810. Examples of shot types 866 include, but are not limited to, layup, catch-and-shoot, on-the-move, off-the-dribble, regular, gloater/runner/hook, and stepback/jab. Derivation of such movement information may require events information and movement information from table 810.

In what follows, FIGS. 9A to 24 show exemplary screenshots from various illustrative shot attempt videos to demonstrate the raw information and analytics listed in FIG. 8, using exemplary embodiments of the present invention, such as methods and systems implemented according to FIGS. 1A to 7E.

FIGS. 9A to 9G are respective screen captures 900, 910, 920, 930, 940, 950, and 960, sampled from an input shot attempt video, showing a shooter 904, and an additional player 905. Frame numbers 990 are provided on the left top corner of the screen captures. In this very short 2-second long video having 68 frames, a ball 901 first moves towards shooter 904 along a trajectory 903. Shooter 904 dribbles, moves towards a basket 980, and makes a shot attempt with a two-leg jump. A ball trajectory refers to a path in space that the ball flies along after being thrown by a shooter.

Figure 9A:
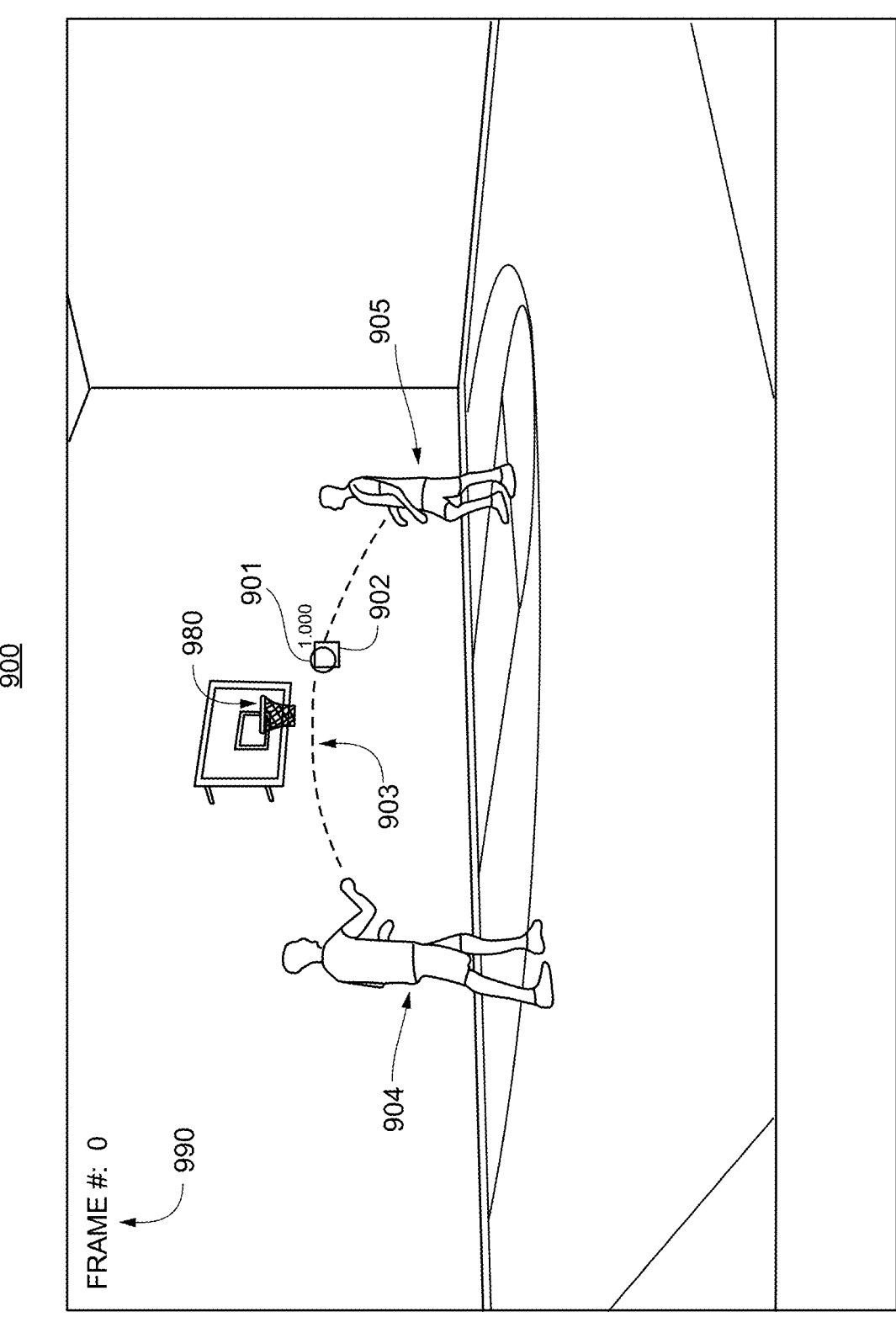
FIGS. 9A to 9G are respective screen captures from an input shot attempt video.
Figure 9B:
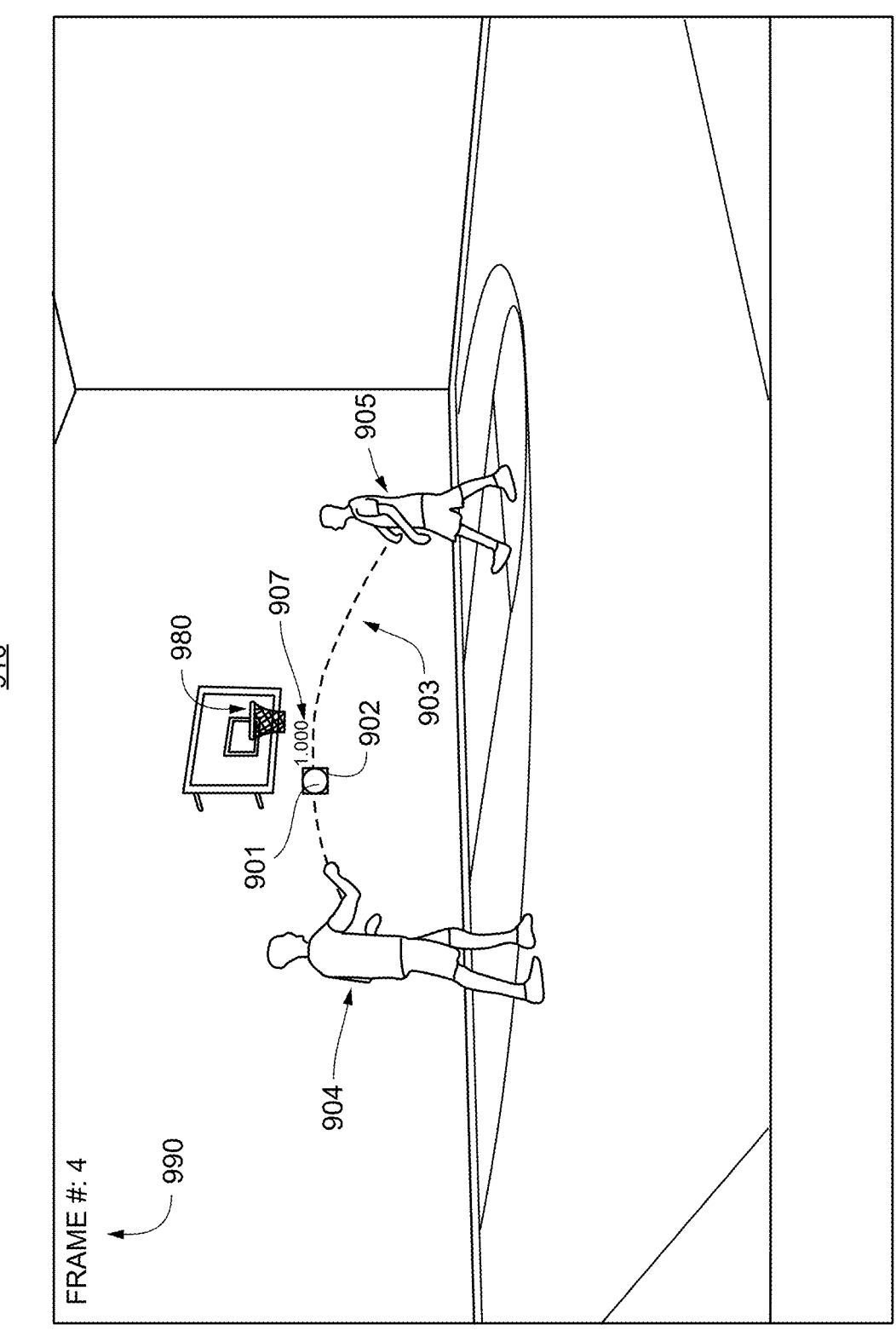
Figure 9C:
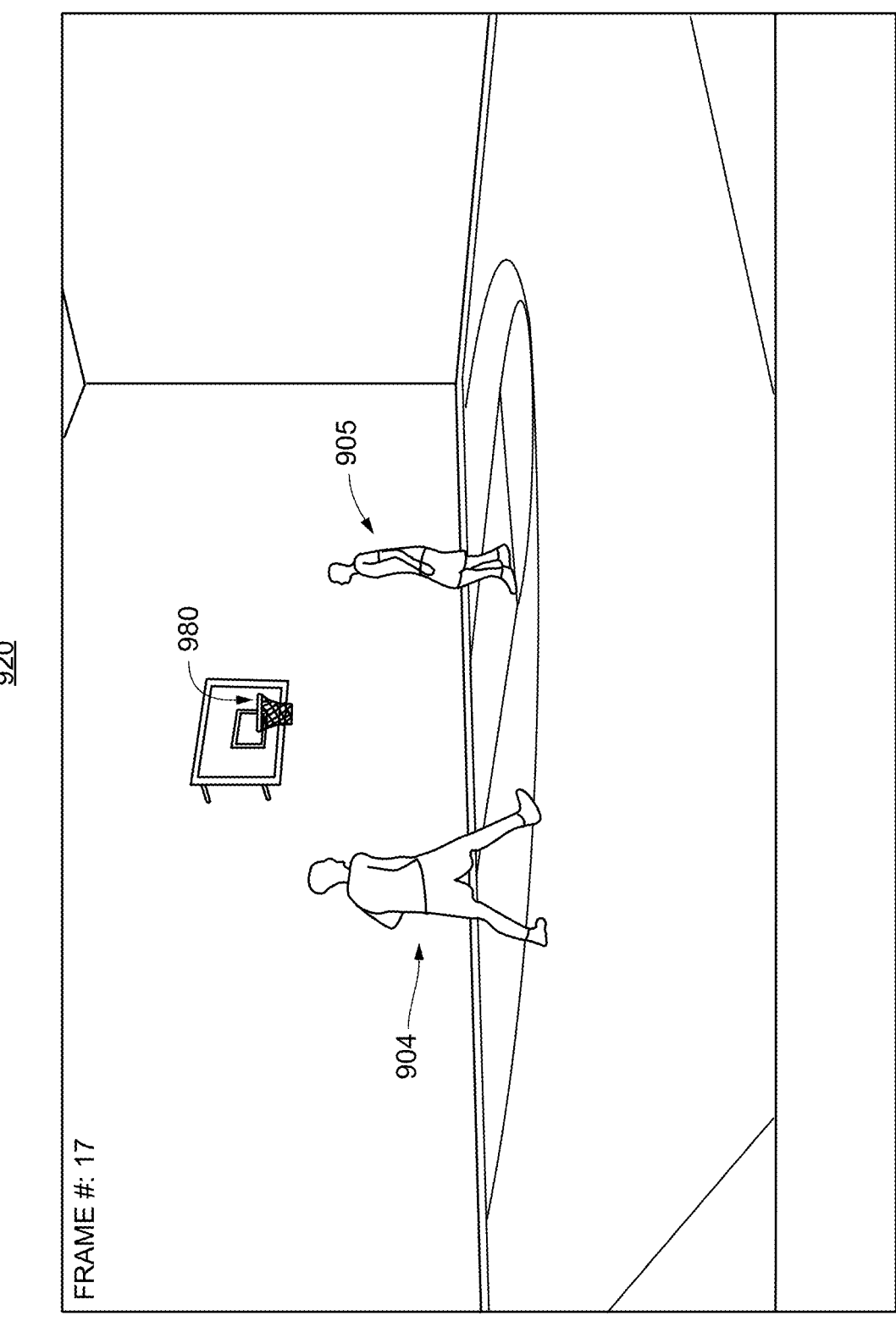
Figure 9D:
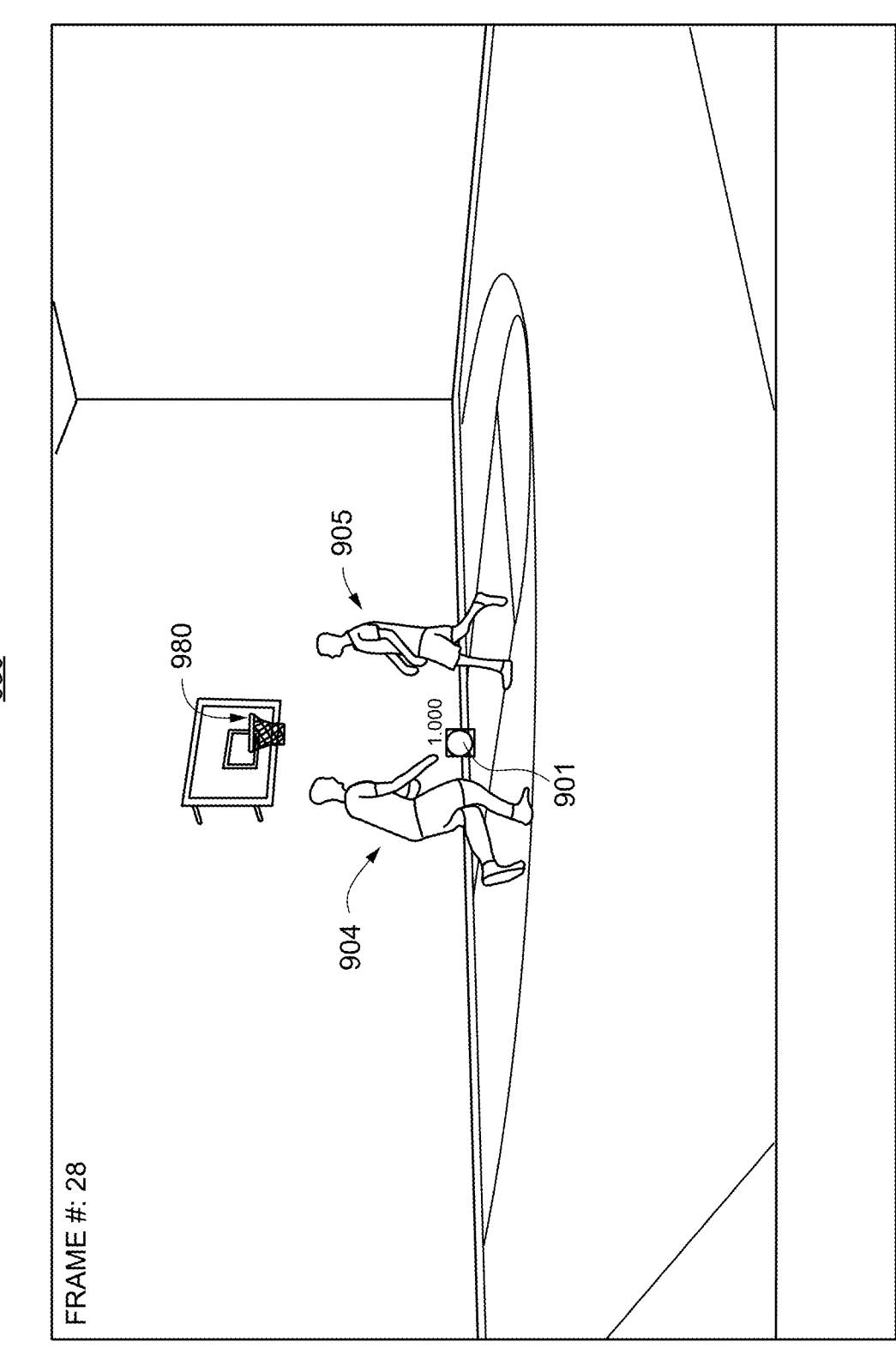
Figure 9E:
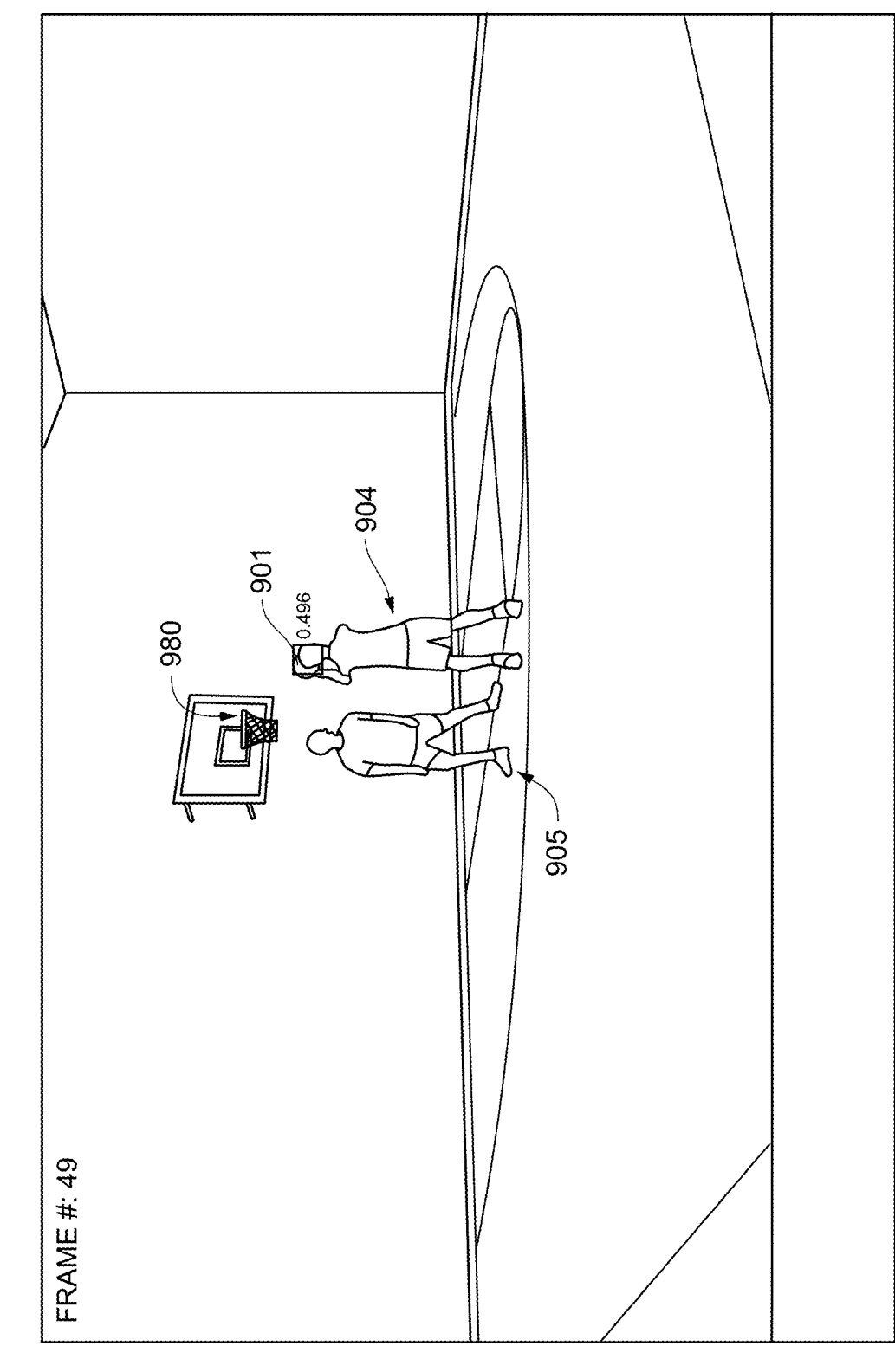
Figure 9F:
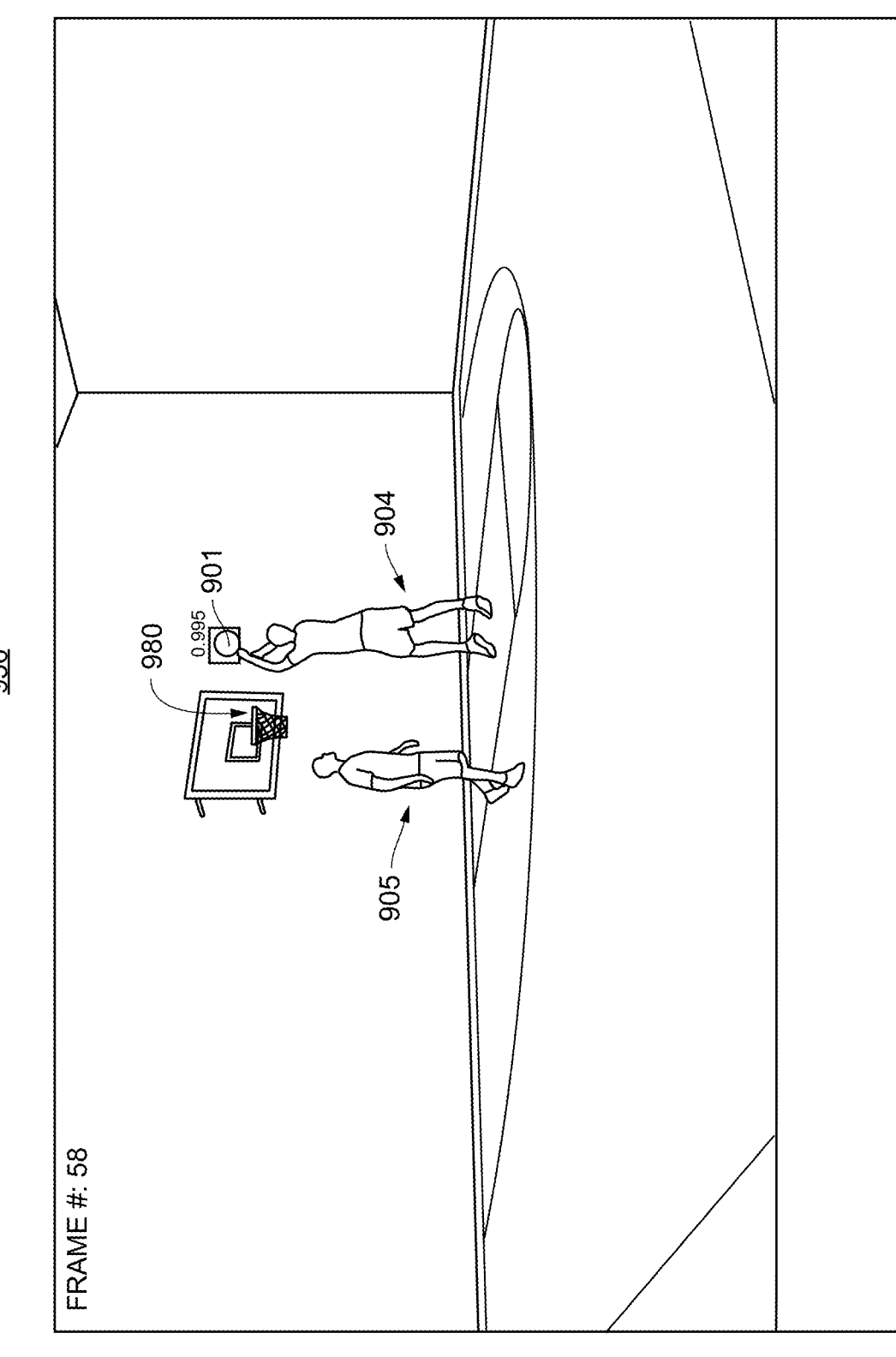
Figure 9G:
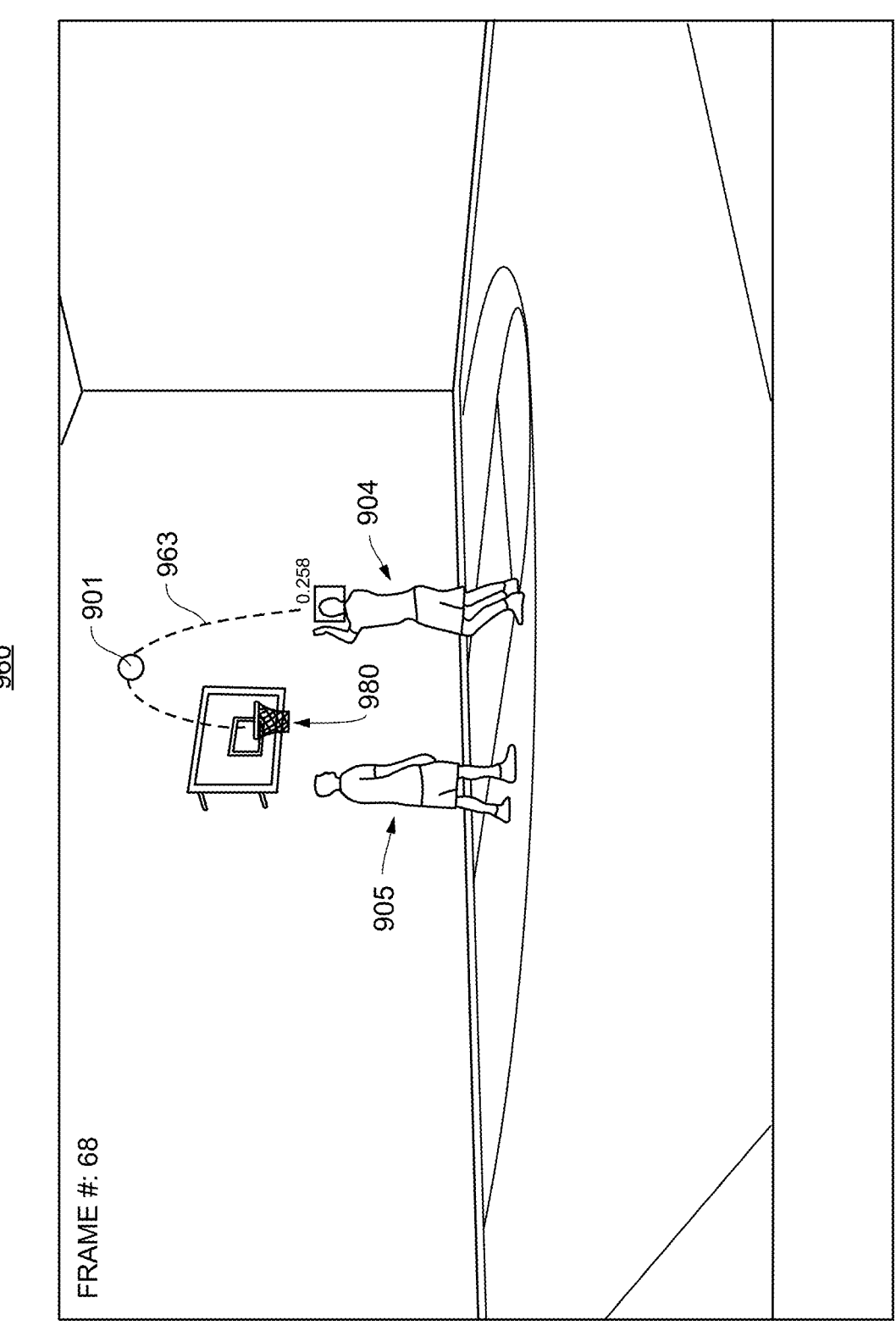

Embodiments of the present invention may first detect the ball, determine a corresponding trajectory, then trace the ball trajectory to see if it ends in a shot attempt. For example, a box 902 in FIG. 9A represents a ball extraction result with confidence value of 1.000. Trajectory 903, represented as a dotted curve in FIG. 9A, may be reconstructed directly from a ball flow comprising a sequence of ball objects, or be generated by interpolating and/or extrapolating several known ball positions in air. Trajectory 903 represents a pass from player 905 to player 904, where the ball does not move above any of these two player's upper bodies, or come close to basket 980. By comparison, trajectory 963 in FIG. 9G corresponds to a shot attempt by shooter 904. Once a ball flow or trajectory such as 963 is determined, the ball flow can be examined to determine whether the ball has been thrown from the shooter's upper body upward, and if so, declare it as a shot attempt.

Figure 10:
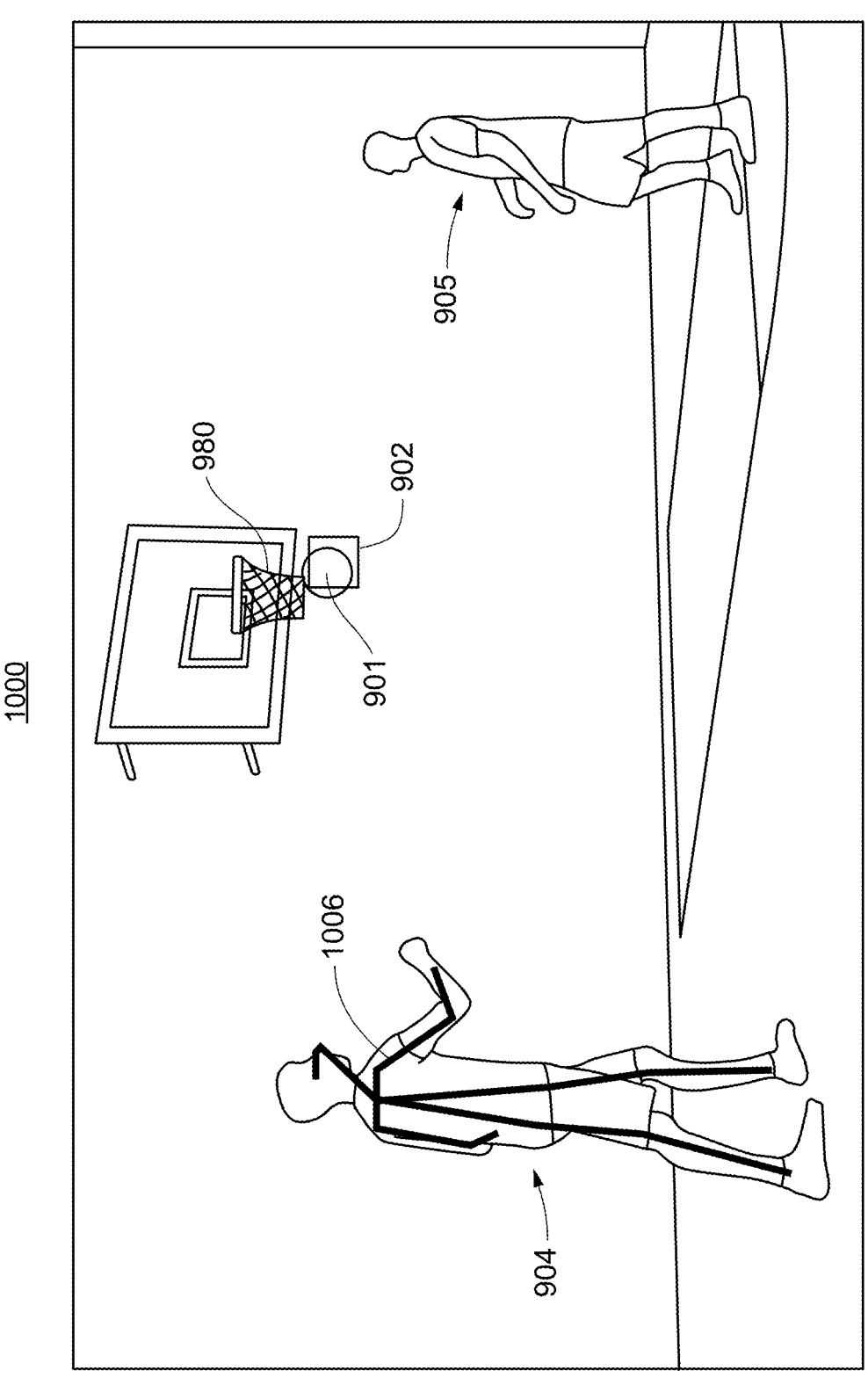
FIG. 10 is a zoomed-in screen capture of one frame of the video in FIGS. 9A to 9G, showing a shooter pose, according to one embodiment of the present invention.

FIG. 10 is a zoomed-in screen capture 1000 of one frame of the input video in FIGS. 9A to 9G, showing a shooter pose 1006 of shooter 904, according to one embodiment of the present invention. In this figure, shooter pose 1006 is represented by straight lines connecting key points on the human body, showing a skeletal outline of the torso, shoulder, and limbs. As multiple players are present on the court within the video, postures for both may be detected first from each individual video frame, and a shooter selected based on posture flows. For example, a "shot attempt" ball trajectory may be followed, and all postures in regions around the ball may be detected, where each posture may be presented by a predetermined number of key points. A detected posture or posture flow may be determined to represents a shooter, if the related ball trajectory is found to represent a shot attempt.

FIG. 11A to 11D are respective screen captures 1100, 1120, 1140, and 1160 from the input shot attempt video in FIGS. 9A to 9G, showing instances of identified events, according to one embodiment of the present invention. The events are listed in reverse chronological order in FIGS. 11A and 11D, with a ball-leave-hand event occurring around Frame 58 shown in FIG. 11A, a jump event occurring around Frame 45 shown in FIG. 11B, a dribble event occurring around Frame 30 shown in FIG. 11C, and a catch-ball event occurring around Frame 4 shown in FIG. 11D. In each screen capture, a side panel 1142 provides shot analytics including shot type and shot information, including release time, one-or-two-leg jump, back angle, and leg power.

A set 1115 of six time bars are provided in FIGS. 11A to 11D by the NEX system to indicate relevant shot events. From top to bottom, they respectively represent a catch-ball event, raw signal captured for catch-ball-event, dribble event, raw signal captured for dribble event, jump event, and ball-leave-hand event. Each shaded block spans the duration of a detected shot event. Confidence values for event estimation are provided to the right for each event type, changing on a per-frame basis.

Figure 11A:
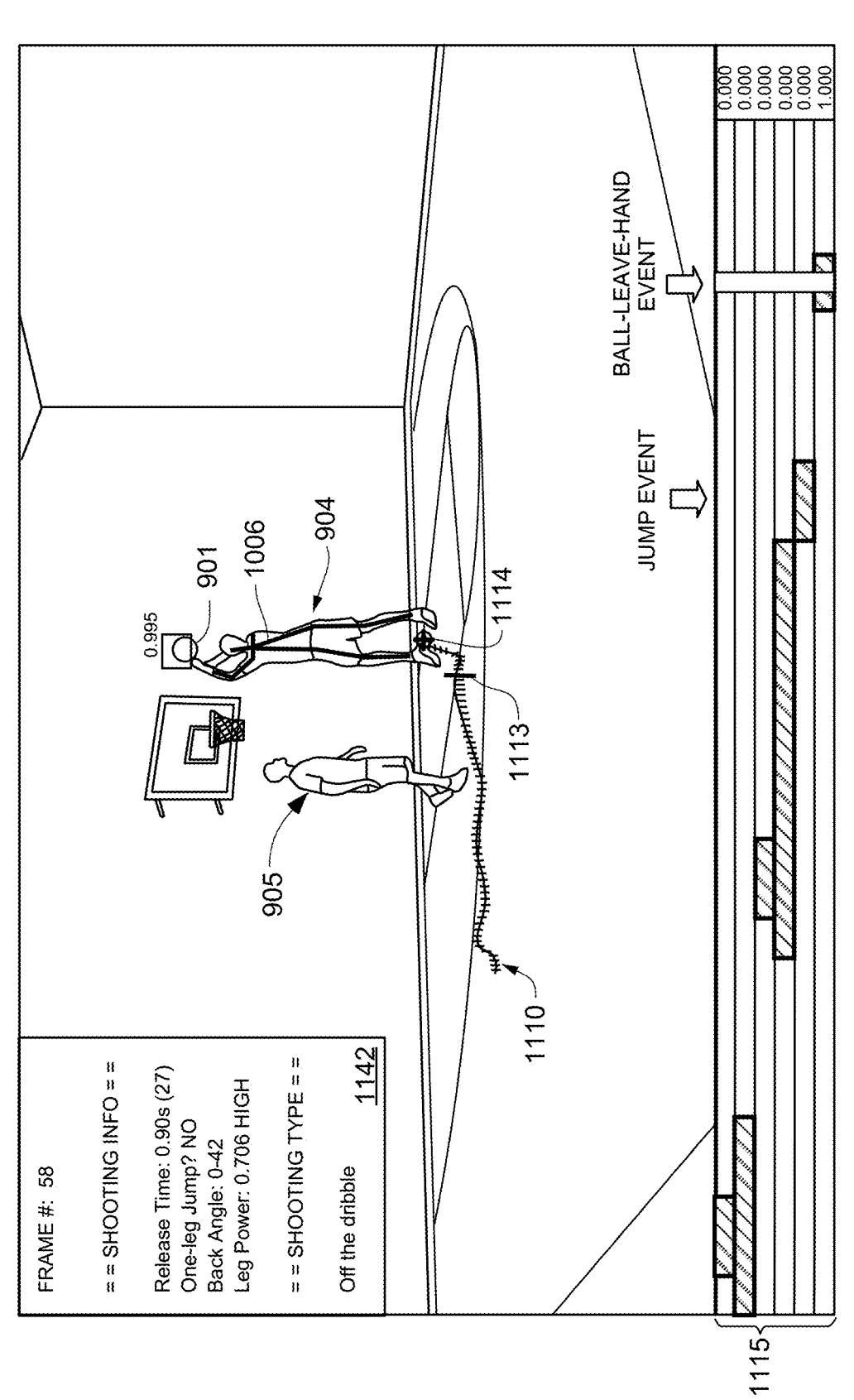
FIGS. 11A to 11D are respective screen captures from the input shot attempt video in FIGS. 9A to 9G, showing instances of identified events, according to one embodiment of the present invention.
Figure 11B:
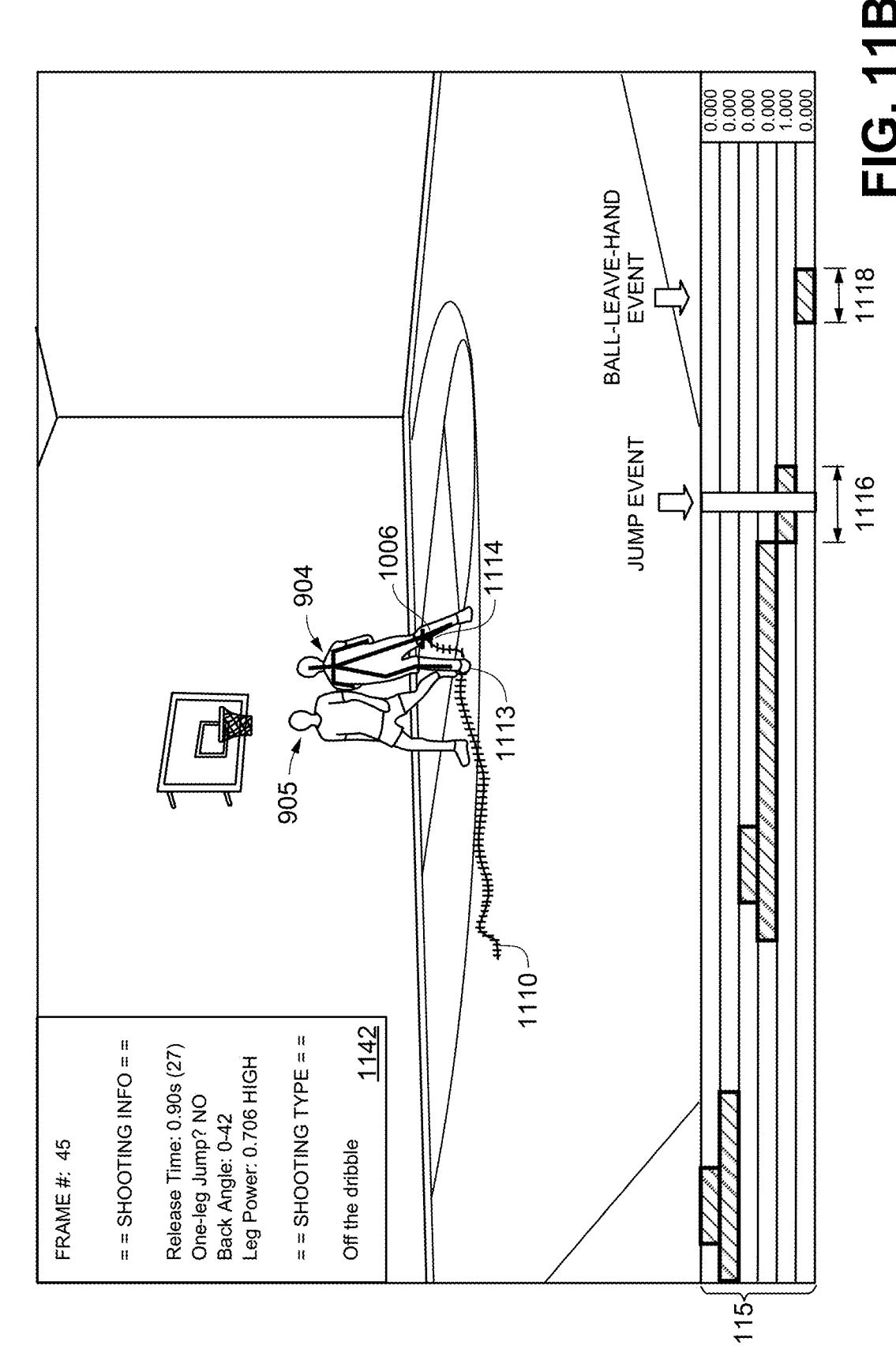
Figure 11C:
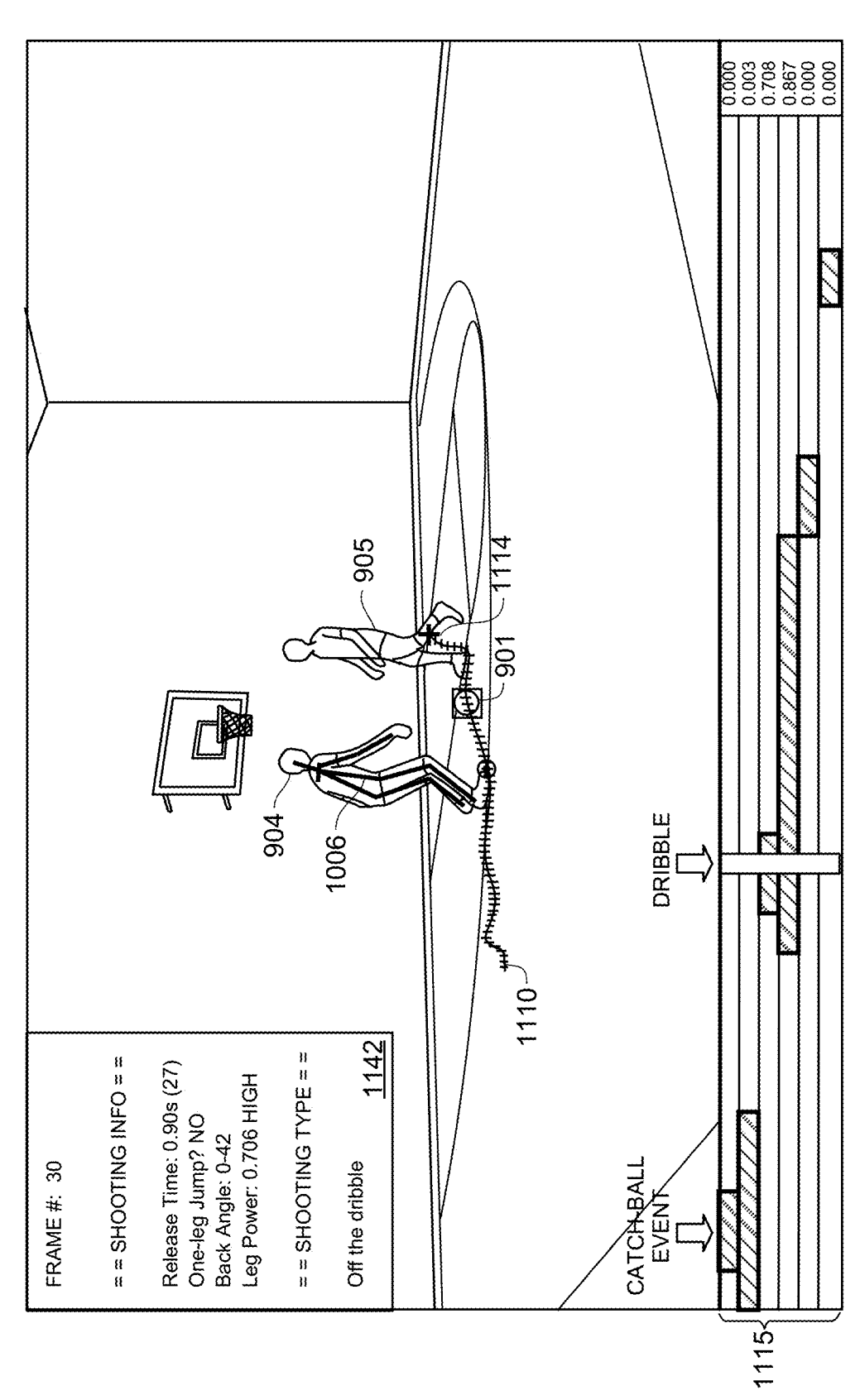
Figure 11D:
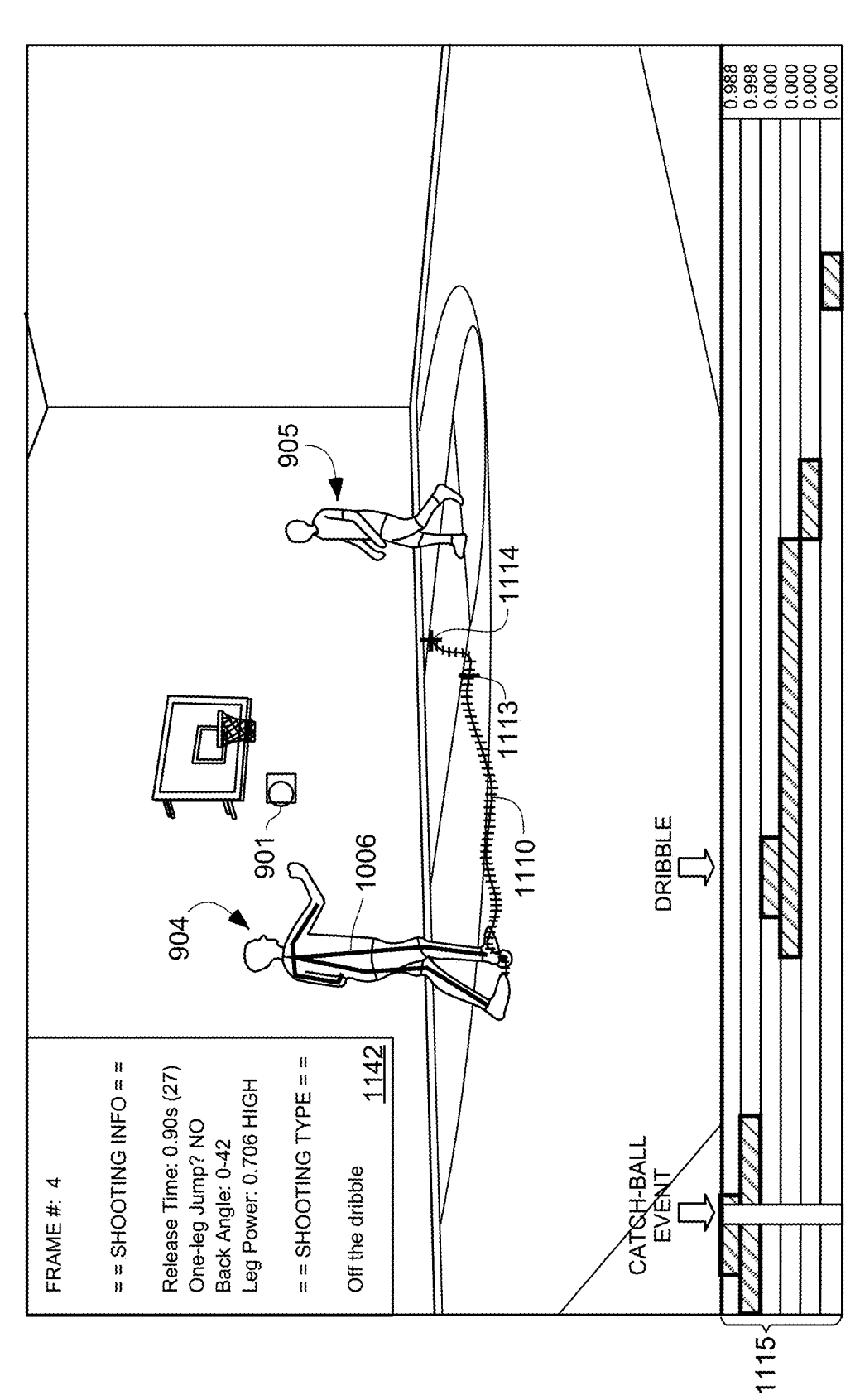

As discussed with reference to FIG. 3, embodiments of the present invention identify shooter posture flows, shot events, as well as shooter movement information, for generating shot analytics. In FIG. 11A, a set of shooter foot locations 1110 are annotated on the captured image frame, tracking the movement of shooter 904 in 3D space. Shooter 904 makes a two-leg jump shot between positions 1113 and 1114.

Figure 12A:
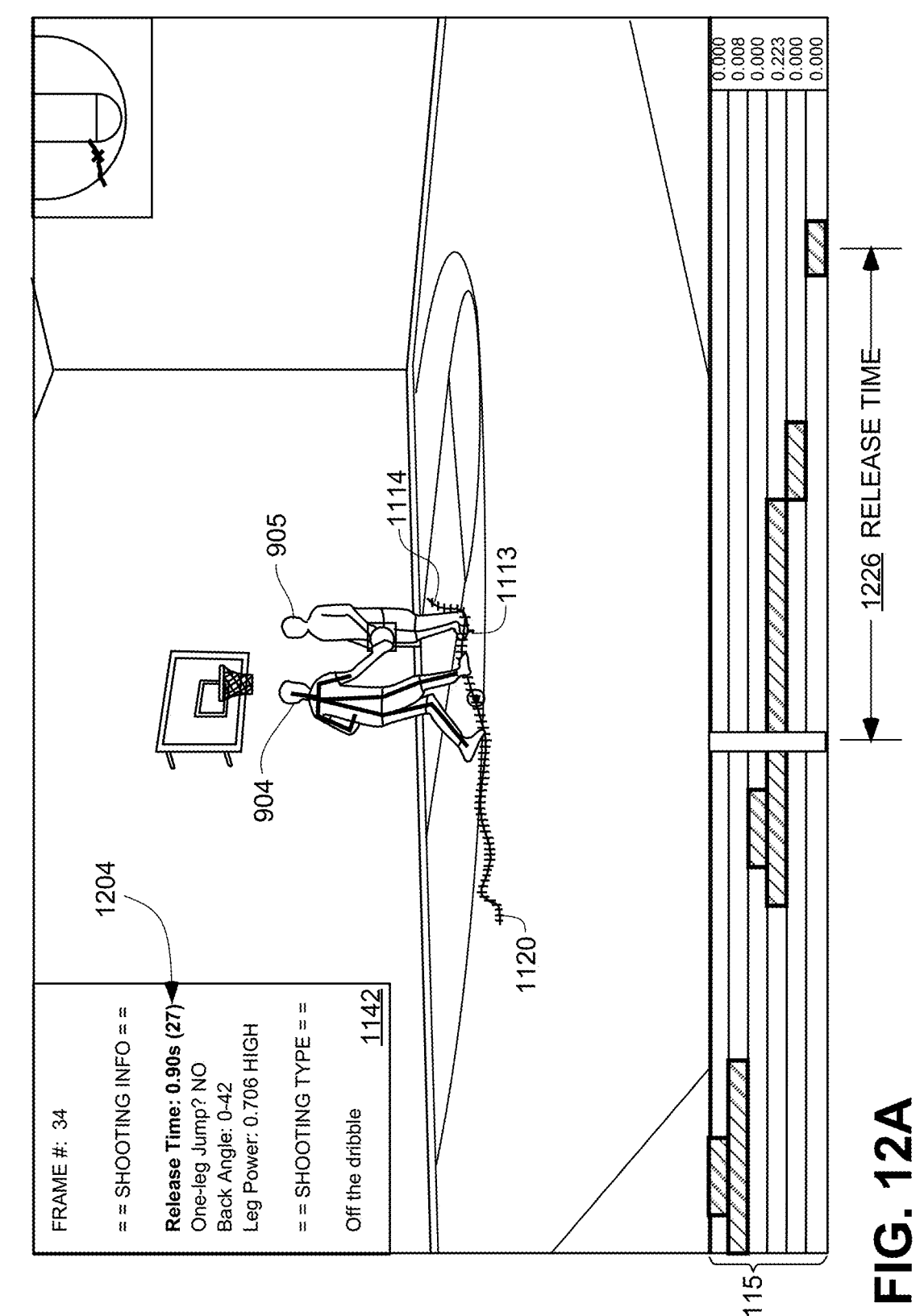
FIGS. 12A and 12B are respective screen captures from the input shot attempt video in FIGS. 9A to 9G, showing a release time period, according to one embodiment of the present invention.
Figure 12B:
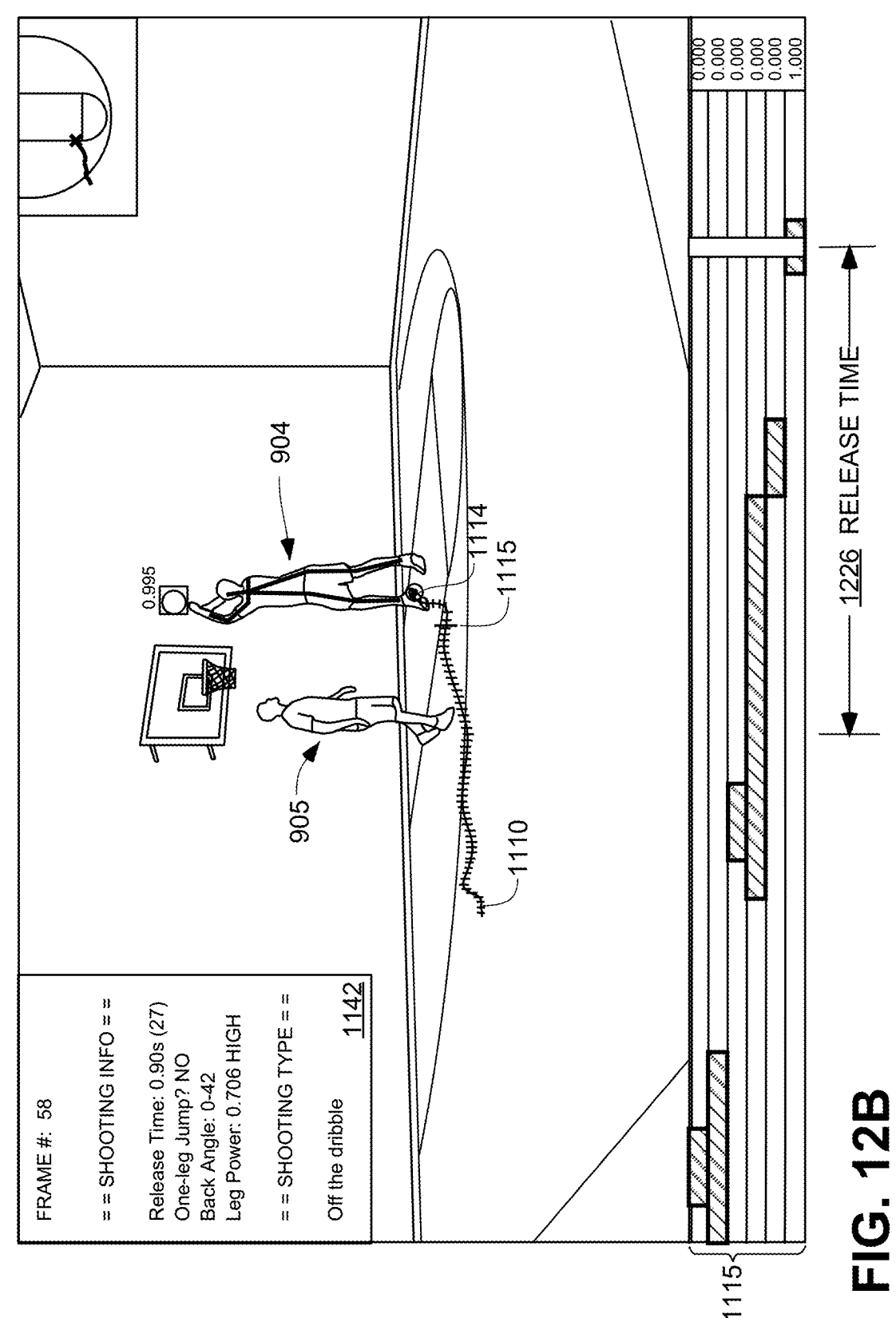

FIGS. 12A and 12B are respective screen captures 1200 and 1240 from the input shot attempt video in FIGS. 9A to 9G, showing approximate start and end times of a release time period 1226, according to one embodiment of the present invention. A release time may be measured by computing the time between a ball-leave-hand event and the latter of a dribble event and a catch-ball event. In this example, the release time is measured between a ball-leave-hand event and a dribble event, with a duration of 0.90 s or 27 frames, as indicated by display field 1204.

FIGS. 13A and 13B show image captures 1300 and 1350, illustrating a one-leg jump and a two-leg jump, according to one embodiment of the present invention. Image 1300 is captured from the input shot attempt video in FIGS. 9A to 9G. In each case, the type of the jump may be determined by comparing the vertical y-heights of ankles 1310 and 1320.

Figure 14:
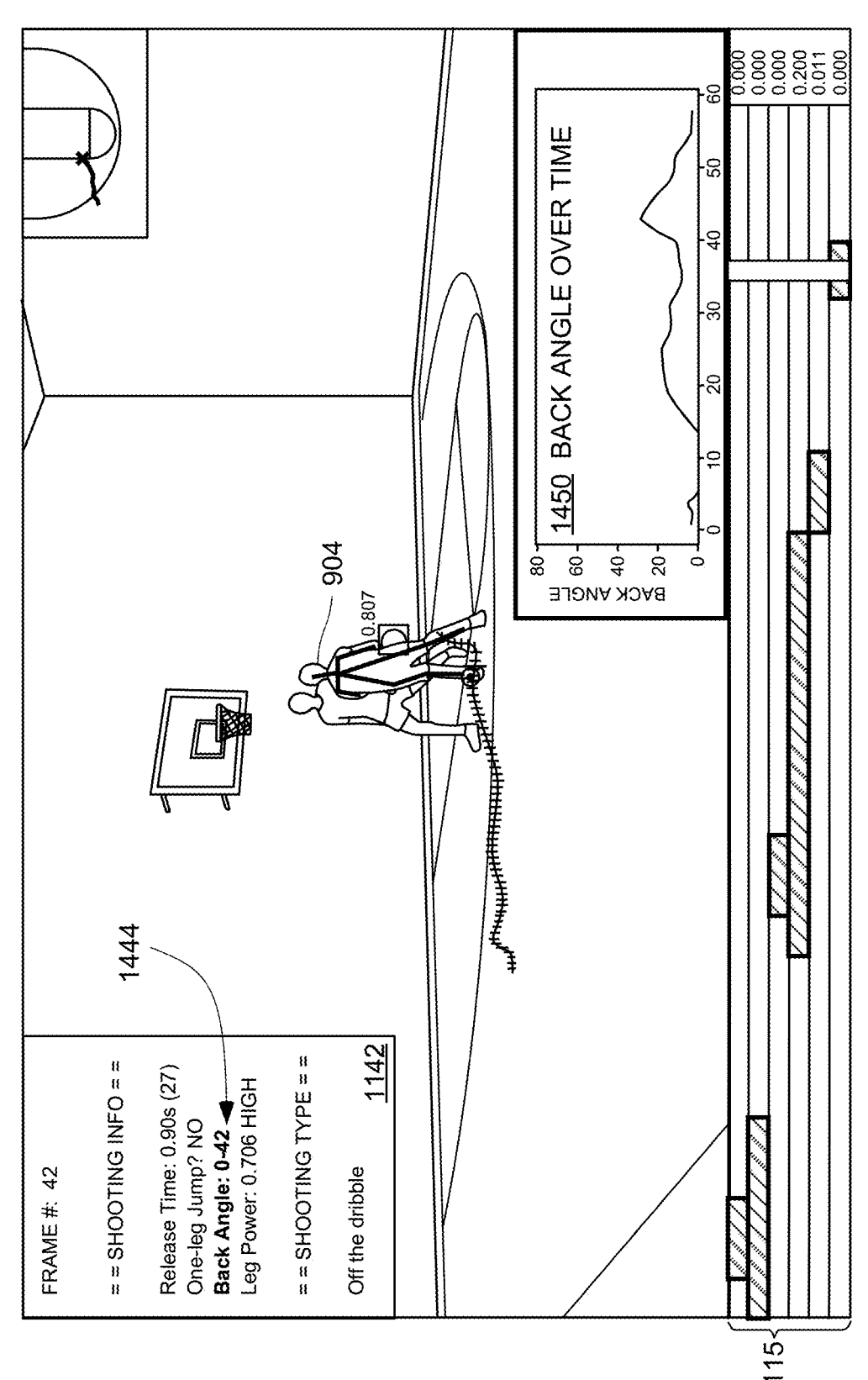
FIG. 14 shows a screen capture from the input shot attempt video in FIGS. 9A to 9G and corresponding back angle statistics for the shooter throughout the video, according to one embodiment of the present invention.

FIG. 14 shows a screen capture 1400 from the input shot attempt video in FIGS. 9A to 9G and corresponding back angle statistics for the shooter throughout the video, according to one embodiment of the present invention. The back angle for shooter 904 is plotted against the time axis in a sub-figure 1450. The screen capture is taken at frame 42, around the largest measured back angle. A range 1444 of back angles is provided in panel 1142, indicating the range of back motion for shooter 904.

Figure 15:
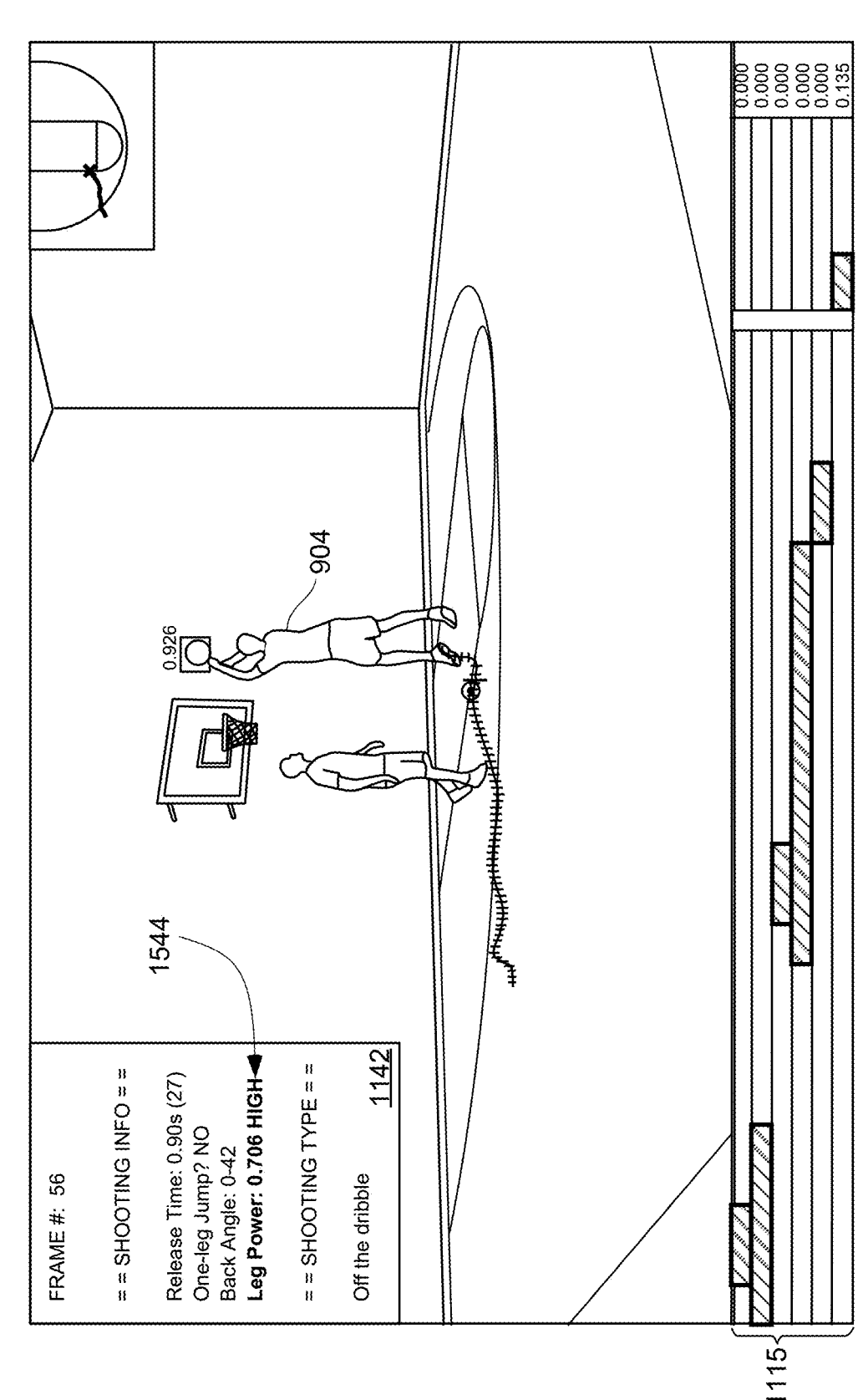
FIG. 15 shows a screen capture from the input shot attempt video in FIGS. 9A to 9G and illustrates a jump shot with high leg power, according to one embodiment of the present invention.
Figure 16:
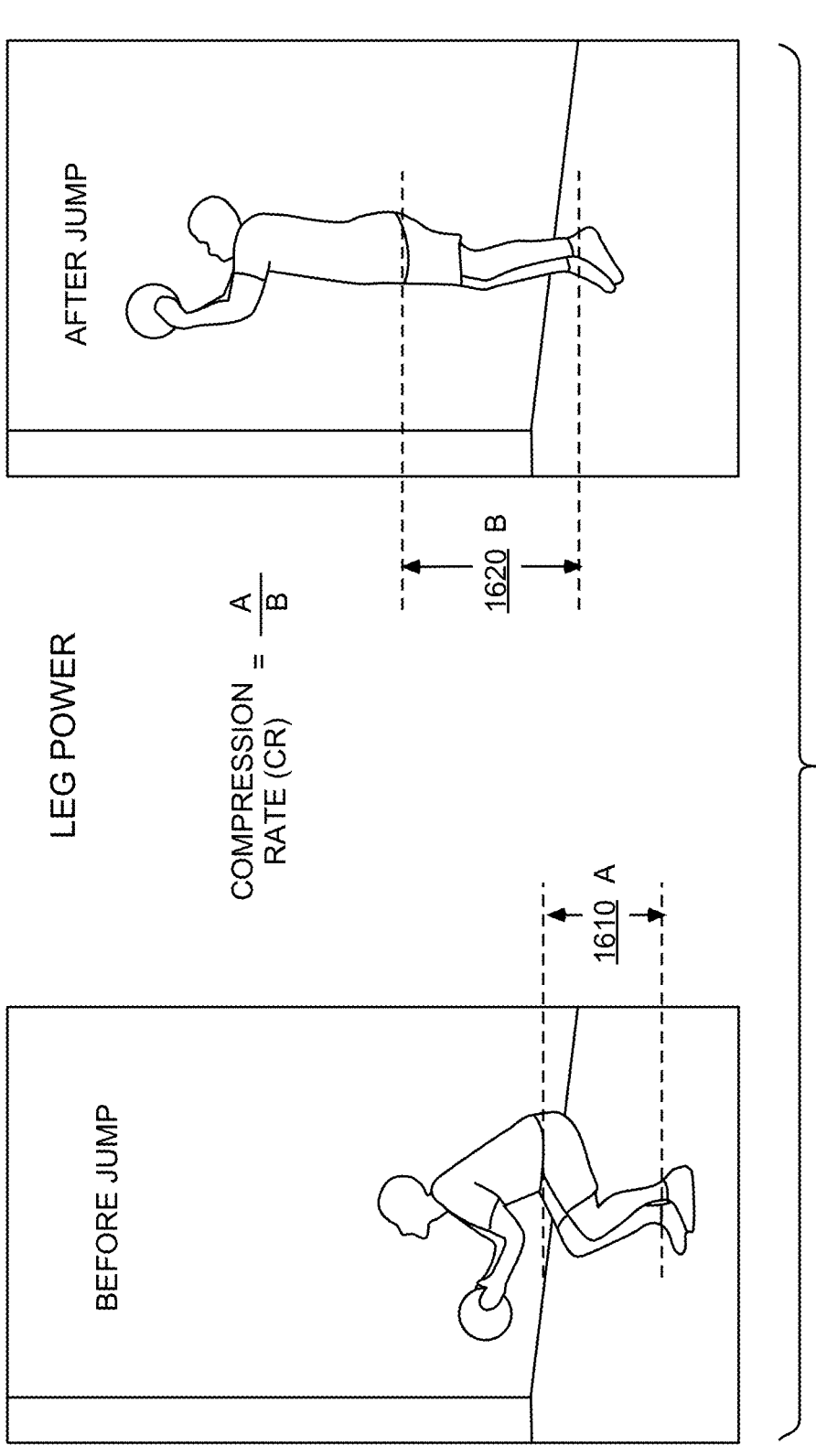
FIG. 16 illustrates how leg power is computed for a jump, according to one embodiment of the present invention.

FIG. 15 shows a screen capture 1500 from the input shot attempt video in FIGS. 9A to 9G and illustrates a jump shot with high leg power, according to some embodiments of the present invention. As indicated by line 1544 within panel 1142, the leg power is calculated to be 0.706, which is in the high range. Correspondingly, FIG. 16 illustrates how leg power may be computed for a jump, according to some embodiments of the present invention. In this example, a compression rate of a jump may be computed as the ratio between hip-ankle distance 1610 before a jump, and hip-ankle distance 1620 after the jump. A lower compression rate translates to a higher leg power. In some embodiments, the ratio between a hip-ankle distance and a full leg length may be viewed as a leg bend ratio.

Figure 17:
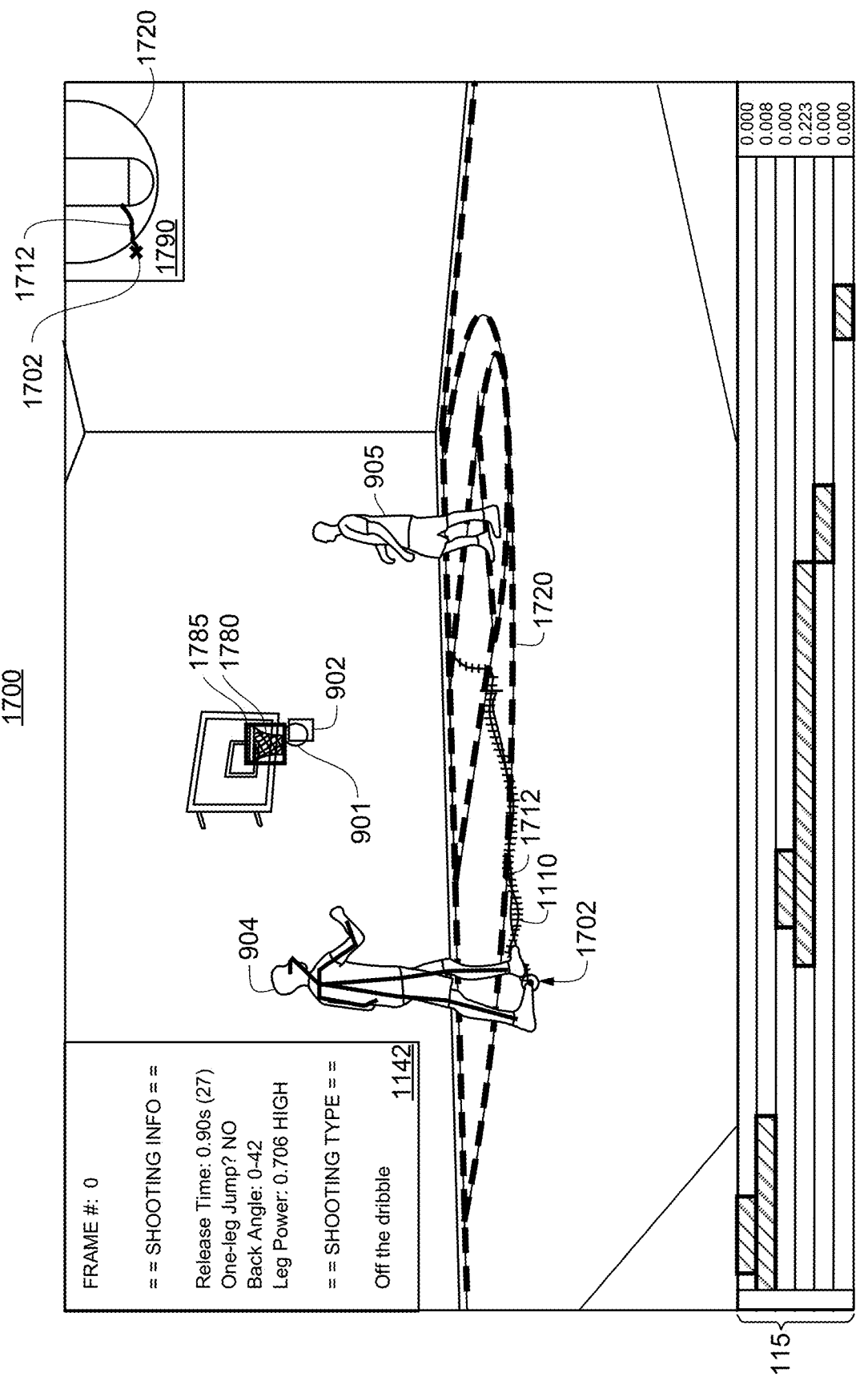
FIG. 17 shows a screen capture from the input shot attempt video in FIGS. 9A to 9G and illustrates various scene and movement indicators, according to one embodiment of the present invention.

FIG. 17 shows a screen capture 1700 from the input shot attempt video in FIGS. 9A to 9G and illustrates various scene and movement indicators, according to one embodiment of the present invention. In particular, a hoop 1780 is detected and outlined with solid line 1785, while court lines 1720 are detected and traced with dotted lines. Position 1702 of the shooter and shooter foot location trajectory 1712 are shown in a bird-eye-view 1790 of the court. Additional shooter movement information such as instantaneous moving speed and jump height may also be computed using the methods and systems as disclosed herein.

Figure 18A:
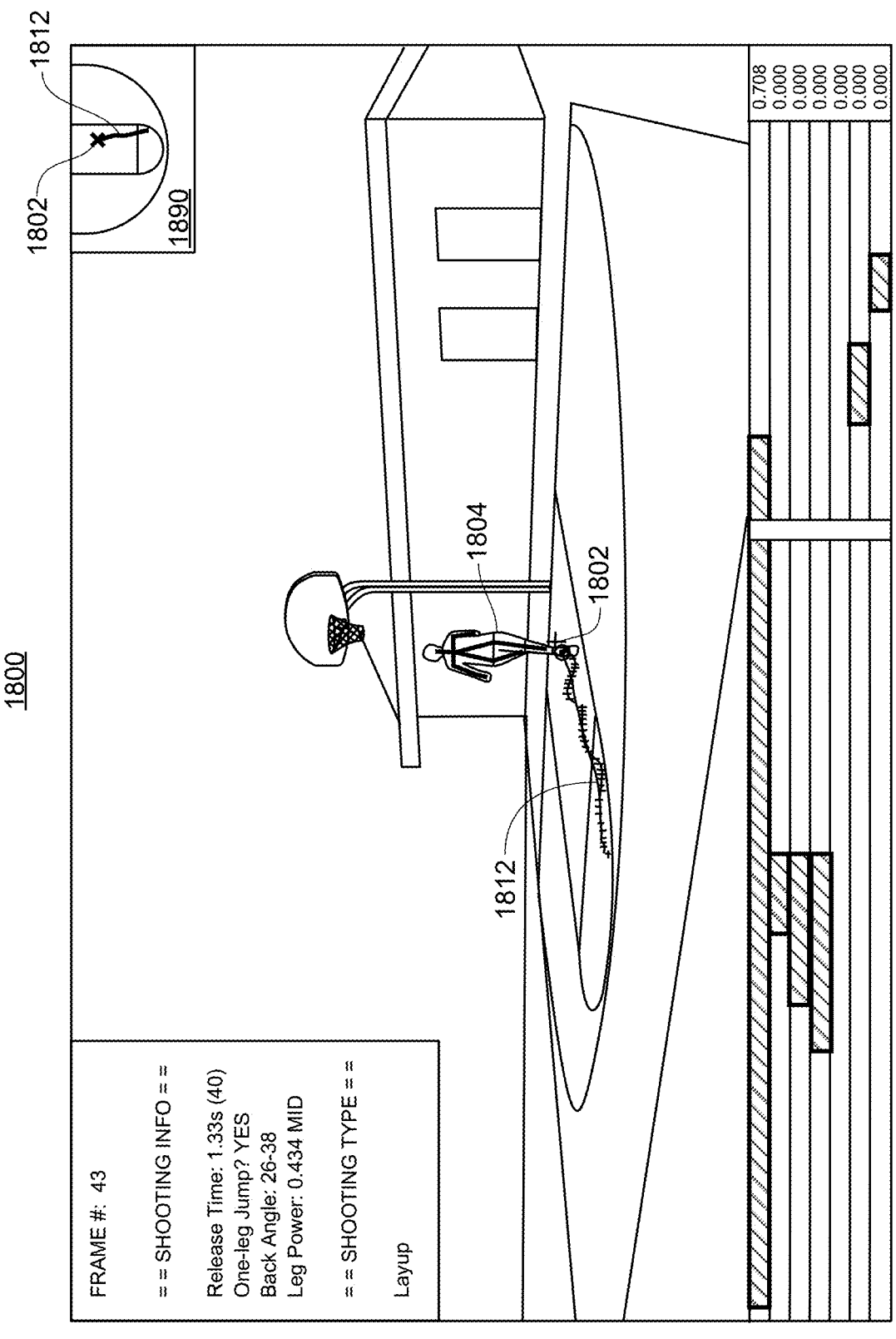
FIGS. 18A and 18B are respective screen captures from another exemplary input shot attempt video and illustrate a layup shot, according to one embodiment of the present invention.
Figure 18B:
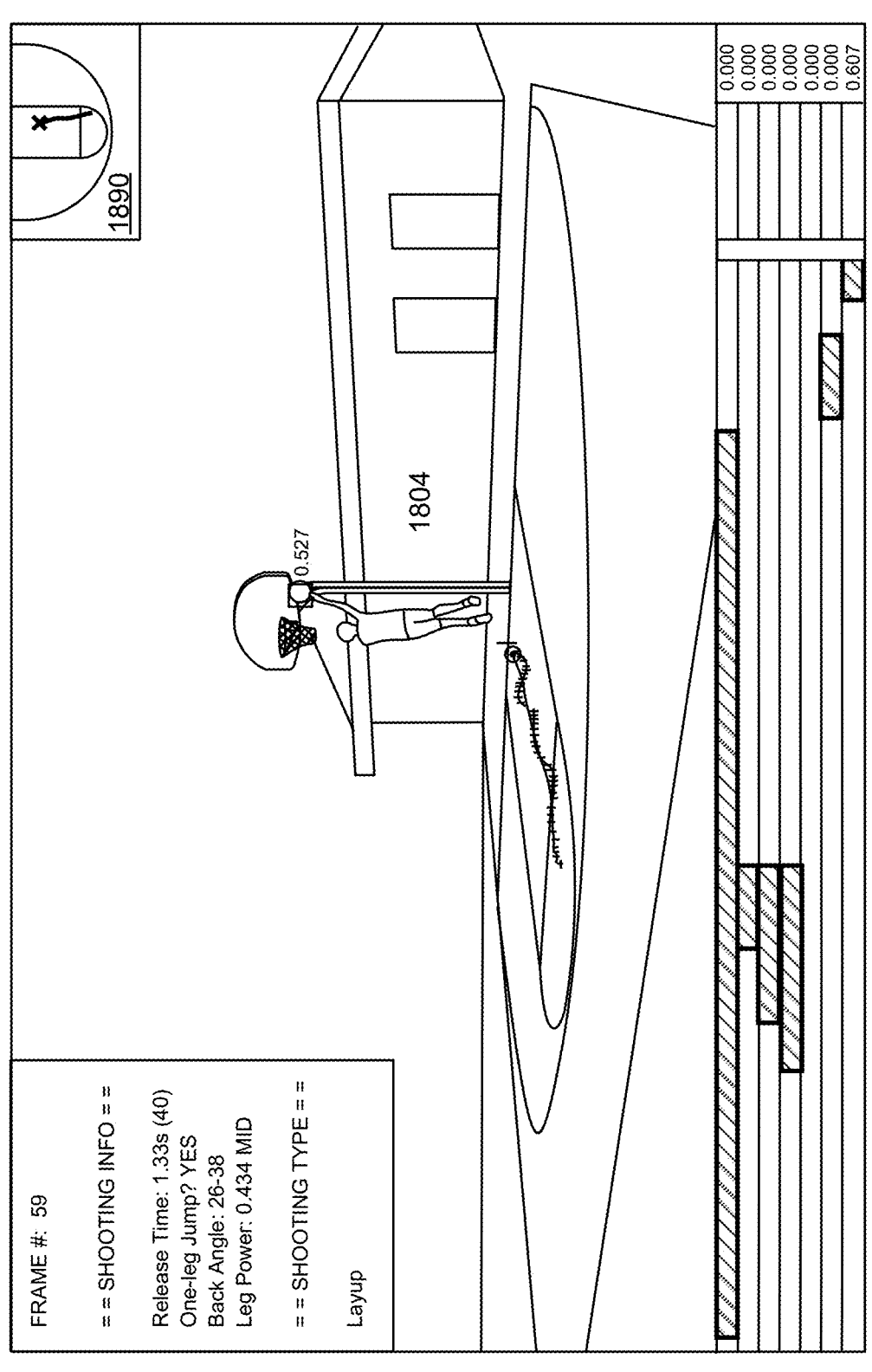

FIGS. 18A and 18B are respective screen captures 1800 and 1840 from another exemplary input shot attempt video and illustrate a layup shot, according to one embodiment of the present invention. A layup shot is a shot attempt made by moving towards the basket, jumping from below with one feet up, and laying the ball up near the basket and shooting towards the backboard into the basket with one hand. Position 1802 of the shooter and shooter foot location trajectory in 2D 1812 are shown in a bird-eye-view 1890 of the court.

Figure 19A:
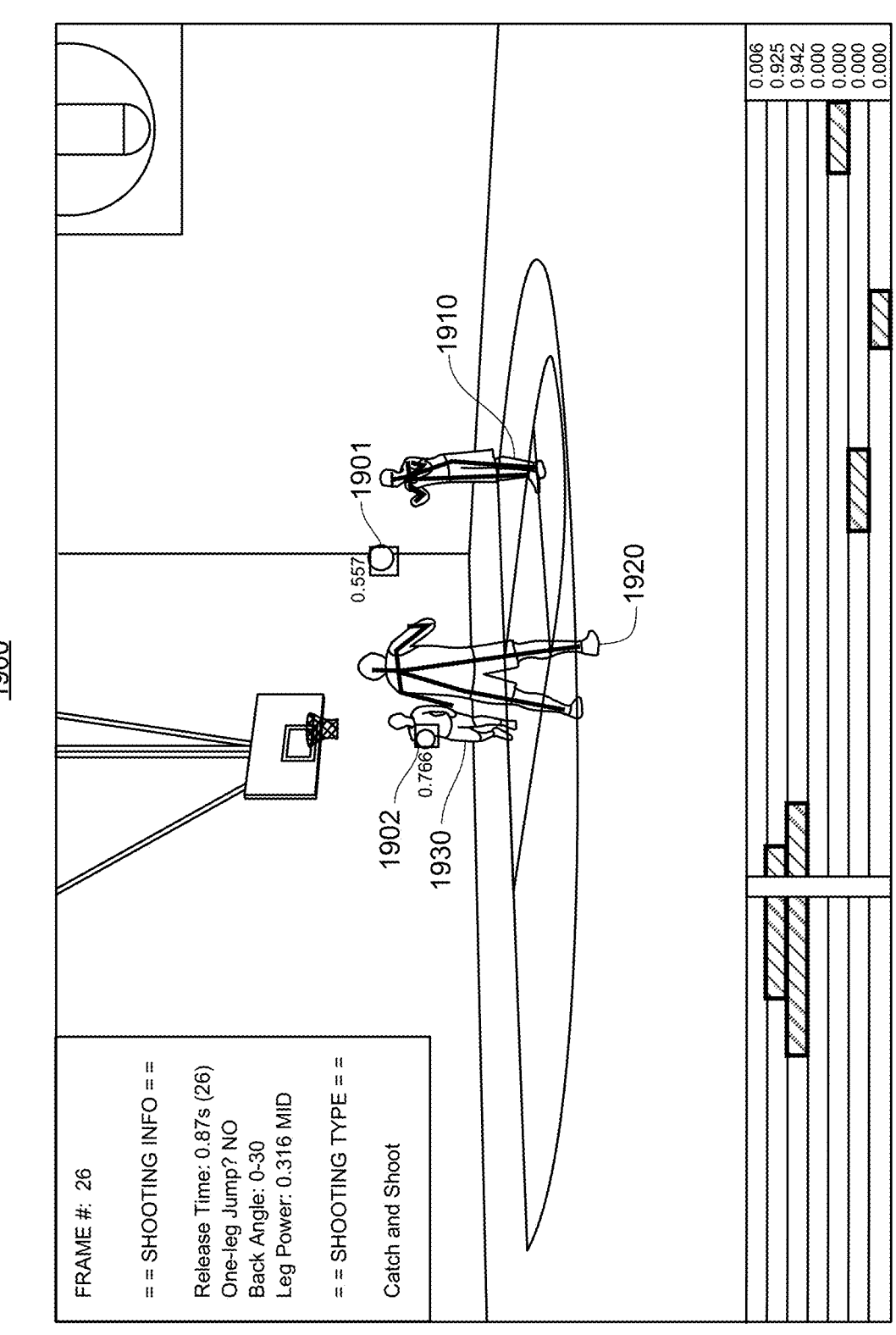
FIGS. 19A and 19B are respective screen captures from a third exemplary input shot attempt video and illustrate a catch-and-shoot shot, according to one embodiment of the present invention.
Figure 19B:
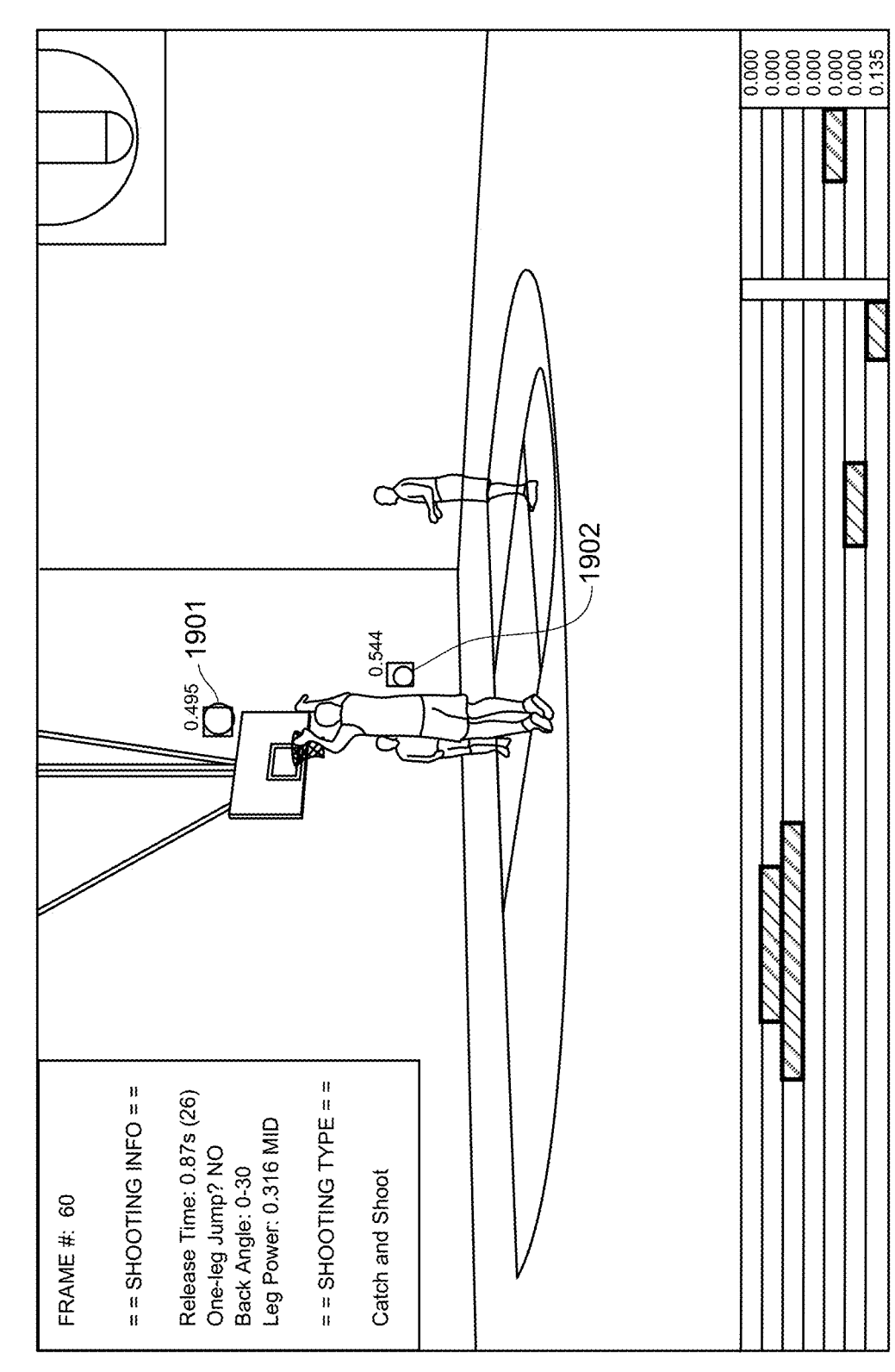
Figure 20:
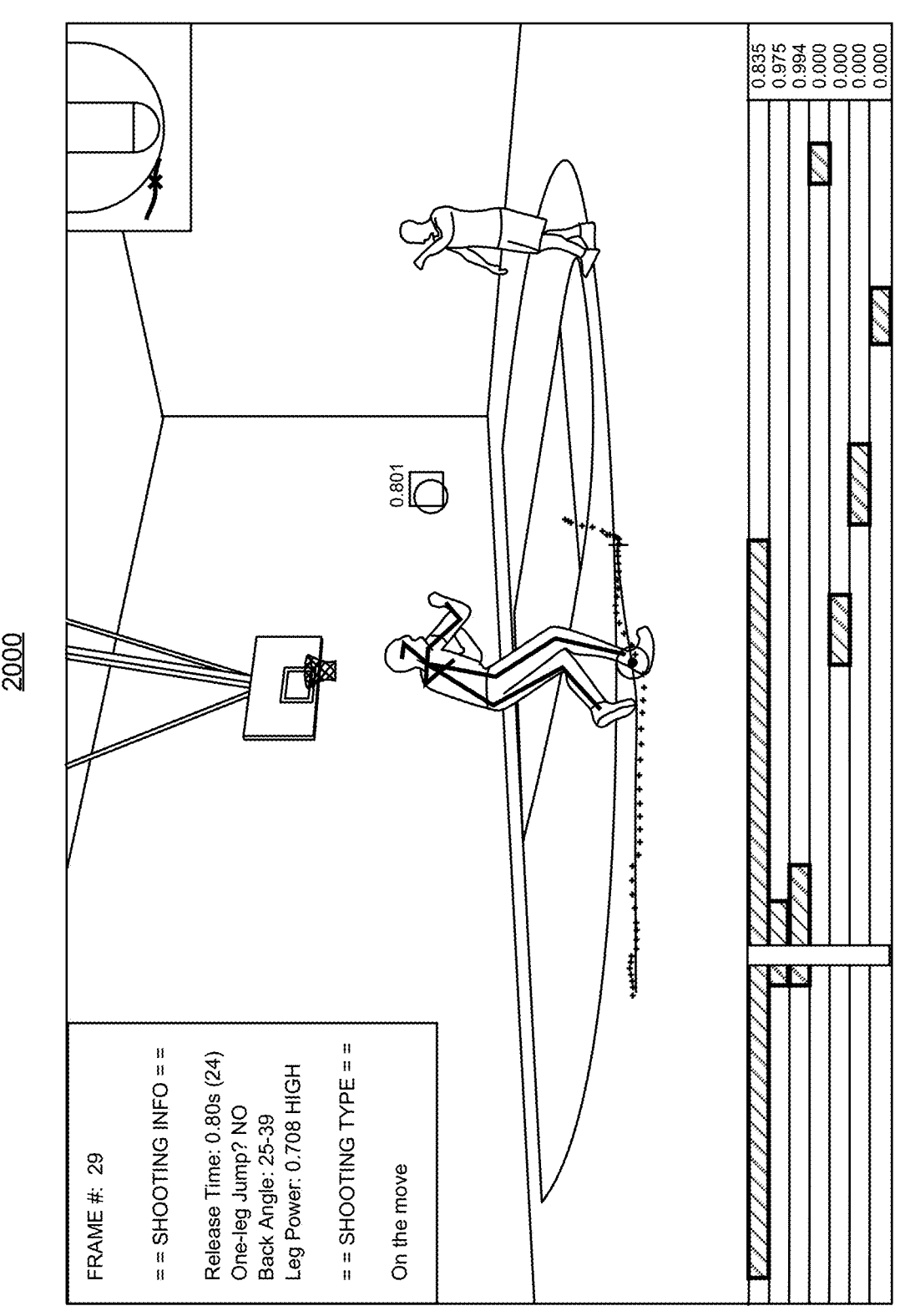
FIG. 20 is a screen capture from a fourth exemplary input shot attempt video and illustrates an on-the-move shot, according to one embodiment of the present invention.
Figure 21:
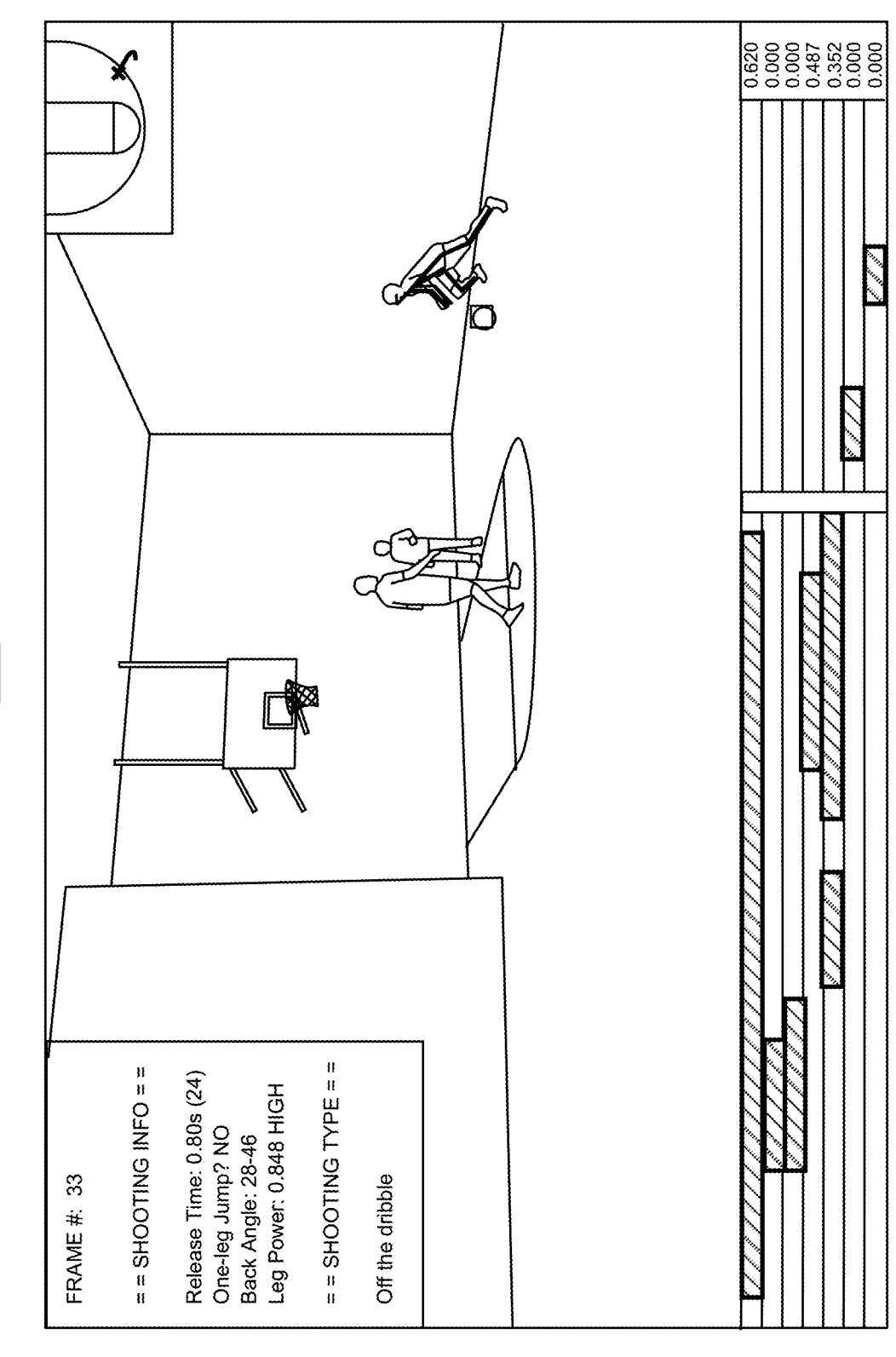
FIG. 21 is a screen capture from a fifth exemplary input shot attempt video and illustrates an off-the-dribble shot, according to one embodiment of the present invention.

FIGS. 19A and 19B are respective screen captures 1900 and 1940 from a third exemplary input shot attempt video and illustrate a catch-and-shoot shot, according to one embodiment of the present invention. In this illustrative example, three players 1910, 1920, and 1930 are present, as well as two balls 1901 and 1902. The NEX system detects individual balls and player postures respectively. Similarly, FIG. 20 is a screen capture 2000 from a fourth exemplary input shot attempt video and illustrates an on-the-move shot. FIG. 21 a screen capture 2100 from a fifth exemplary input shot attempt video and illustrates an off-the-dribble shot.

Figure 22:
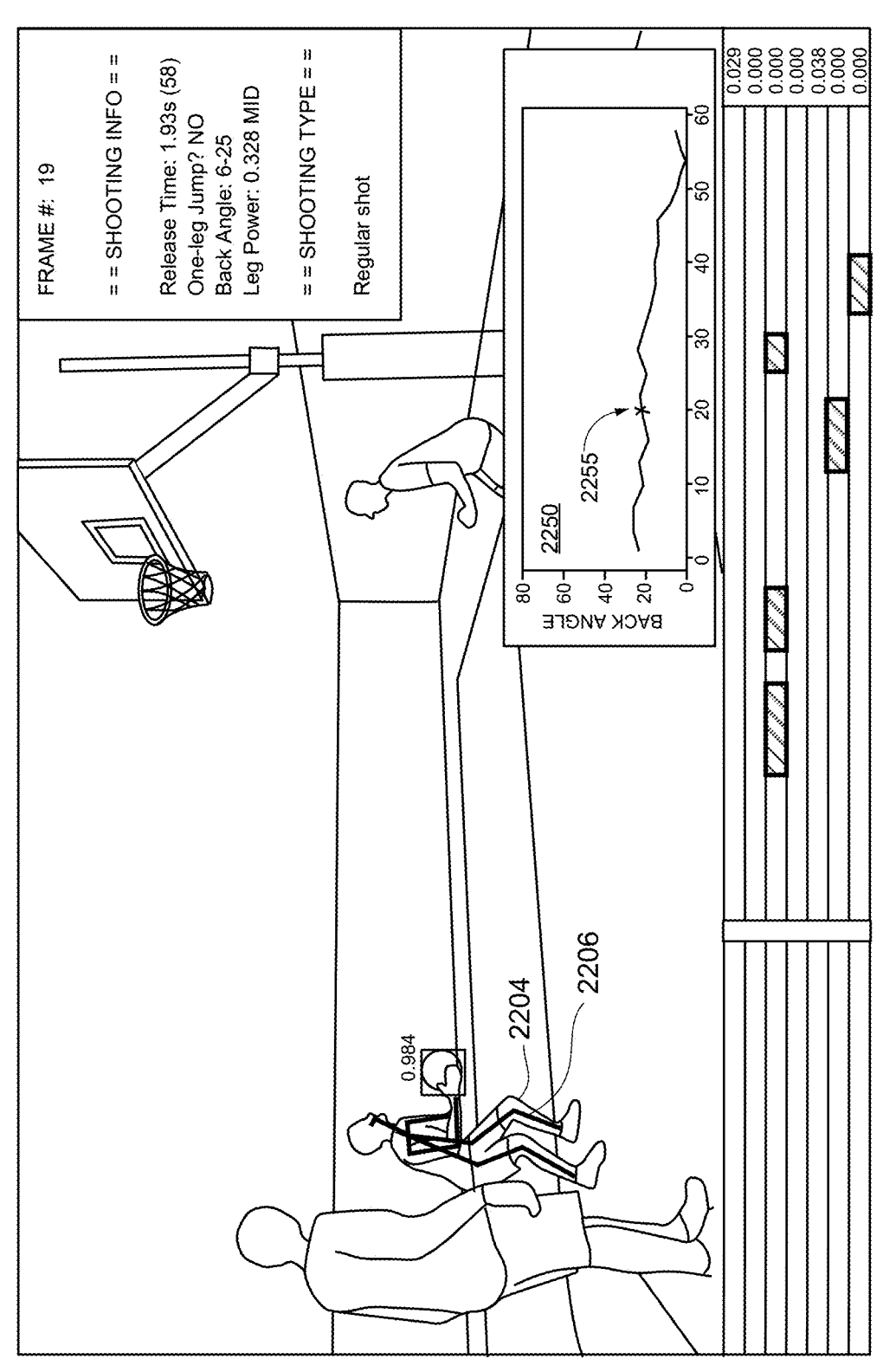
FIGS. 22, 23 and 24 are screen captures from three other exemplary input shot attempt videos respectively and illustrate back angle statistics for the corresponding shot attempts, according to one embodiment of the present invention.
Figure 23:
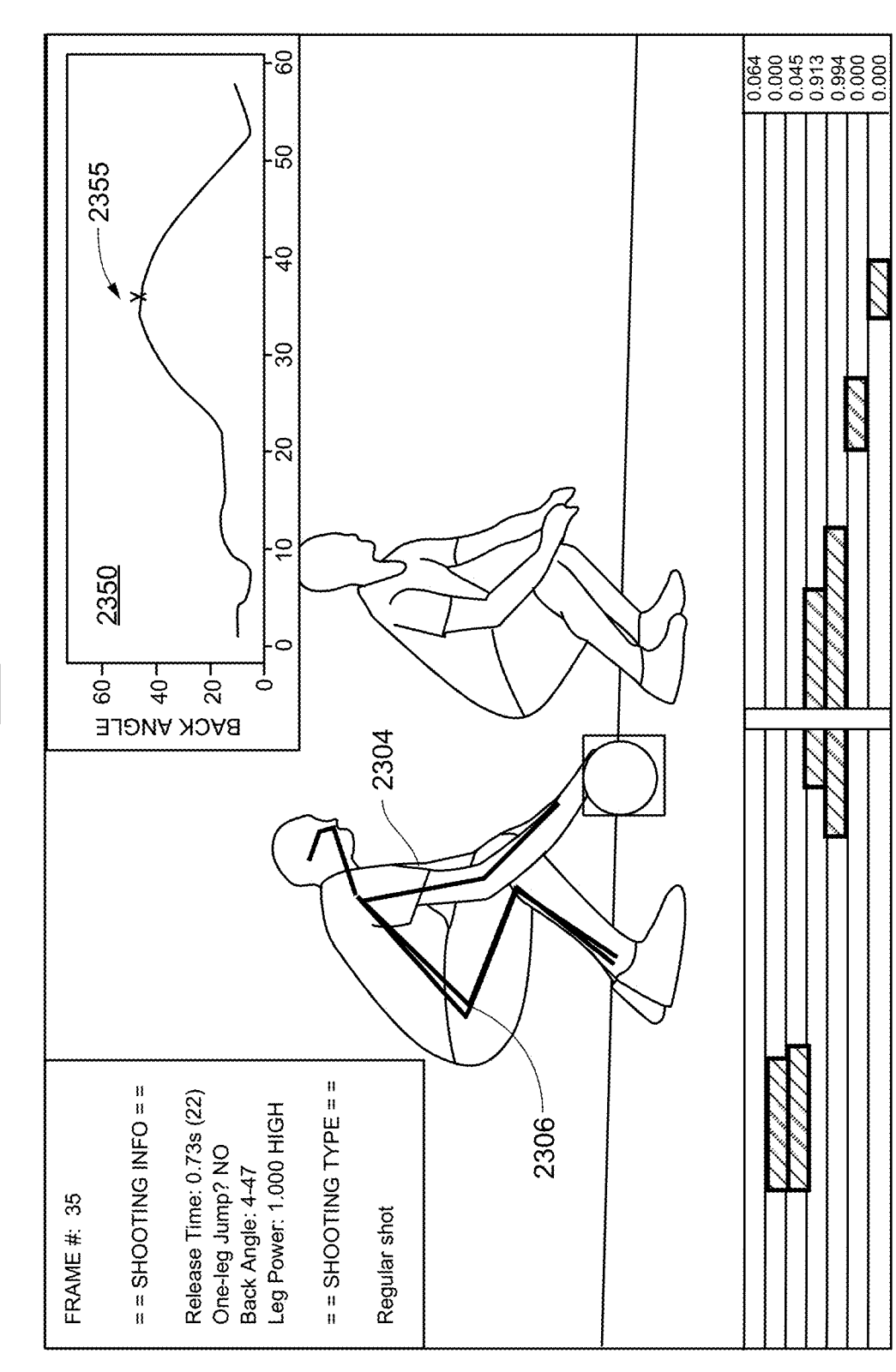
Figure 24:
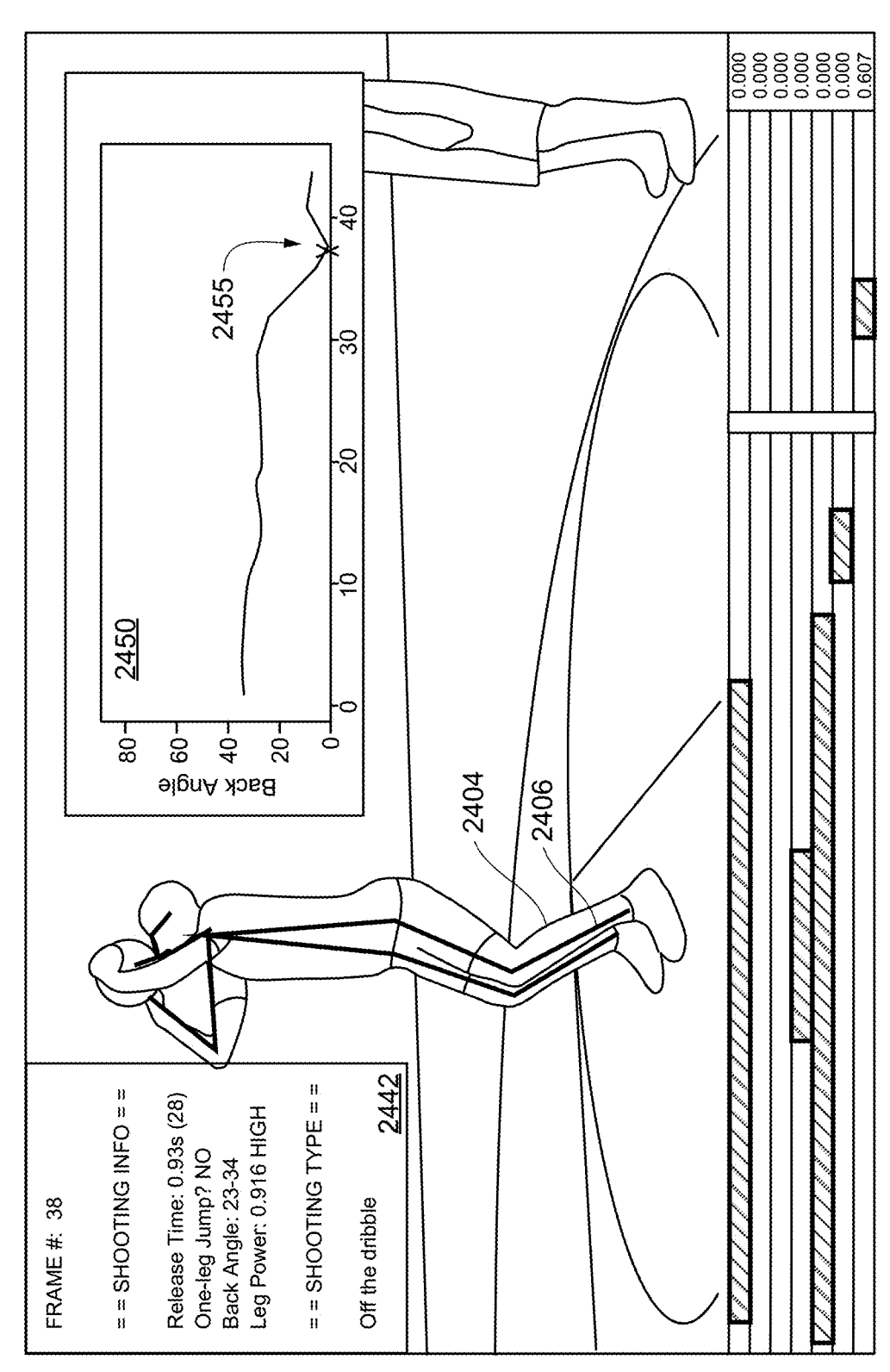

FIGS. 22, 23 and 24 are screen captures 2200, 2300, and 2400 from three other exemplary input shot attempt videos respectively and illustrate back angle statistics throughout the video as a function of the frame number, according to some embodiments of the present invention. In FIG. 22, back angle of player 2204, as computed from player posture 2206, is plotted against time in sub-figure 2250, with the shooter back angle in the current frame marked as data point 2255. In FIG. 23, back angle of player 2304, as computed from player posture 2306, is plotted against time in sub-figure 2350, with the shooter back angle in the current frame marked as data point 2355. Similarly in FIG. 24, back angle of player 2404, as computed from player posture 2406, is plotted against time in sub-figure 2450, with the shooter back angle in the current frame marked as data point 2455. As player 2404 has his back almost straight up, the measured back angle 2455 is close to 0 degrees.

NEX Platform

Figure 25:
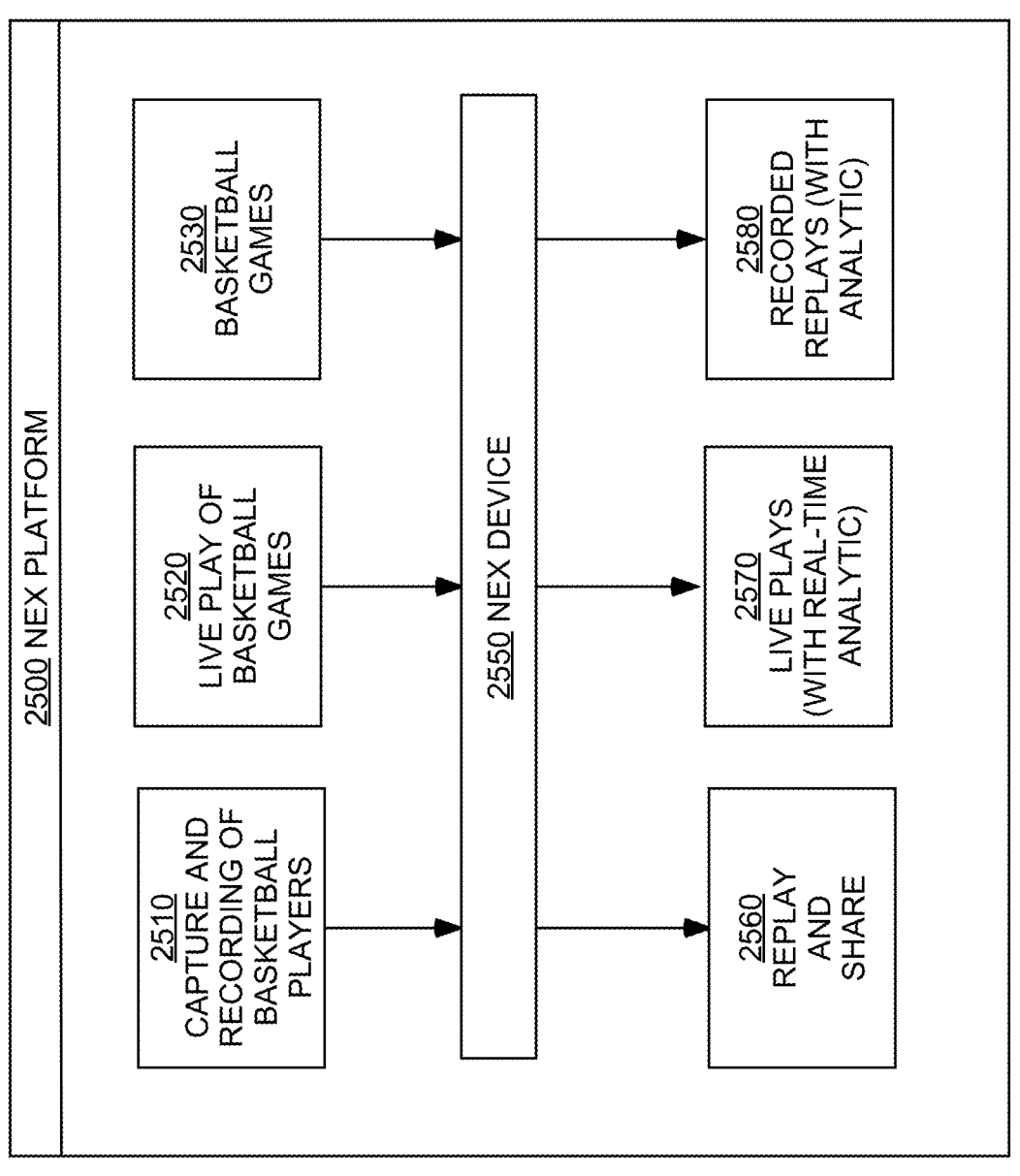
FIG. 25 is a schematic diagram illustrating a NEX platform, according to one embodiment of the present invention.

FIG. 25 is a schematic diagram illustrating functionalities provided by an extended NEX platform 2500, according to one embodiment of the present invention. Discussions within the present application have emphasized on the real-time analytics 2570 of a ball game at play, where live game plays 2520 are processed in real-time by NEX smartphone or NEX mobile device 2550. In some embodiments, NEX platform 2500 may capture basketball games 2530 and provide later replay 2580 with game analytics. Furthermore, NEX platform 2500 may receive on-demand capture and recordings 2510 of past games, such as professional games, for post-processing within NEX smartphone 2550, and/or instant or on-demand replay and content sharing 2560.

Although NEX mobile device 2550 as shown in FIG. 25 serves as the core for NEX platform 2500, in some embodiments, NEX platform 2500 may be networked among multiple user devices, where a NEX server may be connected to multiple camera-enabled user computing devices, each used to capture user or play data, and for providing play analytics. Such game video and/or analytics data may be uploaded to the NEX server, which in term may store and facilitate sharing of such data among individual players/users, or participants of an online game analytics and training community.

Figure 26:
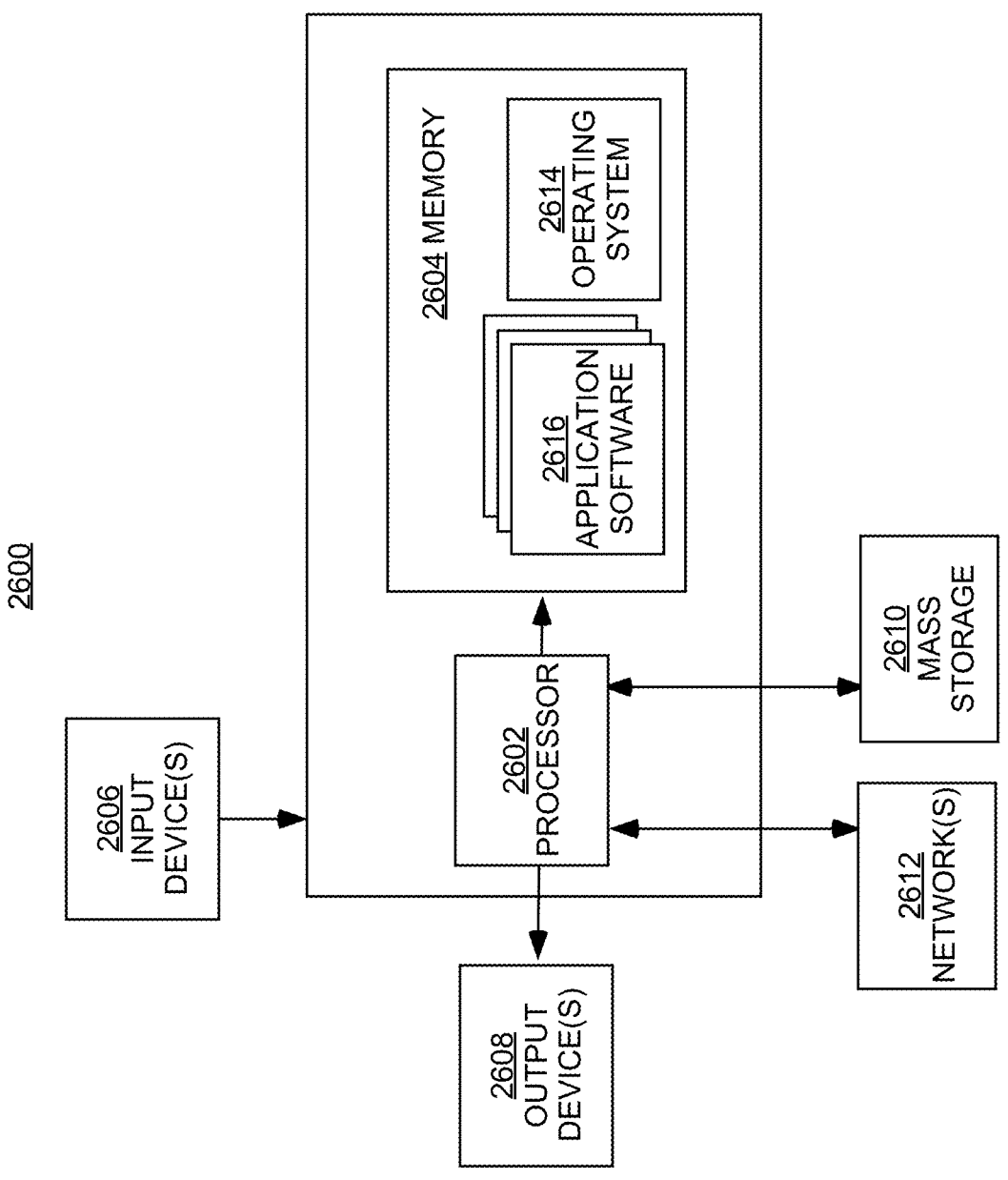
FIG. 26 is a schematic diagram of a computing device in which the present invention may be utilized, according to one embodiment of the present invention.

Finally, FIG. 26 is a schematic diagram 2600 of a computing device, such as a smartphone, tablet, or laptop, in which the present invention may be implemented, according to some embodiments of the present invention. A computing device, such as a smartphone, comprises a hardware processor 2602 for executing program code, an operating system 2614, application software 2616, which may implement the various embodiments of the present invention described herein, a physical memory 2604, at least one input device 2606, at least one output device 2608, a mass storage device 2610, and a network interface 2612. Network interface 2612 may establish one or more wired or wireless network connections to communicate to remote servers and databases, for example via the Internet. The program code utilized by the computing device may be provided on a non-transitory physical storage medium, such as a local hard-disk, a hard-disk in the cloud, or any other physical storage medium (not shown). Input device 2606 may comprise one or more imaging capturing devices, such as front-facing or back-facing optical cameras, thermal imaging cameras, and infrared cameras.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to basketball as one specific exemplary embodiment, one of ordinary skill in the art would recognize that the present invention may be applied to other games, including but not limited to baseball, golf, soccer, American football, and so forth. One of ordinary skill in the art would recognize that the methods and systems taught in the present disclosure can be applied, without loss of generality, to various games, various game analytics, and various game scoring methods.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for generating ball shot analytics using a hardware processor on a single mobile computing device, comprising:

receiving, on the hardware processor on the single mobile computing device, an input video of a ball game, and a location of a shooter in a shooter identification frame of the input video;

detecting, on the hardware processor on the single mobile computing device, one or more balls and one or more player postures from the input video;

generating, on the hardware processor on the single mobile computing device, one or more ball flows and one or more posture flows by grouping the one or more balls and the one or more player postures along a time line;

identifying, on the hardware processor on the single mobile computing device, a generated player posture flow as a shooter posture flow, based on an input location of the shooter;

identifying, on the hardware processor on the single mobile computing device, a generated ball flow as a related ball flow to the shooter posture flow;

determining, on the hardware processor on the single mobile computing device, a ball-from-shooter time by backtracking the related ball flow from a shot attempt;

determining, on the hardware processor on the single mobile computing device, a shot event occurring before the ball-from-shooter time; and generating, on the hardware processor on the single mobile computing device, one or more shot analytics based on the shot event, the shooter posture flow, and the related ball flow.

2. The method of claim 1, wherein the detecting of the one or more balls and the one or more player postures from the input video comprises using one or more Convolutional Neural Network (CNN) modules.

3. The method of claim 1, wherein the generating of the one or more shot analytics comprises determining a shot type of the shot attempt.

4. The method of claim 1, wherein the ball game is a basketball game.

5. The method of claim 1, wherein the input video is streamed.

6. The method of claim 1, wherein the detecting the one or more balls and the one or more player postures is applied on a skip frame basis.

7. The method of claim 1, wherein the detecting the one or more balls and the one or more player postures is limited to an image area close to the shooter.

8. The method of claim 1, wherein the generating the one or more ball flows and the one or more posture flows comprises applying a bipartite matching to the one or more balls and the one or more player postures, respectively, to existing ball flows and posture flows, wherein the bipartite matching of a detected ball and an existing ball flow comprises computing a matching score between the detected ball and the existing ball flow, and wherein the computing of the matching score comprises:

generating a predicted ball comprising a next ball location and a next ball size based on the existing ball flow; and computing the matching score based on a location difference and a size difference between the predicted ball and the detected ball.

9. The method of claim 1, wherein the shooter posture flow is closest to the input location of the shooter in the shooter identification frame when compared to other posture flows.

10. The method of claim 1, wherein identifying the related ball flow comprises applying non-max-suppression to all generated ball flows, wherein the related ball flow has a score against the shooter posture flow, wherein the score is computed based on shooter movements, a distance to the shooter, and a confidence value, and wherein the score is above a pre-defined threshold.

11. The method of claim 1, further comprising declaring the shot attempt by determining whether the related ball flow is thrown from an upper body of the shooter upward.

12. The method of claim 1, wherein the shot event occurs within a pre-defined time period before the ball-from-shooter time.

13. The method of claim 1, wherein the shot event is selected from the group consisting of dribble event, jump event, catch-ball event, ball-leave-hand event, one-two leg jump, and wherein a shot type is selected from the group consisting of layup, regular shot, dribble-pull-up, off-the-move, and catch-and-shoot.

14. The method of claim 1, wherein the shot analytics is selected from the group consisting of release time, back angle, leg bend ratio, leg power, moving speed, moving direction, and height of jump.

15. The method of claim 2, wherein each CNN module has been trained using one or more prior input videos.

16. The method of claim 1, wherein the input video is received from a camera on the single mobile computing device.

17. A single mobile computing device for generating ball shot analytics, comprising:

a processor on the single mobile computing device; and a non-transitory computer readable storage medium for storing program code and accessible by the processor, the program code when executed by the processor causes the processor to:

receive, on the processor on the single mobile computing device, an input video of a ball game, and a location of a shooter in a shooter identification frame of the input video;

detect, on the processor on the single mobile computing device, one or more balls and one or more player postures from the input video;

generate, on the processor on the single mobile computing device, one or more ball flows and one or more posture flows by grouping the one or more balls and the one or more player postures along a time line;

identify, on the processor on the single mobile computing device, a generated player posture flow as a shooter posture flow, based on an input location of the shooter;

identify, on the processor on the single mobile computing device, a generated ball flow as a related ball flow to the shooter posture flow;

determine, on the processor on the single mobile computing device, a ball-from-shooter time by backtracking the related ball flow from a shot attempt;

determine, on the processor on the single mobile computing device, a shot event occurring before the ball-from-shooter time; and generate, on the processor on the single mobile computing device, one or more shot analytics based on the shot event, the shooter posture flow, and the related ball flow.

18. The single mobile computing device of claim 17, wherein the program code to detect the one or more balls and the one or more player postures from the input video comprises program code for one or more Convolutional Neural Network (CNN) modules.

19. A non-transitory computer readable storage medium for generating ball shot analytics, the non-transitory computer readable storage medium comprising program code stored thereon, the program code when executed by a processor on a single mobile computing device causes the processor to:

receive, on the processor on the single mobile computing device, an input video of a ball game, and a location of a shooter in a shooter identification frame of the input video;

detect, on the processor on the single mobile computing device, one or more balls and one or more player postures from the input video;

generate, on the processor on the single mobile computing device, one or more ball flows and one or more posture flows by grouping the one or more balls and the one or more player postures along a time line;

identify, on the processor on the single mobile computing device, a generated player posture flow as a shooter posture flow, based on an input location of the shooter;

identify, on the processor on the single mobile computing device, a generated ball flow as a related ball flow to the shooter posture flow;

determine, on the processor on the single mobile computing device, a ball-from-shooter time by backtracking the related ball flow from a shot attempt;

determine, on the processor on the single mobile computing device, a shot event occurring before the ball-from-shooter time; and generate, on the processor on the single mobile computing device, one or more shot analytics based on the shot event, the shooter posture flow, and the related ball flow.

20. The non-transitory computer readable storage medium of claim 19, wherein the program code to detect the one or more balls and the one or more player postures from the input video comprises program code for one or more Convolutional Neural Network (CNN) modules.

\* \* \* \* \*